(12) United States Patent
Schmitz

(10) Patent No.: US 11,157,435 B2
(45) Date of Patent: Oct. 26, 2021

(54) CONCATENATED TWO-WIRE DATA BUS

(71) Applicant: Elmos Semiconductor Aktiengesellschaft, Dortmund (DE)

(72) Inventor: Christian Schmitz, Castrop-Rauxel (DE)

(73) Assignee: ELMOS SEMICONDUCTOR SE, Dortmund (DE)

( * ) Notice: Subject to any disclaimer, the term of this patent is extended or adjusted under 35 U.S.C. 154(b) by 24 days.

(21) Appl. No.: 16/860,111

(22) Filed: Apr. 28, 2020

(65) Prior Publication Data

US 2020/0265003 A1    Aug. 20, 2020

Related U.S. Application Data

(63) Continuation of application No. 16/470,585, filed as application No. PCT/EP2017/083523 on Dec. 19, 2017, now Pat. No. 10,678,742.

(30) Foreign Application Priority Data

Dec. 21, 2016  (DE) .................... 10 2016 125 290.5
Jan. 16, 2017  (DE) .................... 10 2017 100 718.0

(51) Int. Cl.
*G06F 13/42* (2006.01)
*F21S 4/20* (2016.01)
(Continued)

(52) U.S. Cl.
CPC .............. *G06F 13/426* (2013.01); *F21S 4/20* (2016.01); *H04L 12/403* (2013.01); *H05B 47/165* (2020.01); *H05B 47/18* (2020.01)

(58) Field of Classification Search
None
See application file for complete search history.

(56) References Cited

U.S. PATENT DOCUMENTS 5,859,657 A   1/1999  Donahue et al.
6,105,077 A   8/2000  Kimura
(Continued)

FOREIGN PATENT DOCUMENTS

DE        102 61 14 B     3/1958
DE        19643013 C1     2/1998
(Continued)

OTHER PUBLICATIONS

International Search Report and Written Opinion for PCT/EP2017/083523 dated Oct. 2, 2018 (45 pages; with English translation).

*Primary Examiner* — Scott C Sun
(74) *Attorney, Agent, or Firm* — Mindful IP PLLC

(57) ABSTRACT

Disclosed is a light module and a matching housing for a bus node. The light module is provided to be used in a data bus system for transmitting data for light-emitting components via a differential two-wire data bus. The data bus transmits data between a bus master and at least two bus nodes. The data bus is divided by the bus nodes into at least two two-wire data bus sections. The housing comprises at least two rows of connections arranged opposite each other. Each row comprises one negative supply voltage connection and one positive supply voltage connection, which are arranged to be connected in pairs without intersection. The two connections for each of the respective two-wire data bus sections are arranged between the connections for the supply voltages in each row. A light-emitting component is arranged in a recess of the housing.

7 Claims, 19 Drawing Sheets

(51) Int. Cl.
    *H04L 12/403*    (2006.01)
    *H05B 47/18*    (2020.01)
    *H05B 47/165*    (2020.01)

(56) References Cited

U.S. PATENT DOCUMENTS

| | | |
|---|---|---|
| 6,297,724 B1 | 10/2001 | Bryans |
| 8,492,983 B1 | 7/2013 | Berg et al. |
| 2003/0009715 A1 | 1/2003 | Ricchetti et al. |
| 2004/0208200 A1 | 10/2004 | Hejdman et al. |
| 2007/0033465 A1 | 2/2007 | Greenberg |
| 2008/0255791 A1 | 10/2008 | Whetsel |
| 2009/0021955 A1 | 1/2009 | Kuang et al. |
| 2009/0235136 A1 | 9/2009 | Whetsel |
| 2009/0252210 A1 | 10/2009 | Rubehn et al. |
| 2010/0109530 A1 | 5/2010 | Eckel et al. |
| 2011/0150065 A1 | 6/2011 | Tailliet |
| 2011/0309746 A1 | 12/2011 | Eckel |
| 2012/0144078 A1 | 6/2012 | Pulsen |
| 2012/0188738 A1 | 7/2012 | Warre et al. |
| 2013/0073761 A1 | 3/2013 | Nierop et al. |
| 2014/0101351 A1 | 4/2014 | Hooper et al. |
| 2014/0281076 A1 | 9/2014 | Breece, III et al. |
| 2014/0333207 A1 | 11/2014 | Saes |
| 2016/0047860 A1 | 2/2016 | Whetsel |
| 2016/0138768 A1 | 5/2016 | Greene |

FOREIGN PATENT DOCUMENTS

| | | |
|---|---|---|
| DE | 10215720 A1 | 10/2003 |
| DE | 10256631 A1 | 7/2004 |
| DE | 2006022985 A1 | 11/2007 |
| DE | 202008012029 U1 | 12/2008 |
| DE | 102007060441 B3 | 4/2009 |
| DE | 10 2010 042 311 A1 | 4/2012 |
| DE | 202013103146 U1 | 10/2014 |
| DE | 102014003066 A1 | 9/2015 |
| DE | 102015004433 B3 | 5/2016 |
| DE | 102015004434 B3 | 5/2016 |
| DE | 102015004435 B3 | 6/2016 |
| DE | 102015004436 B3 | 6/2016 |
| DE | 102016100838 B3 | 12/2016 |
| DE | 102016100840 B3 | 12/2016 |
| DE | 102016100841 B3 | 12/2016 |
| DE | 102016100837 B3 | 3/2017 |
| DE | 102016100839 B3 | 3/2017 |
| DE | 102016100842 B3 | 3/2017 |
| DE | 102016100843 B3 | 3/2017 |
| DE | 102016100845 B3 | 3/2017 |
| DE | 102016100847 B3 | 3/2017 |
| DE | 102016101181 B3 | 3/2017 |
| EP | 0503117 B1 | 6/1995 |
| EP | 1490772 B1 | 6/2005 |
| EP | 1364288 B1 | 2/2011 |
| EP | 2323463 A2 | 5/2011 |
| EP | 2400608 A2 | 12/2011 |
| EP | 2571200 A2 | 3/2013 |
| WO | 2006102284 A2 | 9/2006 |
| WO | 2013095133 A1 | 6/2013 |

CONCATENATED TWO-WIRE DATA BUS

CROSS-REFERENCE TO RELATED APPLICATIONS

This application is a continuation of U.S. patent application Ser. No. 16/470,585, filed on Jun. 18, 2019, which is a national stage of, and claims priority to, Patent Cooperation Treaty Application No. PCT/EP2017/083523, filed on Dec. 19, 2017, which application claims priority to German Application No. DE 10 2016 125 290.5, filed on Dec. 21, 2016 and German Application No. DE 10 2017 100 718.0, filed on Jan. 16, 2017, which applications are hereby incorporated herein by reference in their entireties.

The disclosure relates to a modified JTAG interface of a bus node in a differential two-wire data bus, as well as to a two-wire data bus system for an illumination device having a differential two-wire data bus and having bus nodes provided with modified JTAG interfaces for respectively controlling at least one control device of at least one light emitting component by the bus node. The disclosure further relates to a method for controlling a light emitting component by means of an electric device of one of a plurality of bus nodes of a differential two-wire data bus system having a differential two-wire data bus. The disclosure relates to a method for initializing a differential two-wire data bus. Moreover, the disclosure relates to a device for transmitting data after initialization of a differential two-wire data bus. Finally, the disclosure further relates to a two-wire data bus system with a differential two-wire data bus, as well as to a method for data transmission in such a two-wire data bus system with a differential two-wire data bus, and to a device for connection as a bus node to a differential two-wire data bus.

INTRODUCTION

For the future, the automobile industry intends to use light strips formed by light emitting diodes (LEDs) with preferably a plurality of colors. These LEDs will be controlled and supplied with energy using known pulse modulation methods such as e.g. pulse width modulation (PWM), pulse code modulation (PCM), phase offset modulation (POM), pulse density modulation (PDM), pulse frequency modulation (PFM) etc. The expert can find the corresponding types of modulation in the pertinent literature. If in the following mention is made of PWM, this refers to all types of pulse modulation presently known in prior art. Depending on the mean voltage or current level applied to a respective LED, the LED can be adjusted in brightness and, in a certain degree, possibly with respect to the color temperature as well. Thus, e.g. in case of a PWM modulation, the duty cycle and the level determine the apparent brightness and the perceived color temperature.

The LEDs of the light emitting component are usually distributed regularly along the length of the light strip.

In prior art it is common practice to use a plurality of integrated circuits to control the LEDs, the circuits being situated on the light strip as bus nodes also distributed more or less equally. Typically, each bus node has a plurality of light emitting components, preferably LEDs, associated thereto which are respectively controlled by the bus node.

This control is performed with respect to a single integrated circuit for a single LED or for a plurality of LEDs typically arranged in succession on the light strip, i.e. for a light strip section associated to this integrated circuit.

In prior art it is common practice to provide each of these integrated circuits with a shift register having an input and an output. Here, the input of a succeeding shift register of a succeeding integrated circuit on the light strip is connected to the output of the shift register of the preceding integrated circuit on the light strip. The first integrated circuit of the light strip is connected to a bus master (BM) instead of a preceding integrated circuit, the bus master generating the data and the shift clock. Typically, it is a microcontroller.

Via a clock line (TCK), the bus master (BM) supplies all shift register segments of all integrated circuits along a chain of shift registers thus composed with the required shift clock and a take-over signal transmitted via a test data line (TDI) in time-division multiplex or a test mode signal line (TMS) in space-division multiplex, by which the current values in the segments of the chain of shift registers are loaded into shadow registers of the integrated circuits. For transferring the required information, the bus master (BM) thus generates a serial data stream containing information on brightness and/or color temperature, shifts these into the chain of shift registers in the correct bit order and, using the correct clock, signalizes the transfer to the integrated circuits, whereupon the registers load their shadow registers correspondingly and adjust the PWM modulation of the LED drivers with respect to amplitude and duty cycle or filling factor in correspondence with the thus loaded values of brightness and color temperature.

When implemented in automobiles, several problems occur that have to be solved.

First, the approach known from prior art and the arrangement for controlling such a light strip known from prior art requires a ground line, a clock line, a signaling line and a data line, i.e. a total of five lines. The body of an automobile may possibly be used as the ground line, if the same is not made of non-conductive plastic material or another insulator. The necessity for four lines still remains. This results in costs and an increase in weight.

Second, no feedback channel is provided e.g. for detecting cases of failure and/or for measuring the temperature at the site of the LED and/or for performing a self-test etc.

Third, the speed achievable is insufficient for many applications. A further increase in data rate may lead to emissions.

Therefore, a solution is required that allows the integrated circuits to be programmed and read via a single data line.

The JTAG protocol is known from prior art. The JTAG protocol has evolved into one of the leading auxiliary means in programming, testing, debugging and emulation of integrated circuits. In a method referred to as the boundary scan method, a host processor can control the state of an integrated circuit. For example, the host processor is able, as a bus master, to suitably program and possibly initialize the integrated circuit as a bus node via a special interface, the JTAG interface according to IEEE 1149 standard. Further, the host processor as the bus master is able to read out the state of the integrated circuit after a predetermined number of system clock periods of the JTAG interface according to IEEE 1149 standard or when detecting a predetermined event or to modify the state during the operation of the integrated circuit, i.e. of the bus node. This also includes the stopping of the execution of a program by the integrated circuit and the stopping of the timing of a finite 0 of the integrated circuit or the forced transition into other states or the modification of memory content. However, the JTAG protocol is a point-to-point connection and, as such, is not suited for the control of light strips in automobiles. A concatenation of JTAG test interfaces may be known for a long time from EP-B-0 503 117. However, EP-B-0 503 117 discloses the concatenation of four-wire JTAG interfaces. Thus, the technology of EP-B-0 503 117 does not meet the requirement of a two-wire data bus for the control of LED-based light strips in automobiles.

The proposal according to the disclosure described in the following thus relates to a method and a device for the concatenated control and/or for the programming of a plurality of integrated circuits, such as e.g. microsystems such as micro-electromechanical systems (MEMS) and integrated micro-electrooptical systems (MEOS), using a two-wire data bus, wherein the integrated circuits and microsystems, incl. micro-electromechanical systems (MEMS) and integrated micro-electrooptical systems (MEOS), each act as a bus node. With such systems, it is already common practice to control the same for the manufacture test via a JTAG test bus according to IEEE 1149 standard in a pure point-to-point-configuration. This standard JTAG interface has a test data port typically having four test connectors, namely
1. at least one serial data input (test data input) TDI,
2. at least one serial data output (test output) TDo,
3. at least one mode input (test mode input) TMS,
4. at least one clock input (test clock input) TCK,
5. an optional reset input (test reset input) (TRST).

Sine the method has been known for several decades, reference is made at this point to the corresponding technical literature and to other publications (e.g. IEEE 1149 standard).

At this point, the following short description shall suffice: In the base standard, the JTAG protocol according to IEEE 1149 standard comprises five groups of signals exchanged between the emulation unit which includes the host processor and thus acts as the bus master, and the integrated circuit as the slave, each referred to hereinafter as bus node. The TCK signal is the system clock and chronologically synchronizes the internal state engine of the test controller (TAPC) of the JTAG test interface according to IEEE 1149 standard of the integrated circuit. The TMS signal controls the state of this test controller (TAPC) of the JTAG interface of the bus node. Depending on the state of the test controller (TAPC), the JTAG test interface of the bus node performs various operations. The TDI input is a serial data input. The TDo output is a serial data output. Typically, but not necessarily, the two inputs TMS and TDI are scanned with the rising TCK edge. The data output (TDo) typically changes its datum with the descending edge of the TCK signal. In prior art, the individual TCK, TMS and TDI signals form the test data input signals. In the context of the disclosure, they are the data input signals. The TDo signal is the output signal. With the rising system clock edges (TCK edge) and given a suitable setting of a test-controller (TAPC)-internal instruction register (IR) of a test controller (TAPC), the data are shifted serially via the serial data input TDI into different shift register chains, so-called scan paths, in the integrated circuit as the bus node. At the same time, the original content of the respective scan chain is outputted at the serial data output (TDo). Here, state vectors of finite automats within the bus nodes may be part of the scan chain. Thus, a change in the contents and states or the control of these contents and states of the memory cells of the scan chains via this interface is easily possible in prior art. Again, reference is made to the technical literature.

FIG. 1 (Prior Art)

FIG. 1 illustrates the standardized state diagram for a JTAG test controller (TAPC) according to prior art and to the relevant standards. After a reset of the system, the test controller (TAPC) is the state "test logic reset" (TLR). It stays in this state for as long as the test mode signal is 1. When the test mode signal (TMS) becomes 0, the test controller (TAPC) changes into the "waiting state" (RUN) synchronously with the system clock (TCK). The test controller (TAPC) stays in the same until the test mode signal (TMS) is 1. The test controller (TAPC) then changes into the state "start data register shifting" (SDRS). If the next time the test mode signal (TMS) is again 1, the test controller (TAPC) changes into the state "start instruction register shifting" (SIRS). If the test mode signal (TMS) is again 1 in the next cycle, the test controller (TAPC) changes into the state "test logic reset" (TLR) and resets the data interface logic.

If, however, the test mode signal (TMS) is 0 in the state "start instruction register shifting" (SIRS), the test controller (TAPC) changes into the state "load instruction register data" (CIR) in which the data available in an instruction shadow register are loaded into the instruction register (IR). In this respect, the instruction register (IR) is a two-stage register in which the foreground is formed by a shift register and the actual data are in a shift register that is read only in this state. The shift register of the instruction register (IR) serves to supply and discharge the data, while the shadow register of the instruction register (IR) contains the actual, valid data. This two-stage structure applies to all registers, in particular also to the data registers (DR) of the JTAG interface and also for the registers of the present disclosure of the interface of the present disclosure, described in the following. Possibly, the shadow register of the instruction register (IR) may completely or partly be divided into a register for reading operations and a register for writing operations. Further changes of the visibility and access options as a function of internal states are possible. If, in the state "load instruction register data" (CIR), 1 is applied upon the next clock of the test mode signal (TMS), the test controller (TAPC) directly changes into the state "instruction register exit 1" (EIR1). If, however, 0 is applied, the test controller (TAPC) changes into the state "shift instruction register" (SIR) in which it stays for as long as the test mode signal (TMS) is 0. It is only in this state that the shift register of the instruction register (IR) is operated to function as a shift register and that with each clock of the system clock (TCK), its content is shifted by one bit towards the serial data output (TDo) to which the last memory cell of the shift register of the instruction register (IR) is connected. The shadow register of the instruction register (IR) is not subject to this shifting operation. The data information present at the data input (TDI) is loaded into the first cell of the shift register of the instruction register (IR) with each clock of the system clock (TCK) and moved on from there with each further clock during shifting. As soon as the test mode signal (TMS) is 1 in one clock, the test controller (TAPC) leaves the state "shift instruction register" (SIR) and changes into the previously mentioned state "instruction register exit 1" (EIR1). If, upon the next clock of the system clock (TCK) 1 is again applied, the test controller (TAPC) changes into the state "write instruction register" (UIR2) in which the value of the shift register part of the instruction register (IR) is written into the shadow register of the instruction register (IR). If, however, in the state "instruction register exit 1" (EIR1), the test mode signal (TMS) is 0, the test controller (TAPC) changes into the state "pause instruction register" (PIR), in which it stays for as long as the test mode signal is 0. If the test mode signal (TMS) is 1 in the state "pause instruction register" (PIR), the test controller (TAPC) changes into the state "instruction register exit 2" (EIR2). If the test mode signal (TMS) is 0 upon the next system clock (TCK), the test controller (TAPC) changes back into the state "shift instruction register" (SIR) already described above. If, however, in the state "instruction register exit 2" (EID2), the test mode signal (TMS) is 1 upon the next system clock (TCK), the test controller (TAPC) changes into the state "write instruction register" (UIR2). Upon the subsequent clock, the test controller (TAPC) changes into the state "start data register shifting" (SDRS), if upon this clock the test mode signal (TMS) is 1, and changes into the state "wait" (RUN), if it is 0.

If, in the state "start data register shifting" (SDRS), the test mode signal (TMS) is 0, the test controller (TAPC) changes into the state "load data register" (CDR), in which the data available in a data shadow register are loaded into the respective data register (DR). Which data register (DR) of a plurality of data registers is chosen, is determined, according to the standard, by at least a part of the valid bits of the shadow register of the data register (DR). Again, the data register (DR) typically is a two-stage register in which the foreground is formed by a shift register and the actual data are located in a shadow register which is read only in this state. In this case, the shift register of the data register (DR) again serves to supply and discharge the data, while the shadow register of the data register (DR) contains the actual data. As mentioned before, this two-stage structure applies to all registers of the JTAG interface, including the hereinafter described registers of the present disclosure of the interface of the present disclosure, which, according to the standard, are configured as data registers (DR). Possibly, the shadow register of the data register (DR) may again be divided completely or partly into a register for reading operations and a register for writing operations. Further changes of the visibility and access options as a function of internal states are also possible in this case. If, in the state "load data register" (CDR), 1 is applied upon the next clock of the test mode signal (TMS), the test controller (TAPC) directly changes into the state "data register exit 1" (EDR1). If, however, 0 is applied, the test controller (TAPC) changes into the state "shift data register" (SDR) in which it stays for as long as the test mode signal (TMS) is 0. It is only in this and no other state that the shift register of the data register (DR) is operated to function as a shift register and that with each clock of the system clock (TCK), its data content is shifted by one bit towards the serial data output (TDo) to which the last memory cell of the shift register of the data register (DR) is connected. The shadow register of the data register (DR) is not subject to this shifting operation. The data information present at the data input (TDI) is loaded into the first cell of the shift register of the data register (DR) with each clock of the system clock (TCK) and moved on from there with each further clock during shifting. As soon as the test mode signal (TMS) is 1 in one clock, the test controller (TAPC) leaves the state "shift data register" (SDR) and changes into the previously mentioned state "data register exit 1" (EDR1). If, upon the next clock of the system clock (TCK) 1 is again applied, the test controller (TAPC) changes into the state "write data register" (UDR2) in which the value of the shift register part of the data register (DR) is written into the shadow register of the data register (DR). If, however, in the state "data register exit 1" (EDR1), the test mode signal (TMS) is 0, the test controller (TAPC) changes into the state "pause data register" (PDR), in which it stays for as long as the test mode signal is 0. If the test mode signal (TMS) is 1 in the state "pause data register" (PDR), the test controller (TAPC) changes into the state "data register exit 2" (EDR2). If the test mode signal (TMS) is 0 upon the next system clock (TCK), the test controller (TAPC) changes back into the state "shift data register" (SDR) already described above. If, however, in the state "data register exit 2" (EDR2), the test mode signal (TMS) is 1 upon the next system clock (TCK), the test controller (TAPC) changes into the state "write data register" (UDR2). Upon the subsequent clock, the test controller (TAPC) changes into the state "start data register shifting" (SDRS), if upon this clock the test mode signal (TMS) is 1, and changes into the state "wait" (RUN), if it is 0.

It is particularly feasible to use this state scheme of the IEEE 1149 JTAG standard so as to maintain compatibility on the software level with this standard that is already in widespread use. Of course, deviations from this JTAG standard are conceivable. The disclosure will be described with reference to an example in which this JTAG standard is observed for the state diagram of the test controller (TAPC).

In the past years, the semiconductor industry has made several attempts to reduce the number of the connectors to be used for such JTAG interfaces, so as to limit the size of the required housings and thus limit the manufacturing costs. US-A-2007/0033465 describes a technique that does not allow a consistent conversion of the data of the IEEE 1149.1 4-Wire-JTAG protocol into the data of the method described there, and vice versa. The device arrangement described there and the method described there require synchronized time slots between the bus master, i.e. the host processor, and the bus node as the slave, i.e. the integrated circuit that is to be tested, programmed or debugged. In case of a missing chronologic synchronization of the access by the bus master and the bus node to the test data bus, the TDo output driver of the bus node and the bus master output driver (typically a push-pull stage) may cause a short circuit in case of a simultaneous transmitting access to the test data line. Moreover, it only discloses a point-to-point connection.

Multi-level one-wire point-to-point arrangements are known from US-A-2007/0033465 and US-A-2011/0150065 EP-B-0 503 117, which already work with only one data line, but are not suited for controlling a plurality of bus nodes. An expansion by the concatenation methods disclosed in EP-B-0 503 117 is not possible, since this document does not disclose a suitable method for a bidirectional relaying of the intermediate levels.

Various examples of data transmission bus systems are described in DE-A-102 56 631, DE-B-102 61 14, DE-A-10 2010 042 311, DE-B-10 2015 004 434, U.S. Pat. No. 6,105,077, US-A-2004/0208200, US-A-2011/0150065, US-A-2012/0144078, US-A-2013/0073761 and US-A-2014/0281076.

From U.S. Pat. No. 8,492,983, a concatenation using a one-wire point-to-point data line (reference numeral in U.S. Pat. No. 8,492,983) is known. However, the same requires a feedback line (FIG. 4 of U.S. Pat. No. 8,492,983). Thus, the advantage of the single data line is neutralized by the necessity of a feedback line.

Further, various documents are known that also have data transmission as their subject. DE-C-196 43 013, DE-A-102 15 720, DE-A-2006 022 985, DE-B-10 2007 060 441, US-A-2009/0252210 and US-A-2008/0255791 have to be mentioned in this context. One-wire data bus systems, as well as two-wire data bus systems which are possible operated differentially, are generally known for the purpose of controlling LEDs e.g. from DE-U-20 2008 012 029, DE-U-20 2013 103 146, U.S. Pat. Nos. 5,859,657, 6,297,724, US-A-2003/0009715, US-A-2010/0109530 and US-A-2014/0333207. However, in all these systems no JTAG interface is used in the bus nodes, as it is conventionally used e.g. the boundary scan test. None of the documents mentioned discloses how, in the case of a concatenation of bus nodes, the bus master (BM) can control the bus nodes by means of a JTAG interface.

This also applies to US-A-2014/0281076 which discloses a star topology. Such a star topology of a network does not allow for a correlation between a physical position and a logical address and is thus not suitable for the implementation of a method for allocating bus addresses (auto addressing). However, the applicability of such a method is a prerequisite for use in the automobile industry.

From US-A-2014/0333207, a device and a method for operating an illumination system are known, in which messages are received and transmitted by "intelligent" nodes. In the nodes, the operation of the known illumination system results in a time delay in transferring the data between the data bus sections, which is unsuitable for a fast setting of light scenes. From US-A-2012/0144078, a method for the unidirectional transmission of clock and data from a slave to a master is known. Here, the clock is transmitted from the master to the slave with a first edge of the combined clock/data stream, whereas the data are transferred from the slave to the master with a second edge of the combined clock/data stream. The method is not bidirectional.

US-A-2009/0021955 discloses the control of an LED interior lighting via a hierarchic two-wire data bus which may be configured as a serial arrangement (paragraph [0033] of US-A-2009/0021955). However, the technical teaching of US-A-2009/0021955 also relates to star-shaped topologies. The bus master and the slaves alternate according to a time-slot method. The transmission of the system clock and the data, as well as the control of the bus nodes and the address allocation are not explained. Specifically, the bus master is unable to address the test resources built in the respective bus slave in a targeted manner on a physic plane.

OBJECT OF THE DISCLOSURE

It is an object of the disclosure to allow a bidirectional, freely configurable transmission of illumination data with two data lines for more than one bus node bus node (BS1, BS2, BS3) as a slave to a bus master (BM).

The object is achieved as described below, together with the subject matter of each independent claim, with individual examples being the subject matter of the dependent claims.

The disclosure proposes a modified JTAG interface of a bus node (BS1, BS2, BS3) in a differential two-wire data bus system for controlling at least one control device of at least one light emitting component of a light chain via a bus node (BS1, BS2, BS3), wherein it is provided for the modified JTAG interface that it comprises at least one illumination register (ILR) as a data register (DR) of said modified JTAG interface, the control of the light emitting components by the bus node (BS1, BS2, BS3) depending at least temporarily on the at least temporary content of the illumination register, wherein the modified JTAG interface is characterized in that the JTAG test controller (TAPC) comprises a state diagram corresponding to the IEEE 1149 standard and in particular to one or a plurality of the sub-standards IEEE 1149.1 to IEEE 1149.8 and their advancements.

The JTAG interface is modified, according to the disclosure, such that it is operated with a differential signal, as transmitted, according to the disclosure, with a differential two-wire data bus, instead of being operated with an absolute voltage signal, i.e. a voltage signal changing relative to a reference level (e.g. ground).

The disclosure further proposes a two-wire data bus system for an illumination device, which is provided with
a differential two-wire data bus and
a plurality of bus nodes (BS1, BS2, BS3), each of which controls at least one control device for at least one light emitting component,
wherein each bus node (BS1, BS2, BS3) comprises a modified JTAG interface coupled to the two-wire data bus, which interface comprises at least one illumination register (ILR) as a data register (DR) of said modified JTAG interface, the control of the light emitting components by the bus node (BS1, BS2, BS3) depending at least temporarily on the at least temporary content of the illumination register, and
wherein the modified JTAG interface is characterized in that the JTAG test controller (TAPC) comprises a state diagram corresponding to the IEEE 1149 standard and in particular to one or a plurality of the sub-standards IEEE 1149.1 to IEEE 1149.8 and their advancements.

The disclosure further proposes a method for controlling a light emitting component by means of an electric device of one of a plurality of bus nodes (BS1, BS2, BS3) of a two-wire data bus system having a differential two-wire data bus, comprising the following step:
transmitting control data for setting lighting values for at least one light emitting component by controlling a JTAG test controller (TAPC) of a modified JTAG interface within the bus node (BS1, BS2, BS3) which supplies at least one light emitting component with controllable electric power in dependence on these control data,
wherein the modified JTAG interface is characterized in that the JTAG test controller (TAPC) that comprises a state diagram corresponding to the IEEE 1149 standard and in particular to one or a plurality of the sub-standards IEEE 1149.1 to IEEE 1149.8 and their advancements.

According to the disclosure a variant of the JTAG interface of the disclosure is formed by a modified JTAG interface for controlling the control device of light emitting components via a bus node (BS1, BS2, BS3) of a two-wire data bus system having a differential two-wire data bus, wherein, according to the disclosure, it is provided for this modified JTAG interface
that it comprises at least one illumination control register (ILCR) as a data register (DR) of said modified JTAG interface and an illumination register (ILR) as a data register of the modified JTAG interface,
that it depends at least on parts of the content of the illumination control register (ILCR), whether the illumination data for controlling the control device of the light emitting components by the bus node are received by the illumination register (ILR) via the test data interface (TMS_TDI) of the modified JTAG interface or a separate data input (SILDI), and
that the control of the light emitting components by the bus node (BS1, BS2, BS3) depending at least temporarily on the at least temporary content of the illumination register,
wherein the modified JTAG interface is characterized in that it comprises a JTAG test controller (TAPC) that comprises a state diagram corresponding to the IEEE 1149 standard and in particular to one or a plurality of the sub-standards IEEE 1149.1 to IEEE 1149.8 and their advancements.

The disclosure further relates to a method for initializing a differential two-wire data bus between a first sub-device, a bus master (BM), and at least two further sub-devices, the bus nodes (BS1, BS2, BS3), wherein the two-wire data bus (b1b2b3b4) comprises a first one-wire data bus (b1a, b2a, b3a) and a second one-wire data bus (b1b, b2b, b3b) which is divided by the at least two bus nodes into at least two two-wire data bus sections (b1, b2, b3) with associated first one-wire data bus sections (b1a, b2a, b3a) and second one-wire data bus sections (b1b, b2b, b3b) and which is terminated by at least one bus node (B3) of the bus nodes (BS1, BS2, BS3), the terminal bus node (BS3). This method comprises the following steps:

determining a new bus node address by the bus master;
storing this bus node address in a bus node address register (BKADR) of a bus node (BS1, BS2, BS3), the bus node of interest, by the bus master (BM), wherein the bus master (BM) and the bus node of interest are connected by one or a plurality of two-wire data bus sections (b1, b2, b3) and the bus node address register (BKADR) is a data register (DR) of a modified JTAG interface or a part of a data register (DR) of a modified JTAG interface of the bus node of interest or a part of an instruction register (IR) of a modified JTAG interface of the bus node of interest, wherein a modified JTAG interface is characterized in that it comprises a JTAG test controller comprising a state diagram corresponding to the IEEE 1149 standard or one of the sub-standards of the same;
connecting one or a plurality of two-wire data bus sections (b1, b2, b3) with one or a plurality of further two-wire data bus sections (b1, b2, b3) by closing a transfer gate (TG) of the bus node of interest, whereby a storage of a bus node address in a bus node address register (BKADR) of the bus node of interest is prevented by the bus node for as long as the transfer gate (TG) is closed.

An advantageous development of the method comprises the step of storing an instruction to open a transfer gate (TG) in the instruction register (IR) or a transfer gate control register (TGCR) of the modified JTAG interface of the bus node of interest.

Suitably, a further variant of the method comprises the step of verifying the correct addressing of at least one bus node by cyclic writing and reading in particular a bypass register.

Finally, the method of the disclosure may also comprise the steps of determining the number of correctly addressable bus modes by the bus master (BM), and of comparing the number of correctly addressable bus nodes to a set number and triggering, by the bus master or a connected system, at least one signal or one measure as a function of the number.

The disclosure further proposes a method for transmitting data after the initialization of a differential two-wire data bus, comprising the following steps:

simultaneously transmitting a transmission address to all accessible bus nodes by writing transmission registers (SR) of all bus nodes by the bus master (BM) having this transmission address, wherein the respective transmission register (SR) of a respective bus node is a data register or a part of a data register or a part of an instruction register (IR) of the modified JTAG interface of this bus node, and wherein the bus node address register (BKADR) is not a part of the respective register;
comparing the transmission address in the transmission register (SR) to the bus node address in the bus node address register (BKADR) by each bus node using a predetermined comparison algorithm;
activating the transmitting capability for the respective bus node at the times provided for that purpose, if the comparison algorithm of the comparison performed before by said respective bus node results in a sufficient congruence with the combination of the bus node address stored in its bus node address register (BKADR) and the transmission address stored in its transmission register (SR), which combination is expected for the transmission permission;
deactivating the transmitting capability for the respective bus node, if the comparison algorithm of the comparison performed before by said respective bus node does not result in a sufficient congruence with the combination of the bus node address stored in its bus node address register (BKADR) and the transmission address stored in its transmission register (SR), which combination is expected for the transmission permission.

Further, according to the disclosure, a method for transmitting data after the initialization of a differential two-wire data bus is proposed, comprising the following steps:

simultaneously transmitting a transmission address to all accessible bus nodes by writing transmission registers (SR) of all bus nodes by the bus master (BM) having this transmission address, wherein the respective transmission register (SR) of a respective bus node is a data register or a part of a data register or a part of an instruction register (IR) of the modified JTAG interface of this bus node, and wherein the bus node address register (BKADR) is not a part of the respective register;
comparing the transmission address in the transmission register (SR) to the bus node address in the bus node address register (BKADR) by each bus node using a predetermined comparison algorithm;
activating the receiving capability of the respective bus node for the content of predetermined data registers of the respective bus node, if the comparison algorithm of the comparison performed before by said respective bus node results in a sufficient congruence with the combination of the bus node address stored in its bus node address register (BKADR) and the transmission address stored in its transmission register (SR), which combination is expected for the transmission permission;
deactivating the receiving capability of the respective bus node for the content of predetermined data registers of the respective bus node, if the comparison algorithm of the comparison performed before by said respective bus node does not result in a sufficient congruence with the combination of the bus node address stored in its bus node address register (BKADR) and the transmission address stored in its transmission register (SR), which combination is expected for the transmission permission.

According to the disclosure, method for transmitting data after the initialization of a differential two-wire data bus is further proposed, comprising the following steps:

simultaneously transmitting a transmission address to all accessible bus nodes by writing transmission registers (SR) of all bus nodes by the bus master (BM) having this transmission address, wherein the respective transmission register (SR) of a respective bus node is a data register or a part of a data register or a part of an instruction register (IR) of the modified JTAG interface of this bus node, and wherein the bus node address register (BKADR) is not a part of the respective register;

comparing the transmission address in the transmission register (SR) to the bus node address in the bus node address register (BKADR) by each bus node using a predetermined comparison algorithm;

activating the receiving capability of the respective bus node for the content of predetermined contents of the instruction register (IR) of the respective bus node to allow predetermined instructions for an instruction decoder (IEDC) of the modified JTAG interface of the respective bus node, if the comparison algorithm of the comparison performed before by said respective bus node results in a sufficient congruence with the combination of the bus node address stored in its bus node address register (BKADR) and the transmission address stored in its transmission register (SR), which combination is expected for the transmission permission;

deactivating the receiving capability of the respective bus node for the content of predetermined contents of the instruction register (IR) of the respective bus node for suppressing predetermined instructions for an instruction decoder (IRDC) of the modified JTAG interface of the respective bus node, if the comparison algorithm of the comparison performed before by said respective bus node does not result in a sufficient congruence with the combination of the bus node address stored in its bus node address register (BKADR) and the transmission address stored in its transmission register (SR), which combination is expected for the transmission permission.

The disclosure further relates to a two-wire data bus system with a differential two-wire data bus (b1b2b3) for the transmission of data between a bus master (BM) and between at least two bus nodes (BS1, BS2, BS3), wherein the two-wire data bus (b1b2b3) is divided into at least two two-wire data bus sections (b1, b2, b3) by the bus nodes (BS1, BS2, BS3) and is terminated by a bus node, the terminal bus node (BS3); and wherein each of the bus nodes (BS1, BS2, BS3), except for a first bus node (BS1), is connected to a preceding bus node (BS1, BS2) of the bus nodes (BS1, BS2, BS3) via a preceding two-wire data bus section (b2, b3) of the two-wire data bus sections (b1, b2, b3), and said one first bus node (BS1) is connected to the bus master (BM) via a preceding two-wire data bus section (b1) of the two-wire data bus sections (b1, b2, b3); and wherein each bus node (BS1, BS2, BS3), except for a terminal bus node (BS3), is connected to a subsequent bus node (BS3, BS4) of the bus nodes (BS1, BS2, BS3) via a subsequent two-wire data bus section (b2, b3) of the two-wire data bus sections (b1, b2, b3), and wherein it has a bus master (BM) with a master two-wire data bus interface (OWM), and wherein the master two-wire data bus interface (OWM) of the bus master (BM) is provided to bidirectionally transmit data via the two-wire data bus (b1b2b3) or at least a two-wire data bus section (b1, b2, b3) of the two-wire data bus sections (b1, b2, b3), hereinafter referred to as the two-wire data bus section (b1, b2, b3) of interest, and to receive data from the same, using a data bus protocol with more than two differential physical voltage and/or current levels, and wherein the two-wire data bus section (b1, b2, b3) of interest comprises two signal lines, and wherein a two-wire data bus interface (OWS1, OWS2, OWS3) of a bus node (BS1, BS2, BS3) of the bus nodes (BS1, BS2, BS3), hereinafter referred to as the bus node of interest, is electrically connected to the two-wire data bus section (b1, b2, b3) of interest, and wherein the two-wire data bus interface (OWS1, OWS2, OWS3) of the bus node of interest is provided to receive data via the two-wire data bus section (b1, b2, b3) of interest, using a data bus protocol with more than two differential physical voltage and/or current levels, and wherein the two-wire data bus interface (OWS1, OWS2, OWS3) of the bus node of interest is provided to transmit data via the two-wire data bus section (b1, b2, b3) of interest, using a data bus protocol with more than two differential physical voltage and/or current levels, and wherein the bus node (BS1, BS2, BS3) of interest is in turn provided with a master two-wire data bus interface (OWM1, OWM2, OWM3), and wherein the master two-wire data bus interface (OWM1, OWM2, OWM3) of the bus node (BS1, BS2, BS3) of interest is provided to bidirectionally transmit data via at least one subsequent two-wire data bus section (b2, b3) of the two-wire data bus sections (b1, b2, b3), hereinafter referred to as the subsequent two-wire data bus section (b2, b3), to a subsequent bus node (BS2, BS3) and receive data from the same, using a data bus protocol with more than two differential physical voltage and/or current levels, and wherein the bus node (BS1, BS2, BS3) of interest comprises a first bus master control register (OWMCR) configured to control the master two-wire data bus interface (OWM1, OWM2, OWM3) of the bus node (BS1, BS2, BS3) of interest, and wherein the bus master is adapted to write the bus master control register (OWMCR) of the bus node (BS1, BS2, BS3) of interest via the master two-wire data bus interface (OWM) of the bus master (BM) and the two-wire data bus (b1b2b3) or the two-wire data bus section (b1, b2, b3) of interest and the two-wire data bus interface (OWS1, OWS2, OWS3) of the bus node of interest, and to thereby control the state of the master two-wire data bus interface (OWM1, OWM2, OWM3) of the bus node (BS1, BS2, BS3) of interest.

The disclosure further relates to a method for data transmission in a two-wire data bus system with a differential two-wire data bus, comprising a differential two-wire data bus (b1b2b3) with two signal lines for the differential transmission of data between a bus master (BM) and between at least two bus nodes (BS1, BS2, BS3), wherein the two-wire data bus (b1b2b3) is divided into at least two two-wire data bus sections (b1, b2, b3) by the bus nodes (BS1, BS2, BS3) and is terminated by a bus node, the terminal bus node (BS3); and hereinafter referred to as the two-wire data bus section (b1, b2, b3) of interest, by a master two-wire data bus interface (OWM) of the bus master (BM)

wherein each of the bus nodes (BS1, BS2, BS3), except for a first bus node (BS1), is connected to a preceding bus node (BS1, BS2) of the bus nodes (BS1, BS2, BS3)

via a preceding two-wire data bus section (b2, b3) of the two-wire data bus sections (b1, b2, b3), and said one first bus node (BS1) is connected to the bus master (BM) via a preceding two-wire data bus section (b1) of the two-wire data bus sections (b1, b2, b3), and wherein each bus node (BS1, BS2, BS3), except for a terminal bus node (BS3), is connected to a subsequent bus node (BS3, BS4) of the bus nodes (BS1, BS2, BS3) via a subsequent two-wire data bus section (b2, b3) of the two-wire data bus sections (b1, b2, b3).

Further, the following is performed in this method:

bidirectionally transmitting and receiving data via the two-wire data bus (b1b2b3) or at least one two-wire data bus section (b2, b3) of the two-wire data bus sections (b1, b2, b3), hereinafter referred to as the two-wire data bus section (b1, b2, b3) of interest, by a master two-wire data bus interface (OWM) of the bus master (BM), using a data bus protocol with more than two differential physical voltage and/or current levels;

receiving data from the two-wire data bus section (b1, b2, b3) of interest by a two-wire data bus interface (OWS1, OWS2, OWS3) of a bus node of interest of the bus nodes (BS1, BS2, BS3), using a data bus protocol with more than two differential physical voltage and/or current levels;

transmitting data via the two-wire data bus section (b1, b2, b3) of interest by a two-wire data bus interface (OWS1, OWS2, OWS3) of a bus node of interest of the bus nodes (BS1, BS2, BS3), using a data bus protocol with more than two differential physical voltage and/or current levels;

bidirectionally transmitting, to a subsequent bus node (BS2, BS3), and receiving data via at least one subsequent two-wire data bus section (b2, b3) of the two-wire data bus sections (b2, b3) by a master two-wire data bus interface (OWM1, OWM2, OWM3) of the bus node of interest, using a data bus protocol with more than two differential physical voltage and/or current levels;

controlling the master two-wire data bus interface (OWM1, OWM2, OWM3) of the bus node of interest via a bus master control register (BMCR) of the bus node of interest, which is configured to be written by the bus master via the two-wire data bus (b1b2b3), if necessary.

The disclosure further comprises a device for connection as a bus node to a differential two-wire data bus (b1b2b3) of a data bus system for the transmission of illumination data for light emitting components (LED1, LED2, LED3, LED4), wherein the two-wire data bus (b1b2b3) comprises a plurality of two-wire data bus sections (b1, b2, b3) divided by bus nodes, and wherein the device is provided with a housing (GH), wherein the housing (GH) comprises at least two rows of connectors, namely a first row of connectors (GND, b1a, b1b, $V_{bat}$) and a second row of connectors (GND, b2a, b2b, $V_{bat}$), wherein at least these at least two rows of connectors are arranged opposite each other on the housing (GH), wherein each of the rows of connectors comprises a supply potential connector for a first, in particular negative supply potential (GND) and a connector for a second, in particular positive supply potential ($V_{bat}$), wherein both the connector for the first supply potential (GND) of the first row of connectors (GND, b1a, b1b, $V_{bat}$) with the connector for the first supply potential (GND) of the second row of connectors (GND, b2a, b2b, $V_{bat}$), and the connector for the second supply potential ($V_{bat}$) of the first row of connectors (GND, b1a, b1b, $V_{bat}$) with the connector for the second supply potential ($V_{bat}$) of the second row of connectors (GND, b2a, b2b, $V_{bat}$) are each connected without intersection, wherein the first row of connectors (GND, b1a, b1b, $V_{bat}$) has two bus connectors (b1a, b1b) for a two-wire data bus (b1) preceding the bus node, which are arranged between the connector for the first supply potential (GND) and the supply potential connector for the second supply potential ($V_{bat}$), wherein the second row of connectors (GND, b2a, b2b, $V_{bat}$) has two battery connectors (b2a, b2b) for a two-wire data bus (b2) succeeding the bus node, which are arranged between the connector for the first supply potential (GND) and the connector for the second supply potential ($V_{bat}$), and wherein each row of connectors comprises at least one connector for connection with a light emitting component (LED1, LED2, LED3, LED4), which is positioned adjacent to the connector for the first supply potential (GND) of the respective row of connectors, namely to the side of the connector for the first supply potential (GND) of the respective row of connectors opposite the bus connectors (b1a, b1b, b2a, b2b).

Finally, the disclosure comprises a device for connection as a bus node to a differential two-wire data bus (b1b2b3) of a data bus system for the transmission of illumination data for light emitting components (LED1, LED2, LED3, LED4), wherein the two-wire data bus (b1b2b3) comprises a plurality of two-wire data bus sections (b1, b2, b3) divided by bus nodes, and wherein the device is provided with a housing (GH), wherein the housing (GH) comprises at least two rows of connectors, namely a first row of connectors (GND, b1a, b1b, $V_{bat}$) and a second row of connectors (GND, b2a, b2b, $V_{bat}$), wherein at least these at least two rows of connectors are arranged opposite each other on the housing (GH), wherein each of the rows of connectors comprises a supply potential connector for a first, in particular negative supply potential (GND) and a connector for a second, in particular positive supply potential ($V_{bat}$), wherein both the connector for the first supply potential (GND) of the first row of connectors (GND, b1a, b1b, $V_{bat}$) with the connector for the first supply potential (GND) of the second row of connectors (GND, b2a, b2b, $V_{bat}$), and the connector for the second supply potential ($V_{bat}$) of the first row of connectors (GND, b1a, b1b, $V_{bat}$) with the connector for the second supply potential ($V_{bat}$) of the second row of connectors (GND, b2a, b2b, $V_{bat}$) are each connected without intersection, wherein the first row of connectors (GND, b1a, b1b, $V_{bat}$) has two bus connectors (b1a, b1b) for a two-wire data bus (b1) preceding the bus node, which are arranged between the connector for the first supply potential (GND) and the supply potential connector for the second supply potential ($V_{bat}$), and wherein the second row of connectors (GND, b2a, b2b, $V_{bat}$) has two battery connectors (b2a, b2b) for a two-wire data bus (b2) succeeding the bus node, which are arranged between the connector for the first supply potential (GND) and the connector for the second supply potential ($V_{bat}$), and at least one light emitting components (LED1, LED2, LED3, LED4),
wherein the light emitting components (LED1, LED2, LED3, LED4) is arranged in a recess (ASP) of a housing (GH) or on the housing (GH).

In both of the above-mentioned devices, at least three sets of light emitting components (LED1, LED2, LED3) may be provided, each having at least one light emitting component (LED1, LED2, LED3), which are arranged either outside the housing (GH) or in the recess (ASP) of the recess (GH) and/or on the housing (GH), wherein the at least one light emitting component (LED1, LED2, LED3) of each set of light emitting components (LED1, LED2, LED3) has a color different from the luminous color of the respective at least one light emitting component (LED1, LED2, LED3) of any other set of light emitting components (LED1, LED2, LED3).

Further, at least two sets of light emitting components (LED1, LED2, LED3, LED4), each having one light emitting component (LED1, LED2, LED3, LED4), or by at least three sets of light emitting components (LED1, LED2, LED3, LED4), each having one light emitting component (LED1, LED2, LED3, LED4), may be provided, wherein the brightness of the at least one light emitting component (LED1, LED2, LED3, LED4) of one set of light emitting components (LED1, LED2, LED3, LED4), respectively, is configured to be set differently from the at least one light emitting component (LED1, LED2, LED3, LED4) of any other set of light emitting components (LED1, LED2, LED3, LED4) by adjusting the luminosity in dependence on the data content of an illumination register (ILR).

The disclosure further comprises a device for connection as a bus node to a differential two-wire data bus (b1b2b3) of a data bus system for the transmission of illumination data for light emitting components (LED1, LED2, LED3, LED4), wherein the two-wire data bus (b1b2b3) comprises a plurality of two-wire data bus sections (b1, b2, b3) divided by bus nodes, and wherein the device is provided with
  a housing (GH),
  wherein the housing (GH) comprises at least three rows of connectors, namely a first row of connectors ($V_{bat}$, b1a, b1b) and a second row of connectors (GND, b2a, b2b) and a third row of connectors ($V_{bat}$, b3a, b3b) and possibly a fourth row of connectors (GND, b4a, b4b),
  wherein each of the three or four rows of connectors has at least one adjacent row of connectors on the housing (GH), which is arranged at an angle, in particular an acute angle or an obtuse angle or an angle of 90° with respect to said row of connectors,
  wherein each row of connectors has a connector for either a first, in particular negative supply potential (GND) or a second, in particular positive supply potential ($V_{bat}$),
  wherein, of two adjacent rows of connectors of the housing (GH) one row of connectors has a connector for the first supply potential (GND) and the other row of connectors has a connector for the second supply potential ($V_{bat}$),
  wherein, with respect to a clockwise or counter-clockwise counting direction, the respective supply potential connector of all rows of connectors of the housing (GH) is the first connector of the row of connectors, respectively,
  wherein each row of connectors comprises two bus connectors (b1a, b1b, b2a, b2b, b3a, b3b, b4a, b4b) for one respective two-wire data bus section (b1, b2, b3),
  wherein the two bus connectors (b1a, b1b, b2a, b2b, b3a, b3b, b4a, b4b) for a two-wire data bus section (b1, b2, b3) are situated adjacent to the supply potential connector of the respective row of connectors, and
  at least one light emitting component (LED1, LED2, LED3),
  wherein the at least one light emitting component (LED1, LED2, LED3 is arranged in a recess (ASP) of a housing (GH) or on the housing (GH).

In such a device or another of the above-mentioned devices of the present disclosure an electrically conductive mounting element (lead frame) for leading contact fields of a die out of the housing (GH) may be provided, the die being embedded in the housing (GH) and comprising an IC circuit, wherein the housing (GH) has two opposite rows of connectors, each of which has a supply potential connector for either the first supply potential (GND) or the second supply potential ($V_{bat}$), and wherein the supply potential connectors of these two rows of connectors are connected with each other in an electrically conductive manner by the mounting element (lead frame).

It is further possible that the mounting element (lead frame) has a support member (die paddle) supporting the die, and that the support member connects the two supply potential connectors for the first supply potential (GND) or the second supply potential ($V_{bat}$) of said two opposite rows of connectors in an electrically conductive manner.

In this development of the disclosure it is provided that either the $V_{bat}$ connectors of each housing or the GND connectors of each housing are connected to each other via the die paddle of the lead frame. The respective other supply potential connectors (GND or $V_{bat}$) are connected via a conductor path formed in the die or via a conductor path formed on a PCB on which the die is located.

The disclosure also comprises a device for connection as a bus node to a differential two-wire data bus (b1b2b3) of a data bus system for the transmission of illumination data for light emitting components (LED1, LED2, LED3, LED4), wherein the two-wire data bus (b1b2b3) comprises a plurality of two-wire data bus sections (b1, b2, b3) divided by bus nodes, and wherein the device is provided with
  a housing (GH),
  bus connectors (b1a, b1b, b2a, b2b) wherein the bus connectors (b1a, b1b, b2a, b2b) are arranged between a supply potential connector for a first, in particular negative supply potential (GND) and a supply potential connector for a second, in particular positive supply potential ($V_{bat}$),
  at least one light emitting component (LED1, LED2, LED3),
  an illumination register (ILR) configured to be operated by signals to be applied to the bus connectors (b1a, b1b, b2a, b2b), and
  means for operating the light emitting components (LED1, LED2, LED3), wherein the brightness and/or the color of the light emitted by the at least one light emitting component (LED1, LED2, LED3) depends on the content of the illumination register (ILR).

In this case, at least three sets of light emitting components (LED1, LED2, LED3) may be provided, each having at least one light emitting component (LED1, LED2, LED3), which are arranged either outside the housing (GH) or in the recess (ASP) of the recess (GH) and/or on the housing (GH), wherein the at least one light emitting component (LED1, LED2, LED3) of each set of light emitting components (LED1, LED2, LED3) has a color different from the luminous color of the respective at least one light emitting component (LED1, LED2, LED3) of any other set of light emitting components (LED1, LED2, LED3).

Further, at least two sets of light emitting components (LED1, LED2, LED3, LED4), each having one light emitting component (LED1, LED2, LED3, LED4), or by at least three sets of light emitting components (LED1, LED2, LED3, LED4), each having one light emitting component (LED1, LED2, LED3, LED4), may be provided, wherein the brightness of the at least one light emitting component (LED1, LED2, LED3, LED4) of one set of light emitting components (LED1, LED2, LED3, LED4), respectively, is configured to be set differently from the at least one light emitting component (LED1, LED2, LED3, LED4) of any other set of light emitting components (LED1, LED2, LED3, LED4) by adjusting the luminosity in dependence on the data content of an illumination register (ILR).

DESCRIPTION

According to the disclosure, it has been found that a two-wire data bus formed by two one-wire test buses, as they are described together with the associated operating method e.g. in the documents DE-B-10 2015 004 433, DE-B-10 2015 004 434, DE-B-10 2015 004 435 and DE-B-10 2015 004 436, the contents of which are incorporated into the subject matter of the present application by reference, is particularly suitable for the transmission of such data, specifically for the control of the light emitting components of light strips, if each bus node comprises a suitable sub-device for bidirectional relay. The use of a differential multi-level JTAG bus for the control of the energy supply is already addressed in the documents DE-B-10 2016 100 837, DE-B-10 2016 100 838, DE-B-10 2016 100 839, DE-B-10 2016 100 840, DE-B-10 2016 100 841, DE-B-10 2016 100 842, DE-B-10 2016 100 843, DE-B-10 2016 100 845, DE-B-10 2016 100 847 and DE-B-10 2016 101 181, the contents of which are incorporated into the subject matter of the present application by reference.

In contrast to the subject matter of DE-B-10 2015 004 433, DE-B-10 2015 004 434, DE-B-10 2015 004 435 and DE-B-10 2015 004 436, however, useful data, in particular for illumination control, are now transmitted differentially, instead of test data. This allows for a substantially higher data transmission rate at lower EMV radiation. In contrast to the known CAN protocol, the data clock is transmitted along, whereby a complicated reconstruction of the data clock in the bus nodes becomes superfluous, and thus considerably reduces the costs of the transceivers in the bus nodes ($BS_1$ to $BS_n$). Further, also the test bus disclosed in DE-B-10 2015 004 433, DE-B-10 2015 004 434, DE-B-10 2015 004 435 and DE-B-10 2015 004 436 is designed only for a point-to-point connection. Thus, it is necessary on the one hand to modify this test bus such that a plurality of bus slaves can be controlled and operated as bus nodes and, on the other hand, to modify the test bus such that it can be operated at a higher data rate. The latter is achieved by using a two-wire data bus of two one-wire data busses. According to the disclosure, the control data are written into and/or read from a special data register (DR) of a JTAG interface via the two-wire data bus.

In contrast to the documents DE-B-10 2016 100 837, DE-B-10 2016 100 838, DE-B-10 2016 100 839, DE-B-10 2016 100 840, DE-B-10 2016 100 841, DE-B-10 2016 100 842, DE-B-10 2016 100 843, DE-B-10 2016 100 845, DE-B-10 2016 100 847 and DE-B-10 2016 101 181, it is thus possible, according to the claimed technical teaching of the present disclosure, to achieve a higher speed in transmitting the illumination data to the bus nodes.

The central idea of the disclosure is the complementary modulation of the two one-wire data buses. This reduces the EVM radiation and a higher data transmission speed can be achieved thereby.

The above-mentioned object, as well as other objects are achieved, according to the present disclosure, by providing an interface unit comprising a JTAG interface which is configured to exchange time-division multiplexed signals with the integrated circuit in chronological sequence, using an interface means, and which can be controlled via a two-wire data bus. The signals are formatted such that all information required by the JTAG interface to control the data stream and to set the illumination parameters of the connected light emitting components, are transmitted serially and with differential signals via this interface. Here, all data values of the JTAG boundary protocol are transmitted as a differential signal in time slots provided for that purpose. Besides the time-division multiplexing of the JTAG control signals, the interface unit of the disclosure uses three different differential voltage value ranges ($V_{B1}$, $V_{B2}$, $V_{B3}$) for the differential voltage signal and the differential voltage level (TOW) on the differential two-wire data bus (cf. FIG. 2) to transmit 1. at least the data of the serial test data input TDI and
2. at least the data of the one serial test data output TDo and
3. at least the control data of the test mode input TMS for controlling the test controller of the integrated circuit and
4. at least the test clock for supplying the test controller with its test system clock TCK and
5. an optional test reset signal.

In contrast to the patent literature mentioned above, FIG. 2 shows the differential and not the absolute levels.

The disclosure thus primarily relates to a bidirectional differential data bus with a two-wire data bus (b1b2b3b4) formed by two one-wire data buses (b1a, b2a, b3a, b4a; b1b, b2b, b3b, b4b) between a first sub-device, i.e. the bus master (BM), and at least two further sub-devices, i.e. the bus nodes (BS1, BS2, BS3) (cf. FIG. 6). Here, the bus node is identical with the above-mentioned integrated circuit for controlling light emitting components, whose states are to be controlled or changed, using PWM in the broadest sense. Of course, the bidirectional differential data bus described in this disclosure is also suitable for controlling other consumers of electric energy. This bidirectional differential data bus preferably comprises only one ground line (GND) and a first single data line in the form of a first one-wire data bus (b1a, b2a, b3a, b4a) of the two-wire data bus (b1a, b2a, b3a, b4a; b1b, b2b, b3b, b4b) and a second single data line in the form of a second one-wire data bus (b1b, b2b, b3b, b4b) of the two-wire data bus (b1a, b2a, b3a, b4a; b1b, b2b, b3b, b4b). The two-wire data bus (b1a, b2a, b3a, b4a; b1b, b2b, b3b, b4b), and thus the first one-wire data bus (b1a, b2a, b3a, b4a) and the second one-wire data bus (b1b, b2b, b3b, b4b), is divided into different two-wire data bus sections (b1, b2, b3) by the bus nodes (BS1, BS2, BS3), wherein the first one-wire data bus of the two-wire data bus is divided into corresponding one-wire data bus sections (b1a, b2a, b3a, b4a) and the second one-wire data bus of the two-wire data bus is also divided into corresponding one-wire data bus sections (b1b, b2b, b3b, b4b). The first and the second one-wire data bus sections of a two-wire data bus section are each advantageously designed like the one-wire data bus section in DE-B-10 2016 100 837, DE-B-10 2016 100 838, DE-B-10 2016 100 839, DE-B-10 2016 100 840, DE-B-10 2016 100 841, DE-B-10 2016 100 842, DE-B-10 2016 100 843, DE-B-10 2016 100 845, DE-B-10 2016 100 847 and DE-B-10 2016 101 181. Thereby, the bus node (BS1, BS2, BS3) require only two pairs of additional electric connectors. To be able both to send data into one of the bus nodes (BS1, BS2, BS3), hereinafter referred to as the bus node of interest, from the nus master (BM) and to read out data from the relevant bus node to the bus master (BM), the data can be transmitted bidirectionally via the two-wire data bus (b1b2b3). Here, the data are transmitted complementarily on the first one-wire data bus and the second one-wire data bus of the two-wire data bus (b1b2b3). This means that, in contrast to the above-mentioned groups of documents, it is not the potential of a single, i.e. the first or the second one-wire data bus line that is evaluated with respect to a reference potential, but the potential difference between the first one-wire data bus line (b1a, b2a, b3a, b4a) and the second one-wire data bus line (b1b, b2b, b3b, b4b) of the two-wire data bus (b1b2b3b4). Hereinafter, this potential difference is also referred to as a differential level (TOW). For the rest, the method and the devices used for the first and the second one-wire data bus preferably correspond to those of the documents mentioned above.

Now, the problem arises that besides the data transmission, also a synchronization signal has to be transmitted in a differential manner. For this purpose, in addition, the system clock is transmitted by a clock signal, the TCK signal, from the bus master (BM) to the bus nodes (BS1, BS2, BS3) via the two-wire data bus (b1b2b3). To make this communication possible, the bus nodes (BS1, BS2, BS3) comprise a first means that compares the differential signal level (TOW) on the first one-wire data bus (b1a, b2a, b3a) and the second one-wire data bus (b1b, b2b, b3b) of the two-wire data bus (b1b2b3) to a third threshold value ($V_{2H}$) (see also FIG. 9). For this purpose, the differential signal level (TOW) is preferably detected by a second differential input amplifier (V2) of the respective two-wire data bus interface (OWSn) of the relevant bus node (BSn) of interest and converted into a differential level signal (DPS). A third comparator (cmp3) of the respective two-wire data bus interface (OWSn) of the relevant bus node (BSn) of interest compares the differential signal level (TOW) on the two-wire data bus of the two-wire data bus section (bn) preceding the bus node (BSn) of interest, which level is in the form of the value of the differential level signal (DPSn) of the bus node (BSn) of interest, to the value of a third threshold value signal, i.e. the third threshold value ($V_{2H}$). Besides, the bus node (BSn) of interest further comprises a second means that compares the differential signal level (TOW) on the two-wire data bus of the two-wire data bus section (bn) preceding the bus node (BSn) of interest, which level is in the form of the value of the differential level signal (DPS), to a second threshold value ($V_{2L}$). A second comparator (cmp2) of the respective two-wire data bus interface (OWSn) of the relevant bus node (BSn) of interest compares the differential signal level (TOW) on the two-wire data bus of the two-wire data bus section (bn) preceding the bus node (BSn) of interest, which level is in the form of the value of the differential level signal (DPS), to the value of a second threshold value ($V_{2L}$). If the third threshold value ($V_{2H}$) differs from the second threshold value ($V_{2L}$), and if the threshold values ($V_{2L}$, $V_{2H}$) fall within the supply voltage range, these two threshold values ($V_{2H}$, $V_{2L}$) define and set three voltage value ranges ($V_{B1}$, $V_{B2}$, $V_{B3}$) for the value of the level signal (DPS) of the respective bus node that detects the differential voltage on the two-wire data bus. Here, the second and third comparators (cmp2, cmp3) on the side of the bus node measure which voltage value range ($V_{B1}$, $V_{B2}$, $V_{B3}$) the amount of the differential signal level (TOW) of the two-wire data bus (b1b2b3) or the two-wire data bus section (b1, b2, b3) of the two-wire data bus (b1b2b3), respectively connected to the relevant bus node (BSn), presently is in. The second and third threshold values ($V_{2L}$, $V_{2H}$) thus define said three signal voltage value ranges ($V_{B1}$, $V_{B2}$, $V_{B3}$) for the level signal (DPS) and thus define three voltage ranges for the differential signal level (TOW) on the two-wire data bus (b1b2b3). The second amplifier (V2) and the first amplifier (V1) explained later are preferably designed such they reduce the maximum differential amplitude to be expected on the preceding two-wire data bus section (bn) to a value less than one time the absolute value of the supply voltage ($V_{bat}$) to the second reference potential (GND). It should be noted that, due to the differential nature of the bus, the absolute value of the maximum level amplitude of the differential signal level (TOW) can be twice the absolute value of the operating voltage ($V_{bat}$) of the bus node. For the sake of clarity, the middle voltage value range is referred to as the second voltage value range ($V_{B2}$). The same is limited in the downward direction by a first voltage value range ($V_{B1}$). It is deliberately left undefined, whether the first voltage value range ($V_{B1}$) is a voltage range with voltages that are more positive or more negative than the voltages of the middle, second voltage value range ($V_{B2}$), since the system also works with the voltage polarities inverted. At the same time, the second voltage value range ($V_{B2}$) is correspondingly limited to the other voltage side, i.e. in the upward direction, opposite to the first voltage value range ($V_{B1}$), by a third voltage value range ($V_{B3}$). (See FIG. 3).

For transmitting the data from the bus master (BM), i.e. the host processor, to a bus node (BS1, BS2, BS3), data are transmitted in at least three successive time slots (TIN0, TIN1, TDO$_z$) by the bus master (BM) or the relevant bus node (BS1, BS2, BS3) via the two-wire data bus (b1b2b3) or the two-wire data bus section of the two-wire data bus section (b1, b2, b3) connected to the bus node (BS1, BS2, BS3), see FIG. 5 and FIG. 6. Which device is authorized to transmit is defined by the chronological position of the respective time slot (TIN0, TIN1, TDO$_z$), as well as by the content of the respective bus node address registers (BKADR) of the respective bus nodes (BS1, BS2, BS3) and the transmission address of the respective bus node (BS1, BS2, BS3) previously sent to the respective bus node (BS1, BS2, BS3) by the bus master (BM). Here, typically, two time slots (TIN0, TIN1) are allocated to the bus master (BM), and one time slot (TDO$_z$) in the package of the three successive time slots (TIN0, TIN1, TDO$_z$) is typically allocated for transmission purposes. Which bus nodes (BS1, BS2, BS3) among the bus nodes (BS1, BS2, BS3) are allowed to transmit in the corresponding bus node transmission time slot (TDO$_z$) is determined, according to the disclosure, by a datum, i.e. the transmission address of the respective bus node (BS1, BS2, BS3), which is transmitted to and stored by the bus master (BM) simultaneously in all transmission registers (SR) of all reachable bus nodes (BS1, BS2, BS3) whose preceding two-wire data bus sections currently allow for a connection to the bus master (BM). All bus nodes (BS1, BS2, BS3) compare this transmission address in their respective transmission registers (SR) to an own bus node address stored in their bus node address registers (BKADR) during the initialization of the bus, and transmit in the bus node transmission time slot (TDO$_z$) only, if the transmitted transmission address in their transmission register (SR) corresponds to the own stored bus node address (BKADR) and then only at the predetermined times. In this context, the relative position of the time slot within the package of at least three time slots (TIN0, TIN1, TDO$_z$) preferably, but not necessarily, always the same for all bus nodes (BS1, BS2, BS3). It is particularly preferred that the first time slot (TIN0) and the second time slot (TIN1) include a check datum and/or a first datum transmitted by the bus master (BM) to the bus nodes (BS1, BS2, BS3), wherein the check datum and the first datum should in particular and preferably be compatible with the data of the IEEE 1149.1 4 wire test data bus, and wherein the bus nodes (BS1, BS2, BS3) receive the check datum and the first datum. In this manner, it is possible to transmit e.g. bus node addresses, transmission addresses and illumination values etc.

In contrast to prior art, however, in the third time slot, i.e. the bus node transmission time slot ($TDO_z$), the datum is transmitted from the relevant bus node ($BS_n$) to the bus master (BM) only in the second and the third voltage value range ($V_{B2}$ and $V_{B3}$) and not in the first voltage value range ($V_{B1}$), if the transmission address transmitted and stored in the transmission register (SR) of the JATG interface of the bus node corresponds to the stored bus node address of the bus node ($BS_n$) of interest stored in the bus node address register (BKADR) of the bus node ($BS_n$) of interest during the initialization of the bus. The bus node ($BS_n$) of interest comprises said address register (BKADRn) as the data register (DRn) of its JTAG interface. Thus, according to the disclosure, the third time slot, i.e. the bus node transmission time slot ($TDO_z$), contains a second datum that is transmitted from the relevant bus node ($BS_n$) to the bus master (BM), and wherein the bus master (BM) receives this second datum from the relevant bus node ($BS_n$), and wherein the second datum is transmitted by the relevant bus node ($BS_n$) only in the second voltage value range ($V_{B2}$) and the third voltage value range ($V_{B3}$). At the same time, the clock is transmitted by the bus master (BM) in each time slot (TIN0, TIN1, $TDO_z$), see FIG. 5. Here, the clock signal (TCK) is signalized by a clock signal that varies between the first voltage value range ($V_{B1}$) in a first half-clock period of the at least two half-clock periods ($T_{1H}$, $T_{2H}$) of a time slot of a system base clock period (T) on the one hand, and the second voltage value range ($V_{B2}$) or the third voltage value range ($V_{B3}$) in the second half-clock period of the at least two half-clock periods ($T_{1H}$, $T_{2H}$) of a time slot of a system base clock period (T) on the other hand. The clock signal can be detected based on the transition of the amount of the differential voltage on the two-wire data bus (b1b2b3) or on a connected two-wire data bus section (b1, b2, b3) from the second voltage value range ($V_{B2}$) or the third voltage value range ($V_{B3}$) to the first voltage value range ($V_{B1}$). The intersection of the corresponding threshold voltage of the second threshold value ($V_{2L}$) can be detected by the associated second comparator (comp2, see FIG. 9), which is an analog device. Thus, it becomes possible to reliably extract the system clock (TCK) on the side of the relevant bus node ($BS_n$), i.e. on the side of the integrated circuit. Here, in comparison to the structure of the impression of the other signals, the structure of the clock impression has been chosen according to the disclosure such that the clock transmitter on the side of the bus master (BM) can overwrite all other level sources that may be active in parallel on the two-wire data line. In reality, it may therefore be necessary to provide external larger transistors for impressing the clock on the two-wire data bus (b1b2b3) r on a connected two-wire data bus section (b1, b2, b3) of the two-wire data bus (b1b2b3), to be able to supply a clock to as many bus nodes (BS1, BS2, BS3) as possible. These externals transistors should be chosen such that they can overwrite all bus node current sources while the same are active.

In a particular example, such a data bus system is characterized in that three logical states are used in the bidirectional transmission of the data on the two-wire data bus (b1b2b3) or on a connected two-wire data bus section (b1, b2, b3) of the two-wire data bus (b1b2b3) by the bus master (BM) and the bus node (BS1, BS2, BS3), wherein these logical states have a hierarchy. A clock state, in this case the state in which the amount of the differential signal level (TOW) of the two-wire data bus (b1b2b3) or on a connected two-wire data bus section (b1, b2, b3) of the two-wire data bus (b1b2b3) is in the first voltage value range ($V_{B1}$), has the highest priority and cannot be overwritten by other transmission devices, e.g. those of the bus nodes (BS1, BS2, BS3). Thereby, it is ensured that the bus master (BM) and the bus nodes (BS1, BS2, BS3) can always operate synchronously, at least with respect to that bus clock. This is a substantial advantage, e.g. over a CAN bus, where a complex clock recovery is required in the bus nodes. In order to be able to obtain this first logical state, in which the amount of the differential signal level (TOW) of the two-wire data bus (b1b2b3) or on a connected two-wire data bus section (b1, b2, b3) of the two-wire data bus (b1b2b3) is forced into the first voltage value range ($V_{B1}$), the master two-wire data bus interface (OWM) of the bus master (BM) preferably comprises a first dominant switch in the form of a first transistor (T1a), see FIG. 8, for controlling the first one-wire data bus (b1a, b2a, b3a, b4a) of the two-wire data bus (b1b2b3) e.g. to a first reference potential, i.e. the supply voltage ($V_{bat}$), which transistor short-circuits the first one-wire data bus (b1a, b2a, b3a, b4a) of the two-wire data bus (b1b2b3) at a relatively low resistance in the associated half-clock periods of the at least two half-clock periods ($T_{1H}$, $T_{2H}$) of the respective time slot of the respective system base clock period (T), see FIG. 8. Further, the master two-wire data bus interface (OWM) of the bus master (BM) preferably has a second dominant switch in the form of a first transistor (T1b), see FIG. 8, for controlling the second one-wire data bus (b1b, b2b, b3b, b4b) of the two-wire data bus (b1b2b3) e.g. to a second reference potential (GND), preferably opposite to the first reference potential in terms of voltage, which transistor short-circuits the second one-wire data bus (b1b, b2b, b3b, b4b) of the two-wire data bus (b1b2b3) at a relatively low resistance in the associated half-clock periods of the at least two half-clock periods ($T_{1H}$, $T_{2H}$) of the respective time slot of the respective system base clock period (T), see FIG. 8. This periodic short-circuit of the respective one-wire data bus to one of the reference voltages (lines $V_{bat}$, GND) can thus no longer be overwritten by other transmitters, in particular those of the bus nodes (BS1, BS2, BS3), if their internal resistance is higher than that of the two dominant first transistors (T1a, T1b) in the master two-wire data bus interface (OWM). A first voltage divider is formed by a first voltage divider resistor ($R_{1a}$) to a voltage, e.g. the positive supply voltage ($V_{bat}$), and a second voltage divider resistor ($R_{2a}$) to another voltage, e.g. the second reference potential (GND). A second voltage divider is formed by a further first voltage divider resistor ($R_{1b}$) to the above-mentioned voltage, e.g. the positive supply voltage ($V_{bat}$), and a further second voltage divider resistor ($R_{2b}$) to another voltage, e.g. the second reference potential (GND). The first voltage divider and the second voltage divider together keep the amount of the differential signal level (TOW) of the two-wire data bus (b1b2b3) or on a connected two-wire data bus section (b1, b2, b3) of the two-wire data bus (b1b2b3) in the second voltage value range ($V_{B2}$) or return this amount into this second voltage value range ($V_{B2}$), if none of the other transmitters (T1a, T2a, T3a, T1b, T2b, T3b) of the bus master (BM) or of the bus nodes (BS1, BS2, BS3) transmits.

For transmitting data, the amount of the differential signal level (TOW) of the two-wire data bus (b1b2b3) or on a connected two-wire data bus section (b1, b2, b3) of the two-wire data bus (b1b2b3) is transposed by the transmitters (T1a, T2a, T3a, T1b, T2b, T3b) of the bus master (BM) and/or of the bus nodes (BS1, BS2, BS3) from the second voltage value range ($V_{B2}$) to the third voltage value range ($V_{B3}$), if a logical value is to be transmitted that is opposite to the logical data value of the second voltage value range ($V_{B2}$). For this purpose, the respective transmitting unit, i.e. the bus master (BM) or the respective bus nodes (BS1, BS2, BS3), each inject current into the respective one-wire data bus of the two-wire data bus (b1b2b3) or the respective connected two-wire data bus section (b1, b2, b3) of the two-wire data bus (b1b2b3). These two injected currents cause a changed voltage drop across the voltage divider resistors ($R_{1a}$, $R_{2a}$; $R_{1b+}$, $R_{1b}$). Given a suitable polarity of the injected current, the amount of the differential signal level (TOW) of the two-wire data bus (b1b2b3) or on a connected two-wire data bus section (b1, b2, b3) of the two-wire data bus (b1b2b3) is shifted from the second voltage value range ($V_{B2}$) to the third voltage value range ($V_{B3}$). If a simultaneous transmission by such a data stream and a simultaneous closing of the dominant switches (T1a, T1b) should occur, the dominant switches (T1a, T1b), given they are designed to be of a sufficiently low resistance, as provided by the disclosure, will discharge the transmission current of the respective transmitter and will thus overwrite the amount of this differential signal level (TOW) and possibly also the differential signal level (TOW) generated by the voltage dividers ($R_{1a}$, $R_1$, $R_{2a}$, $R_{2b}$). However, other than in prior art, the possibility of a short-circuit does not exist. In particular, there a short-circuit between the bus node side and the bus mater transmitter, known from US-A-2007/0033465, will not occur. Thus, it is a particular feature of the device that a second one of the three logical states on the two-wire data bus is generated by two first switchable current sources, preferably realized as a second transistor (T2a) and a further second transistor (T2b) (see FIG. 8), in the bus master (BM) and/or by two further switchable current sources, preferably realized as a third transistor (T3a) and a further third transistor (T3b) (see FIG. 9), and is not generated by two voltage sources. At the same time, in one example, a third of the three logical states on the data bus is generated by the above described differential pull circuit ($R_{1a+}$, $R_{2a}$; $R_{1b}$, $R_{1b}$) in the form of a first and a second voltage divider. Of course, other possibilities are also conceivable for such a differential pull circuit. Basically, the differential pull circuit in the form of two ($R_{1a+}$, $R_{2a}$; $R_{1b}$, $R_{1b}$) is a differential voltage source consisting of two voltage sources, which applies a second differential voltage to the two one-wire data lines of the two-wire data line, the amount of which being within the second voltage value range ($V_{B2}$). This differential voltage source has a respective internal resistance in each of its voltage sources, which is so high that the possible respective output current of the respective voltage source is restricted such that the switched current sources (T2a, T2b) and (T3a, T3b) each supply a greater current than these differential pull circuits ($R_{1a}$, $R_{2a}$, $R_{1b}$, $R_{1b}$) can discharge. Thus, a clear hierarchy is obtained:

The switching state of the dominating switches (T1a, T1b) of the bus master (BM) dominate first, succeeded by, as the second in the hierarchy of the voltage-determining elements for the differential voltage on the two-wire data bus (b1b2b3) or on the respective connected two-wire data bus section (b1, b2, b3) of the two-wire data bus (b1b2b3), the switched current sources of the bus master (T2a, T2b) and of the relevant bus node (T3a, T3b), which are typically all equal, and as the third and last, having the lowest priority of the differential pull circuits, in this instance in the form of the voltage dividers ($R_{1a}$, $R_{2a}$; $R_{1b}$, $R_{1b}$), which are typically provided only once per two-wire data bus section.

Preferably, the first logical state corresponds to a first differential voltage value level ($-V_{IO}$) in the first voltage value range ($V_{B1}$) on the two-wire data bus (b1b2b3) or on a connected two-wire data bus section (b1, b2, b3) of the two-wire data bus (b1b2b3), the second logical state corresponds to a medium second differential voltage value level ($V_M$) in the second voltage value range ($V_{B2}$) on the two-wire data bus (b1b2b3) or on a connected two-wire data bus section (b1, b2, b3) of the two-wire data bus (b1b2b3), and the third logical state corresponds to a third differential voltage value level ($V_{IO}$) in the third voltage value range ($V_{B3}$) on the two-wire data bus (b1b2b3) or on a connected two-wire data bus section (b1, b2, b3) of the two-wire data bus (b1b2b3), see FIG. 3 bottom.

Advantageously, the second logical state is used to transmit a first logical state, e.g. "low", of a data signal and the third logical state on the two-wire data bus (b1b2b3) or on a connected two-wire data bus section (b1, b2, b3) of the two-wire data bus (b1b2b3) is sued for the transmission of a second logical state, e.g. "high", of the data signal. If the two-wire data bus line is in the first logical state, the same is ignored for the purposes of data transmission.

According to the disclosure, the first logical state on the two-wire data bus (b1b2b3) or on a connected two-wire data bus section (b1, b2, b3) of the two-wire data bus (b1b2b3) is used to transmit a first logical state, e.g. "low", of a system clock signal, and the third or the second logical state on the two-wire data bus (b1b2b3) or on a connected two-wire data bus section (b1, b2, b3) of the two-wire data bus (b1b2b3) is used to transmit a second logical state, e.g. "high", of the system clock signal. If the logical state on the two-wire data bus (b1b2b3) or on a connected two-wire data bus section (b1, b2, b3) of the two-wire data bus (b1b2b3) changes between the second or third logical state on the two-wire data bus (b1b2b3) or on a connected two-wire data bus section (b1, b2, b3) of the two-wire data bus (b1b2b3), this change is ignored for the purposes of transmitting the system clock and is typically further interpreted as a second logical state, e.g. "high".

Accordingly, in one example, the technology disclosed is a differential data bus system with a first one-wire data bus (b1a, b2a, b3a, b4a) and a second one-wire data bus (b1b, b2b, b3b, b4b) of a two-wire data bus (b1b2b3) for the transmission of data between a bus master (BM) and at least two bus nodes (BS1, BS2, BS3), in particular to bus nodes of light emitting components. Here, the first one-wire data bus (b1a, b2a, b3a, b4a) and the second one-wire data bus (b1b, b2b, b3b, b4b) of the two-wire data bus (b1b2b3) are respectively divided by the bus nodes (BS1, BS2, BS3) into at least two two-wire data bus sections (b1, b2, b3), each having at least two one-wire data bus sections of the associated two one-wire data buses. The two-wire data bus is terminated by a bus node, the so-called terminal bus node (BS3). Each of the bus nodes (BS2, BS3), except for the first bus node (BS1), is connected to a preceding bus node (BS1, BS2) of the bus nodes (BS1, BS2, BS3) via a preceding two-wire data bus section (b2, b3) of the two-wire data bus sections (b1, b2, b3), each formed by two one-wire data bus sections. The first bus node (BS1) is connected to the bus master (BM) via a preceding first two-wire data bus section (b1) of the two-wire data bus sections (b1, b2, b3). Each bus node (BS1, BS2), except for a terminal bus node (BS3), is connected to a succeeding bus node (BS2, BS3) of the bus nodes (BS1, BS2, BS3) via a succeeding two-wire data bus section (b2, b3) of the two-wire data bus sections (b1, b2, b3). This does not apply to the terminal bus node (BS3). The bus master (BM) is provided with a master two-wire data bus interface (OWM), the master two-wire data bus interface (OWM) being provided to bidirectionally transmit and receive data, using a data bus protocol with more than two physical differential voltage or current levels in terms of absolute voltage value, via the two-wire data bus (b1$b$2$b$3) or at least a two-wire data bus section (b1, b2, b3) of the two-wire data bus sections (b1, b2, b3), hereinafter referred to as the two-wire data bus section (b1, b2, b3) of interest. Each of the two-wire data bus sections (b1, b2, b3) of interest comprises only two signal lines, i.e. the two one-wire data bus sections (bna, bnb) of interest. A two-wire data bus interface (OWSn) of the bus node (BSn) of interest of the bus nodes (BS1, BS2, BS3), hereinafter referred to as the bus node (BSn) of interest, and a differential transfer gate (TGn) of the bus node (BSn) of interest are electrically connected to the two-wire data bus section (bn) of interest. The two-wire data bus interface (OWSn) of the bus node of interest is provided to bidirectionally transmit and receive data, using a data bus protocol with more than two physical (differential) voltage or current levels (differential) in terms of absolute voltage value, via the two-wire data bus section (b1, b2, b3) of interest. The differential transfer gate (TGn) of the bus node (BSn) of interest is provided to separate the two-wire data bus section (b$_n$) of interest from an optional succeeding two-wire data bus section (b$_{(b+1)}$) and/or to electrically connect it with the latter. The bus node (BSn) of interest respectively has a first transfer gate control register (TGCRn) configured to control the differential transfer gate (TGn) of the bus node (BSn) of interest. The bus master (BM) can write the differential transfer gate (TGn) of the bus node (BSn) of interest via the two-wire data bus interface (OWS) and the two-wire data bus (b1$b$2$b$3) or the two-wire data bus section (bn) of interest and the two-wire data bus interface (OWSn) of the bus node (BSn) of interest. Thus, the bus master (BM) is able to control the state of the differential transfer gate (TGn) of the bus node (BSn) of interest. In this context, each differential transfer gate (TGn) comprises two individual transfer gates for respectively connecting one preceding one-wire data bus section (bna, bnb) of the preceding two-wire data bus section (bn) and one succeeding one-wire data bus section (b(n+1)a, b(n+1)b) of the succeeding two-wire data bus section (b(n+1)).

In another example, the bus node (BSn) of interest internally has at least one interface compliant to IEEE 1149, also known as a JTAG interface, which is connected to the two-wire data bus (b1$b$2$b$3) or at least the preceding two-wire data bus section (Bn) of interest via the two-wire data bus interface (OWSn) of the bus node (BSn) of interest so that the bus master (BM) can serve this JTAG interface via the two-wire data bus (b1$b$2$b$3) or at least the preceding two-wire data bus section (Bn) of interest. A JTAG interface in the sense of the present disclosure is characterized in that it comprises a test controller (TAPCn) of the bus node (BSn) of interest in the form of a finite automat—also referred to as a Finite State Machine—having a state diagram according to FIG. 1 and the above associated description, which is compliant to IEEE 1149.

In a further advantageous example, a data bus according to the present disclosure is characterized in that the respective transfer gate control register (TGCRn) of the bus node (BSn) of interest can be written by the bus master (BM) by means of the at least one JTAG test interface of the bus node (BSn) of interest via the two-wire data bus (b1$b$2$b$3) or at least via the two-wire data bus section (bn).

In a further advantageous example, a data bus system according to the present disclosure is characterized in that at least the bus node (BSn) of interest, i.e. a light emitting component bus node, is provided to control light emitting component associated thereto, hereinafter referred to as light emitting component of interest, in dependence on data transmitted from the bus master (BM) to the bus node (BSn) of interest via the two-wire data bus (b1$b$2$b$3) or the two-wire data bus section (bn) of interest.

In a further advantageous example, a data bus system according to the present disclosure is characterized in that the JTAG interface of the bus node (BSn) of interest comprises at least one illumination register (ILR) as a data register (DR) of the JTAG interface of the bus node (BSn) of interest, wherein the control of the light emitting component by the bus node (BSn) of interest, in particular with respect to brightness and/or color temperature, using PWM units (PWM1, PWM2, PWM3) of the bus node (BSn) of interest, depends at least temporarily on the at least temporary content of the illumination register.

In a further example, a data bus system according to the present disclosure is characterized in that the JTAG interface of the bus node (BSn) of interest comprises at least one illumination instruction register (ILIRn) as a data register (DRn) of the JTAG interface of the bus node (BSn) of interest and an illumination register (ILRn) as a further data register (DRn) of the JTAG interface of the bus node (BSn) of interest. It depends at least on parts of the content of the illumination instruction register (ILIRn) of the bus node (BSn) of interest, whether the illumination register (ILRn) of the bus node (BSn) of interest receives the serial illumination data for controlling the control of the light emitting component of interest from the bus master (BM) or another bus node (BS1, BS2, BS3) via the JTAG interface by means of the combined TMS-TDI signal (TMS_TDI$_n$) of the JTAG interface of the bus node (BSn) of interest or a separate data input (SILDIIn) of the bus node (BSn) of interest. In this case, the control of the light emitting component by the bus node (BSn) of interest depends at least temporarily on the at least temporary content of the illumination register (ILRn) of the bus node (BSn) of interest.

The differential data bus system of the present disclosure is provided with a two-wire data bus (b1$b$2$b$3) formed by a first one-wire data bus (b1$a$, b2$a$, b3$a$, b4$a$) and a second one-wire data bus (b1$b$, b2$b$, b3$b$) for the transmission of data between a bus master (BM) and at least two bus nodes (BS1, BS2, BS3), in particular light-emitting bus nodes. The two-wire data bus (b1$b$2$b$3) is divided by the bus nodes (BS1, BS2, BS3) in at least two two-wire data bus sections (b1, b2, b3). It is terminated by a bus node, the terminal bus node (BS3). Each bus node (BS2, BS3), except for a first bus node (BS1), is connected to a preceding bus node (BS1, BS2) of the bus nodes (BS1, BS2, BS3) via a preceding two-wire data bus section (b2, b3) of the two-wire data bus sections (b1, b2, b3). The one first bus node (BS1) is connected to the bus master (BM) via a preceding first two-wire data bus section (b1) of the two-wire data bus sections (b1, b2, b3). Each bus node (BS1, BS2), except for the terminal bus node (BS3), is connected to a succeeding bus node (BS2, BS3) of the bus nodes (BS1, BS2, BS3) via a succeeding two-wire data bus section (b2, b3) of the two-wire data bus sections (b1, b2, b3). The bus system has the bus master (BM) with a master two-wire data bus interface (OWM). As described, the master two-wire data bus interface (OWM) is provided to bidirectionally transmit and receive data, using a data bus protocol with more than two physical differential voltage or current levels in terms of absolute voltage value, via the two-wire data bus (b1b2b3) or at least a two-wire data bus section (b1, b2, b3) of the two-wire data bus sections (b1, b2, b3), hereinafter referred to as the two-wire data bus section (bn) of interest. The two-wire data bus section (bn) of interest comprises only two signal lines. A two-wire data bus interface (OWSn) of a bus node of the bus nodes (BS1, BS2, BS3), hereinafter referred to as the bus node (BSn) of interest, electrically connected to the two-wire data bus section (bn) of interest. The two-wire data bus interface (OWSn) of the bus node of interest is provided to bidirectionally transmit and receive data, using a data bus protocol with more than two physical (differential) voltage or current levels (differential) in terms of absolute voltage value, via the two-wire data bus section (b1, b2, b3) of interest. The bus node (BSn) of interest comprises an address register (BKADRn) as the data register (DR) of a JTAG interface, which can be written by the bus master (BM) preferably only when the differential transfer gate (TGn) of the bus node (BSn) of interest is open, and wherein it depends on the content of this register and on the content of the transmission register (SR) of the JTAG interface of the bus node (BSn) of interest, whether the two-wire data bus interface (OWSn) of the bus node (BSn) of interest is allowed to output data onto the two-wire data bus (b1b2b3) and/or the two-wire data bus section (b1, b2, b3) of interest at times provided for that purpose and/or after transmission of specific data, e.g. a transmission address for the transmission registers (SR) of the bus nodes, by the bus master (BM) or another bus node of the bus nodes (BS1, BS2, BS3). The two-wire data bus interface (OWSn) of the bus node (BSn) of interest is provided to send data via the two-wire data bus section (bn) of interest, using a data bus protocol with more than two physical (differential) voltage or current levels (differential) in terms of absolute voltage value.

In a further suitable example, a data bus system according to the present disclosure is characterized in that the bus node (BSn) of interest internally has at least one interface compliant to IEEE 1149, also known as a JTAG interface, which is connected to the two-wire data bus (b1b2b3) or at least the preceding two-wire data bus section (Bn) of interest via the two-wire data bus interface (OWSn) of the bus node (BSn) of interest so that the bus master (BM) can serve this JTAG interface via the two-wire data bus (b1b2b3) or at least the two-wire data bus section (Bn) of interest. A JTAG interface of the bus node (BSn) of interest in the sense of the present disclosure is characterized in that it comprises a test controller (TAPCn) in the form of a finite automat—also referred to as a Finite State Machine—having a state diagram according to FIG. 1, which is compliant to IEEE 1149.

In a further advantageous example, a data bus system according to the present disclosure is characterized in that a differential transfer gate (TGn) of the bus node (BSn) of interest is electrically connected to the two-wire data bus (bn) of interest. The differential transfer gate (TGn) of the bus node (BSn) of interest is provided to separate the two-wire data bus section (bn) of interest from the optional succeeding two-wire data bus interface (OWSn) (b(n+1)) and/or to electrically connect it to the same. Here, the respective first one-wire data bus section (bna) of interest of the two-wire data bus (bn) of interest is connected to or separated from the corresponding succeeding first one-wire data bus section (b(n+1)a) of the succeeding two-wire data bus (b(n+1)). Further, the respective second one-wire data bus section (bnb) of interest of the two-wire data bus (bn) of interest is connected to or separated from the corresponding succeeding second one-wire data bus section (b(n+1)b) of the succeeding two-wire data bus (b(n+1)). The bus node (BSn) of interest has a transfer gate control register (TGCRn) as a data register (DRn) of the JTAG interface of the bus node (BSn) of interest, which is configured to control the differential transfer gate (TGn) of the bus node (BSn) of interest. The respective transfer gate control register (TGCRn) of the bus node (BSn) of interest can be written at least by the bus master (BM) via the two-wire data bus (b1b2b3) or at least the two-wire data bus section (bn) of interest, using the at least one JTAG test interface of the bus node (BSn) of interest.

In a further advantageous example, a data bus system according to the present disclosure is characterized in that at least the bus node (BSn) of interest, i.e. a light emitting component bus node, is provided to control light emitting component (LMn) associated thereto, hereinafter referred to as light emitting component (LMn) of interest, in dependence on data transmitted from the bus master (BM) to the bus node (BSn) of interest via the two-wire data bus (b1b2b3) or the two-wire data bus section (bn) of interest.

In a further suitable example, a data bus system according to the present disclosure is characterized in that the JTAG interface of the bus node (BSn) of interest comprises at least one illumination register (ILRn) as a data register (DRn) of the JTAG interface of the bus node (BSn) of interest, wherein the control of the light emitting component (LMn) of interest by the bus node (BSn) of interest depends at least temporarily on the at least temporary content of the register. This may e.g. regard the duty cycle, the amplitude, the frequency and other parameters of the PWM control.

In a further suitable example, a data bus system of the present disclosure is characterized in that the JATG interface of the bus node (BSn) of interest comprises at least one illumination instruction register (ILIRn) as a data register (DRn) of the JTAG interface of the bus node (BSn) of interest and an illumination register (ILRn) as a further data register (DRn) of the JTAG interface of the bus node (BSn) of interest. It depends at least on parts of the content of the illumination instruction register (ILIRn) of the bus node (BSn) of interest, whether the illumination register (ILRn) of the bus node (BSn) of interest receives the preferably serial illumination data for controlling the control of the light emitting component of interest from the bus master (BM) or another bus node (BS1, BS2, BS3) via the test data interface (TMS_TDI$_n$) of the JTAG interface of the bus node (BSn) of interest or a separate data input (SILDIIn) of the bus node (BSn) of interest. The control of the light emitting component (LMn) of interest by the bus node (BSn) of interest depends at least temporarily on the at least temporary content of the illumination register (ILRn).

A JTAG interface of a bus node (BS1, BS2, BS3) for controlling the control of light emitting component (LM) by a bus node (BS1, BS2, BS3) of a light chain is characterized, according to the present disclosure, in that it comprises at least one illumination register (ILR) as a data register (DR) of this JTAG interface, wherein the control of the light emitting component (LM) by the bus node (BSn) of interest depends at least temporarily on the at least temporary content of the register. As before, a JTAG interface is characterized in that its test controller (TAPC) comprises a state diagram corresponding to the IEEE 1149 standard and in particular to one or a plurality of its sub-standards IEEE 1149.1 to IEEE 1149.8 and their advancements. This definition of the characteristics of a JTAG interface applies throughout the entire document of the present disclosure.

A method of the present disclosure for controlling a light emitting component (LMn) by means of an electric control device within a relevant bus nodes (BSn) of a plurality of bus nodes (BS1, BS2, BS3) thus comprises the following steps:

transmitting control data for setting lighting values for at least one light emitting component by controlling a JTAG test controller (TAPCn) of a JTAG interface within the bus node ($BS_n$) of interest which supplies at least one light emitting component (LMn) with controllable electric power in dependence on these control data. The JTAG interface of the bus node (BSn) of interest is again—as it is throughout the application—characterized in that the test controller (TAPCn) of the bus node (BSn) of interest comprises a state diagram corresponding to the IEEE 1149 standard and in particular to one or a plurality of the sub-standards IEEE 1149.1 to IEEE 1149.8 and their advancements.

A JTAG interface according to the present disclosure for controlling the control device of light emitting component by a bus node (BSn) of a light chain may also be characterized in that it comprises at least one illumination control register (ILCR) as a data register of said JTAG interface and an illumination register (ILIRn) as a data register of the JTAG interface. According to the disclosure, it depends at least on parts of the content of the illumination control register (ILCRn), whether the illumination register (ILIRn) receives data via the test data interface ($TMS\_TDI_n$) of the JTAG interface or via a separate data input (SILDI). These registers may also be partial registers of the instruction register (IRn) of the bus node (BSn) of interest or of another data register (DRn) of the JTAG interface of the bus node (BSn) of interest. However, a separate implementation is generally preferable. The control of the light emitting component (LMn) by the bus node (BSn) of interest then depends at least temporarily on the at least temporary content of the illumination register (ILRn) of the bus node (BSn) of interest. As before, the JTAG interface is characterized in that it comprises a test controller (TAPC) comprising a state diagram corresponding to the IEEE 1149 standard and in particular to one or a plurality of the sub-standards IEEE 1149.1 to IEEE 1149.8 and their advancements.

A differential data bus according to this disclosure between a first sub-device, i.e. the bus master (BM), and at least two further sub-devices, i.e. the bus nodes (BS1, BS2, BS3), comprises a two-wire data bus (b1b2b3) formed by a first one-wire data bus (b1$a$, b2$a$, b3$a$) and a second one-wire data bus (b1$b$, b2$b$, b3$b$). It serves for data transmission and system clock transmission between the bus master (BM) and the bus nodes (BS1, BS2, BS3). The two-wire data bus (b1b2b3) is divided into at least two two-wire data bus sections (b1, b2, b3) by the bus nodes (BS1, BS2, BS3). Each of these bus nodes (BS2, BS3), except for a first bus node (BS1), is connected to a preceding bus node (BS1, BS2) of the bus nodes (BS1, BS2, BS3) via a preceding two-wire data bus section (b2, b3). The first bus node (BS1) is connected to the bus master (BM) via a preceding first two-wire data bus section (b1). Each of these bus nodes (BS1, BS2), except for a terminal bus node (BS3), is connected to a succeeding bus node (BS2, BS3) via a succeeding two-wire data bus section (b2, b3). This applies when the bus node is not the last bus node (B3) of the chain of bus nodes (BS1, BS2, BS3), seen from the bus master (BM) along the array of bus nodes (BS1, BS2, BS3). Data are or can be transferred bidirectionally between the bus master (BM) and a bus node of the bus nodes (BS1, BS2, BS3), hereinafter referred to as the bus node (BSn) of interest, via the two-wire data bus (b1b2b3) or at least via a two-wire data bus section (b1, b2, b3) of the two-wire data bus sections (b1, b2, b3), hereinafter referred to as the two-wire data bus section (bn) of interest. In addition, a system clock is transmitted by the bus master (BM) to the bus node (BSn) of interest via the two-wire data bus (b1b2b3) or at least the two-wire data bus section (bn) of interest, with a system clock period (T/3) divided into at least a first half-clock period ($T_{1H}$) and a second half-clock period ($T_{2H}$) which may differ in temporal duration. At least the bus node (BSn) of interest has a first means, in particular a third comparator (cmp3), that compares the amount of the differential signal level (TOW) on the two-wire data bus (b1b2b3) in the form of the amount of a signal voltage difference between the potential of the first one-wire data bus section (bna) of the two-wire data bus section (bn) of interest and the potential of the second one-wire data bus section (bnb) of the two-wire data bus section (bn) of interest to the value of a third threshold value, in particular the potential of a third threshold value signal, i.e. the third threshold value ($V_{2H}$). The bus node (BSn) of interest has a second means, in particular a second comparator (cmp2), which at the same time compares the amount of said differential signal level (TOW) to the value of a second threshold value, in particular the voltage level of a second threshold value signal ($V_{2L}$). Here, the third threshold value ($V_{2H}$) differs from the second threshold value ($V_{2L}$). The second and the third threshold values ($V_{2L}$, $V_{2H}$) define three signal voltage value ranges ($V_{B1}$, $V_{B2}$, $V_{B3}$) for the absolute voltage value of the differential signal level (TOW) on the two-wire data bus (b1b2b3). Here, a first voltage value range ($V_{B1}$) delimits a medium voltage value range as a second voltage value range ($V_{B2}$) in a downward direction. However, the second voltage value range ($V_{B2}$) is delimited in the upward direction, but opposite to the first voltage value range ($V_{B1}$), by a third voltage value range ($V_{B3}$). Here, data are transmitted on the two-wire data bus section (bn) of interest in chronologically separate or successive time slot packages, each with the duration of a system clock period (T/3) with at least three successive time slots (TIN0, TIN1, $TDO_z$). A first time slot (TIN0) and a second time slot (TIN1) contain at least one check datum and/or a first datum, respectively transmitted to the bus node (BS1, BS2, BS3) of interest by the bus master (BM), wherein the check datum and the first datum can be compatible in particular with the data of the IEEE.1 4 wire test data bus or with another sub-standard of the IEEE 1149 standard, and wherein the bus node (BSn) of interest receives the check datum and the first datum from the bus master (BM). A third time slot ($TDO_z$) contains a second datum which is transmitted to the bus master (BM) by the bus node (BSn) of interest, wherein the bus master (BM) receives this second datum from the bus node (BSn) of interest and wherein the second datum is transmitted only in the second voltage value range ($V_{B2}$) and the third voltage value range ($V_{B3}$). The data are transmitted in a half-clock period of the at least two half-clock periods ($T_{1H}$, $T_{2H}$) of a time slot of a system base clock period (T). The system clock is transmitted by a clock signal in the first voltage value range ($V_{B1}$) during the respective other half-clock period of the at least two half-clock periods ($T_{1H}$, $T_{2H}$) of the time slot of a system base clock period (T).

According to another advantageous example, the two-wire data bus of the present disclosure arranged between a first sub-device, i.e. the bus master (BM), and at least two sub-devices, i.e. the bus nodes (BS1, BS2, BS3), is characterized in that at least three logical states are used by the bus master (BM) and the bus nodes (BS1, BS2, BS3) in transmitting the data bidirectionally on the two-wire data bus (b1b2b3) or at least the two-wire data bus section (b1, b2, b3) of interest.

In another suitable example, the data bus between a first sub-device, i.e. the bus master (BM), and at least two further sub-devices, i.e. the bus nodes (BS1, BS2, BS3), is characterized in that at least a first of the at last three logical states on the two-wire data bus (b1b2b3) or at least the two-wire data bus section (b1, b2, b3) of interest is generated by first dominant switches (T1a, T1b) of the bus master (BM), which state forces the amount of the potential difference between the first one-wire data bus (b1a, b2a, b3a) and the second one-wire data bus (b1b, b2b, b3b) or at least between the first one-wire data bus section (bna) of interest and the second one-wire data bus section (bnb) of interest into the first voltage value range ($V_{B1}$).

In a suitable example, the data bus of the present disclosure between a first sub-device, i.e. the bus master (BM), and at least two further sub-devices, i.e. the bus nodes (BS1, BS2, BS3), is characterized in that a second of the at least three logical states on the two-wire data bus (b1b2b3) or at least the two-wire data bus section (b1, b2, b3) of interest is generated by switching on a first switchable current source (T2a, T2b) in the bus master (BM) and/or by switching on a second switchable current source (T3a, T3b) in the bus node (BS1, BS2, BS3), see FIGS. 8 and 9.

In another advantageous example, the data bus of the present disclosure arranged between a first sub-device, i.e. the bus master (BM), and at least two sub-devices, i.e. the bus nodes (BS1, BS2, BS3), is characterized in that by switching on the first switchable current source (T2a, T2b) in the bus master (BM) on and/or by switching a second switchable current source (T3a, T3b) in one of the bus nodes (BS1, BS2, BS3), the amount of the potential difference—i.e. the amount of the differential signal level (TOW)—on the two-wire data bus (b1b2b3) or at least the two-wire data bus section (b1, b2, b3) of interest is forced into the third voltage value range ($V_{B3}$), if the first dominant switches (T1a, T2a) of the bus master (BM) are not switched on, which would force the amount of the differential signal level (TOW) on the two-wire data bus or at least on the two-wire data bus section (bn) of interest into the first voltage value range upon being switched on and would overwrite the switchable current sources (T2a, T2b, T3a, T3b).

In another advantageous example, the data bus of the present disclosure arranged between a first sub-device, i.e. the bus master (BM), and at least two sub-devices, i.e. the bus nodes (BS1, BS2, BS3), is characterized in that, if none of the other logical states prevails, a differential pull circuit ($R_{1a}$, $R_{2a}$; $R_{1b}$, $R_{1b}$) generates a third of the at least three logical states on the two-wire data bus (b1b2b3) or at least the two-wire data bus section (bn) of interest by the differential pull circuit ($R_{1a}$, $R_{2a}$; $R_{1b}$, $R_{1b}$) bringing the amount of the differential signal level (TOW) on the two-wire data bus or at least on the two-wire data bus section (bn) of interest to a second differential voltage value level ($V_{M}$) in the second voltage value range ($V_{B2}$).

In another advantageous example, the data bus of the present disclosure arranged between a first sub-device, i.e. the bus master (BM), and at least two further sub-devices, i.e. the bus nodes (BS1, BS2, BS3), is characterized in that one or more changes from a second or a third logical state on the two-wire data bus (b1b2b3) or at least on the two-wire data bus section (bn) of interest, on the one hand, to a first logical state on the two-wire data bus (b1b2b3) or at least on the two-wire data bus section (bn) of interest, on the other hand, and one or more changes in the opposite direction are used to transmit a clock signal.

In another advantageous example, the data bus of the present disclosure arranged between a first sub-device, i.e. the bus master (BM), and at least two further sub-devices, i.e. the bus nodes (BS1, BS2, BS3), is characterized in that one or more changes from a second logical state on the two-wire data bus (b1b2b3) or at least on the two-wire data bus section (bn) of interest, on the one hand, to a third logical state on the two-wire data bus (b1b2b3) or at least on the two-wire data bus section (bn) of interest, on the other hand, via a first logical state on the two-wire data bus (b1b2b3) and one or more changes in the opposite direction are used to transmit a data signal from the bus master (BM) to the bus node of interest and/or from the bus node of interest to the bus master (BM).

In another suitable example, the data bus of the present disclosure arranged between a first sub-device, i.e. the bus master (BM), and at least two further sub-devices, i.e. the bus nodes (BS1, BS2, BS3), is characterized in that the data are transmitted in a half-clock period of the at least two half-clock periods ($T_{1H}$, $T_{2H}$) of a time slot, and the system clock is transmitted in another half-clock period of the at least two half-clock periods ($T_{1H}$, $T_{2H}$) of a time slot, wherein a time slot package has a length of a system base clock period (T) with at least three times two half-clock periods ($T_{1H}$, $T_{2H}$).

A data bus of the present disclosure extends between a first sub-device, i.e. the bus master (BM), and at least two further sub-devices, i.e. the bus nodes (BS1, BS2, BS3), wherein the data bus comprises a two-wire data bus (b1b2b3) with two data lines, which is divided into a plurality of paired one-wire data bus sections (b1a, b1b; b2a, b2b; b3a, b3b) by the bus nodes (BS1, BS2, BS3) and is terminated by a last bus node (BS3) of the bus nodes (BS1, BS2, BS3), i.e. the terminal bus node (BS3). Here, the data bus may also be characterized as follows: The bus master (BM) comprises a master two-wire data bus interface (OWM). The master two-wire data bus interface (OWM) further comprises a first differential switchable voltage source (T1a, T1b) with a first internal resistance, which can connect the two-wire data bus (b1b2b3) or at least a two-wire data bus section (b1, b2, b3), hereinafter referred to as the two-wire data bus section (bn) of interest, to a pair of supply lines ($V_{bat}$, GND). The master two-wire data bus interface (OWM) comprises a second switchable differential voltage source (T2a, T2b) with a second internal resistance, which can bring at least the two-wire data bus section (bn) of interest of the two-wire data bus (b1b2b3) or the two-wire data bus (b1b2b3) to a second potential difference, with respect to the amount, wherein the second switchable differential voltage source may also be a corresponding current source with a second internal resistance and the corresponding current value. At least one of the bus nodes (BS1, BS2, BS3), hereinafter referred to as the bus node (BSn) of interest, comprises a two-wire data bus interface (OWSn), hereinafter referred to as the two-wire data bus interface (OWSn) of interest. At least this two-wire data bus interface (OWSn) of interest of the bus node (BSn) of interest has a third switchable differential voltage source (T2a, T3b) with a third internal resistance, which can bring at least the two-wire data bus section (bn) of interest of the two-wire data bus (b1b2b3) or the two-wire data bus (b1b2b3) to a third potential difference, with respect to the amount, the amount of which is preferably the same as the second potential difference, and wherein the third switchable differential voltage source may also be a current source with a third corresponding internal resistance and the associated current value. The conversion of the values of real voltage sources into values of real current sources is well known to a person skilled in the art. At least the two-wire data bus section (bn) of interest of the two-wire data bus (b1b2b3) or the two-wire data bus (b1b2b3) is maintained on a differential signal level (TOW), with respect to the amount, between a third differential voltage value level ($V_{IO}$) which preferably is equal to the fourth and the fifth absolute voltage value ($V_{IO1}$, $V_{IO2}$), and the first differential voltage value level ($-V_{IO}$), by fourth differential voltage source, in particular a differential pull circuit ($R_{1a}$, $R_{2a}$; $R_{1b}$, $R_{1b}$), with a fourth internal resistance on a medium second differential voltage value level ($V_M$). The absolute voltage value in this medium second differential voltage value level ($V_M$) is between the value of the first differential voltage value level ($-V_{IO}$) and the value of the fourth absolute voltage value ($V_{IO1}$) and/or between the value of the first differential voltage value level ($-V_{IO}$) and the fifth absolute voltage value ($V_{IO2}$). The first internal resistance is smaller than the other internal resistances. The fourth internal resistance is greater than the other internal resistances.

A method for operating a data bus between a first sub-device, i.e. the bus master (BM), and at least two further sub-devices, i.e. the bus nodes (BS1, BS2, BS3), can be worded correspondingly. Here, the data bus comprises a two-wire data bus (b1b2b3) divided into at least two two-wire data bus sections (b1, b2, b3) by the at least two bus nodes (BS1, BS2, BS3) and terminated by at least one bus node (BS3) of the bus nodes (BS1, BS2, BS3), i.e. the terminal bus nodes (BS3). The method comprises the following steps: as the first step, a bidirectional transmission of data via the two-wire data bus (b1b2b3) or at least one two-wire data bus section (b1, b2, b3) of the two-wire data bus sections (b1, b2, b3), hereinafter referred to as the two-wire data bus section of interest, is performed between the bus master (BM) and at least one bus node (BS1, BS2, BS3), hereinafter referred to as the bus node (BSn) of interest; as the second step, the simultaneous transmission of a clock signal via the two-wire data bus (b1b2b3) or the two-wire data bus section (b1, b2, b3) of interest from the bus master (BM) to at least the bus node (BSn) of interest with a system clock period (T/3) is performed in preferably three successive time slots of a time slot package, wherein the time slots are divided into at least a first half-clock period ($T_{1H}$) and a second half-clock period ($T_{2H}$); as the next, third step, a comparison of the differential signal level (TOW) on the two-wire data bus (b1b2b3) or at least on the two-wire data bus section (b1, b2, b3) of interest in the form of a differential voltage as a differential signal level (TOW) on the two-wire data bus (b1b2b3) or at least on the two-wire data bus section (bn) of interest to a third threshold value ($V_{2H}$), in particular that of a third threshold value signal ($V_{2H}$) is performed by a third means of the bus node (BS1, BS2, BS3) of interest, in particular a third comparator (cmp3); as the next, fourth step, a comparison of the differential signal level (TOW) on the two-wire data bus (b1b2b3) or at least on the two-wire data bus section (bn) of interest in the form of a differential voltage as a differential signal level (TOW) on the two-wire data bus (b1b2b3) or at least on the two-wire data bus section (bn) of interest to a second threshold value ($V_{2L}$), in particular of a second threshold value signal ($V_{2L}$), which second threshold value is different from the third threshold value ($V_{2H}$), is performed by a second means of the bus node (BS1, BS2, BS3) of interest, in particular a second comparator (cmp2). Here, the third and the second threshold value ($V_{2L}$, $V_{2H}$) define three signal voltage value ranges ($V_{B1}$, $V_{B2}$, $V_{B3}$). A medium voltage value range as the second voltage value range ($V_{B2}$) is delimited in the upward or the downward direction by a first voltage value range ($V_{B1}$). The second voltage value range ($V_{B2}$) is delimited in the downward or the upward direction, but opposite to the first voltage value range ($V_{B1}$), by a third voltage value range ($V_{B3}$); as the next, fifth step, a transmission of the data on the two-wire data bus (b1b2b3) or at least on the two-wire data bus section (bn) of interest is performed in time slot packages, each with a duration of a system base clock period (T) with at least three successive time slots (TIN0, TIN1, $TDO_z$), wherein the order of the time slots (TIN0, TIN1, $TDO_z$) within the succession of these at least three time slots (TIN0, TIN1, $TDO_z$) can be selected system-specifically; as the next, sixth step, a transmission of at least a check datum and/or a first datum is performed in a first time slot (TIN0) and in a second time slot (TIN1) from the bus master (BM) to the bus node (BS1, BS2, BS3) of interest, wherein the check datum and the first datum may be compatible with in particular the data of the IEEE 1149 standard, and wherein the bus node (BS1, BS2, BS3) of interest receives the check datum and the first datum; the transmission of a check datum and/or of a first datum is performed in one half-clock period of the at least two half-clock periods ($T_{1H}$, $T_{2H}$) of the respective time slot of the system base clock period (T) of the respective time slot, in the second voltage value range ($V_{B2}$) and the third voltage value range ($V_{B3}$) on the two-wire data bus (b1b2b3) or at least the two-wire data bus section (b1, b2, b3) of interest from the bus master (BM) to the bus node (BS1, BS2, BS3) of interest in the first and/or second time slot (TIN0, TIN1) of the at least three successive time slots (TIN0, TIN1, $TDO_z$), wherein the bus node (BS1, BS2, BS3) of interest receives the first datum and wherein the transmission of the data is effected by one or more changes of the amount of the differential signal level (TOW) on the two-wire data bus (b1b2b3) or at least the two-wire data bus section (b1, b2, b3) of interest between the second voltage value range ($V_{B2}$) on the one hand and the third voltage value range ($V_{B3}$) on the other hand via the first voltage value range ($V_{B1}$) and one or more changes in the opposite direction.

As the next, seventh step, a transmission of a second datum is performed in one half-clock period of the at least two half-clock periods ($T_{1H}$, $T_{2H}$) of the respective time slot of the system base clock period (T) in the second voltage value range ($V_{B2}$) and the third voltage value range ($V_{B3}$) on the two-wire data bus (b1b2b3) or at least the two-wire data bus section (bn) of interest from the bus node (BS1, BS2, BS3) of interest to the bus master (BM) in a third time slot ($TDO_z$) of the at least three successive time slots (TIN0, TIN1, $TDO_z$), wherein the bus master (BM) receives this second datum.

As the next, eight step, a transmission of a system clock is performed in the respective other half-clock period of the at least two half-clock periods ($T_{1H}$, $T_{2H}$) of the respective time slot of the system base clock period (T), typically in each of the at least three time slots (TIN0, TIN1, $TDO_z$), wherein no data are transmitted in this half-clock period, and wherein the transmission of the system clock in the respective time slot is effected by one or more changes of the amount of the differential signal level (TOW) on the two-wire data bus (b1b2b3) or at least the two-wire data bus section (bn) of interest between the first voltage value range ($V_{B1}$) on the one hand and the second voltage value range ($V_{B2}$) and/or the third voltage value range ($V_{B3}$) on the other hand and one or more changes in the opposite direction.

A variant of this method is characterized in that three logical states are used by the bus master (BM) and the bus node of interest in the bidirectional transmission of the data on the two-wire data bus (b1b2b3) or at least the two-wire data bus section (b1, b2, b3) of interest, wherein each logical state is allocated to one, typically exactly one, voltage value range ($V_{B1}$, $V_{B2}$, $V_{B3}$) of the differential signal level (TOW) on the two-wire data bus (b1b2b3) or at least the two-wire data bus section (bn) of interest.

A further variant of this method is characterized by a temporary closure of the dominant differential switches (T1a, T1b) of the bus master (BM), which may each also be a MOS transistor or another semiconductor switch, for the temporary generation of a first of the three logical states on the two-wire data bus (b1b2b3) or at least the two-wire data bus section (bn) of interest, wherein the amount of the differential signal level (TOW) on the two-wire data bus (b1, b2. b3) or at least the two-wire data bus section (bn) of interest is forced into the first voltage value range ($V_{B1}$).

A further variant of this method is characterized by temporarily switching on a first switchable current source (T2a, T2b) in the bus master (BM) and/or by temporarily switching on a second switchable current source (T3a, T3b) in the bus node ($BS_n$) of interest for the generation of a third of the logical states on the two-wire data bus (b1b2b3) or at least the two-wire data bus section (b1, b2, b3) of interest.

Another variant of this method is characterized in that switching on the first switchable current source ($I_1$, $S_{1H}$) in the bus master (BM) and/or switching on the second switchable current source ($I_2$, $S_{2H}$) in the bus node of interest forces the potential on the one-wire data bus (b1, b2, b3) or at least the one-wire data bus section (b1, b2, b3) to a third potential, if the first dominant switch ($S_{1L}$) of the bus master (BM) is not switched on which has the potential of the one-wire data bus.

Another variant of this method is characterized by generating a second of the three logical states on the two-wire data bus (b1b2b3) or at least the two-wire data bus section (bn) of interest, in particular a differential pull circuit ($R_{1a}$, $R_{2a}$; $R_{1b}$, $R_{1b}$), if no other of the logical states prevails on the two-wire data bus (b1b2b3) or at least the two-wire data bus section (bn) of interest, in particular by the pull circuit ($R_{1a}$, $R_{2a}$; $R_{1b}$, $R_{1b}$) maintaining the amount of the differential signal level (TOW) on the two-wire data bus (b1b2b3) or at least the two-wire data bus section (bn) of interest on a medium second differential voltage value level ($V_M$) in the second voltage value range ($V_{B2}$).

Another variant of this method is characterized by the transmission of a system clock by changing from the second or the third logical state on the two-wire data bus (b1b2b3) or at least the two-wire data bus section (bn) of interest on the one hand to a first logical state on the two-wire data bus (b1b2b3) or at least the two-wire data bus section (bn) of interest on the other hand, and by changing in the opposite direction.

A further variant of this method is characterized by the transmission of data by changing from the second logical state on the two-wire data bus (b1b2b3) or at least the two-wire data bus section (bn) of interest on the one hand to a third logical state on the two-wire data bus (b1b2b3) or at least the two-wire data bus section (bn) of interest on the other hand via a first logical state on the two-wire data bus (b1b2b3) or at least the two-wire data bus section (bn) of interest, and by changing in the opposite direction.

Another variant of this method is characterized in that a first or a second datum or a check datum or another datum is transmitted in one half-clock period of the at least two half-clock periods ($T_{1H}$, $T_{2H}$) of a time slot of the at least three successive time slots (TIN0, TIN1, $TDO_z$) in a time slot package, and a system clock is transmitted in the other half-clock period of the at least two half-clock periods ($T_{1H}$, $T_{2H}$) of this time slot of the at least three successive time slots (TIN0, TIN1, $TDO_z$), wherein a time slot package has the length of a system base clock period (T) with at least three times two half-clock periods ($T_{1H}$, $T_{2H}$).

Another aspect of the approach according to the disclosure relates to a method for operating a two-wire data bus (b1b2b3) between a first sub-device, i.e. the bus master (BM), and at least two further sub-devices, i.e. the bus nodes (BS1, BS2, BS3). The two-wire data bus (b1b2b3) is divided into at least two-wire data bus sections (b1, b2, b3) by the at least two bus nodes (BS1, BS2, BS3), and is terminated by at least one bus node (BS3) of the bus nodes (BS1, BS2, BS3), i.e. the terminal bus node (BS3). The method comprises, as the first step, the temporary connection of the two-wire data bus (b1b2b3) or at least a two-wire data bus section of the one-wire data bus sections (b1, b2, b3), hereinafter referred to as the two-wire data bus section (bn) of interest, to a first switchable differential voltage source (T1a, T1b) of the bus master (BM), which comprises a first internal resistance and, when switched on, generates a first signal level (TOW), differential with respect to absolute value, on the two-wire data bus (b1b2b3). As a second step, it comprises the temporary connection of the two-wire data bus (b1b2b3) or at least the two-wire data bus section (b1, b2, b3) of interest to a second switchable differential voltage source (T2a, T2b) of the bus master (BM), which has a second internal resistance and, when switched on, generates a second signal level (TOW), differential with respect to absolute value, on the two-wire data bus (b1b2b3). Here, the second switchable differential voltage source may also be configured as a differential current source (T2a, T2b) with a corresponding second internal resistance and a corresponding current value. The conversion of the values of real current and voltage sources, as mentioned herein, is well known to a person skilled in the art. As a third step, the method comprises the temporary connection of the two-wire data bus (b1b2b3) or at least the two-wire data bus section (bn) of interest to a third switchable differential voltage source (T3a, T3b) of a bus node (BS1, BS2, BS3), hereinafter referred to as the bus node ($BS_n$) of interest. The third switchable differential voltage source, when switched on, causes a third signal level (TOW), differential with respect to amount, on the two-wire data bus (b1b2b3). Preferably, this third differential signal level (TOW) is equal to the second differential signal level (TOW). The third switchable voltage source (T3a, T3b) has a third internal resistance. The third switchable internal voltage source may also be conceived as a current source (T3a, T3b) with a corresponding third internal resistance and the corresponding current value. The conversion of the values of real current and voltage sources, as mentioned herein, is well known to a person skilled in the art. As a fourth step, the method comprises the temporary maintaining of the amount of the signal level (TOW) on the two-wire data bus (b1b2b3) or at least the two-wire data bus section (bn) of interest by a fourth differential voltage source, in particular a differential pull circuit ($R_{1a}$, $R_{2a}$; $R_{1b}$, $R_{1b}$), between a third differential voltage value level ($V_{IO}$), which preferably is equal to the fourth and the fifth absolute voltage value ($V_{IO1}$, $V_{IO2}$), and the first differential voltage value level ($-V_{IO}$), with a fourth internal resistance ($R_O$) on a medium second differential voltage value level ($V_M$). Here, the value of the medium second differential voltage value level ($V_M$) is between the value of the first differential voltage value level ($-V_{IO}$) and the value of the fourth absolute voltage value ($V_{IO1}$) and/or between the value of the first differential voltage value level ($-V_{IO}$) and the value of the fifth absolute voltage value ($V_{IO2}$). The internal resistance is smaller than the other internal resistances. The fourth internal resistance is greater than the other internal resistances.

Further disclosed is a method for initializing such a two-wire data bus as described herein, between a first sub-device, i.e. the bus master (BM), and at least two further sub-devices, i.e. the bus nodes (BS1, BS2, BS3). Here, the two-wire data bus (b1b2b3b4) is divided by the at least two bus nodes (BS1, BS2, BS3) into at least two two-wire data bus sections (b1, b2, b3). It is terminated by at least one bus node (B3) of the bus nodes (BS1, BS2, BS3), i.e. the terminal bus node (BS3). As the first step, the method comprises the determination of a new bus node address by the bus master (BM). This may be effected by simply counting up an internal value of the bus master (BM). The following, second step is the of storing this bus node address in a bus node address register (BKADR) of a bus node (BS1, BS2, BS3), i.e. the bus node of interest (BSn), by the bus master (BM). Here, the bus master (BM) and the bus node of interest (BSn) are connected, with respect to data, by one or a plurality of two-wire data bus sections (b1, b2, b3). Preferably, the bus node address register (BKADR) of the respective bus node (BSn) is configured as a stand-alone data register (DR) in the respective bus node (BSn). However, it may also be configured as a part of a data or instruction register (IRn) of the JTAG interface of the respective bus node (BSn). The programming may possibly be more complicated in this case. As before, a JTAG interface of a respective bus node (BSn) in the sense of this disclosure is characterized in that it comprises a test controller (TAPCn) of the respective bus node (BSn) with a state diagram corresponding to the IEEE 1149 standard or one of its sub-standards, as explained in the context of FIG. 1. After this allocation of bus addresses, the following third step provides for connecting the one or more two-wire data bus sections (b1, b2, b3), which are already connected to the respective bus node (BSn) and the bus master (BM), to one or more two-wire data bus sections (b1, b2, b3) by closing the transfer gate (TGn) of the respective bus node (BSn). In order to prevent an overwriting of the previously allocated bus node address in the bus node address register (BKADRn) upon the next allocation of bus node addresses, a logic in the respective bus node (BSn) prevents such storage of a bus node address in the bus node address register (BKADRn) of the respective bus node (BSn) for as long as the transfer gate (TGn) of the respective bus node (BSn) is closed. Writing the bus node address register (BKADRn) of the respective bus node (BSn) is thus only possible when the transfer gate (TGn) of the respective bus node (BSn) is open.

A further example of the method comprises as a further step the storage of an instruction to open the transfer gate (TGn) of the respective bus node (BSn) in the instruction register (IRn) of the respective bus node (BSn) or a transfer gate control register (TGCR) of the respective bus node (BSn) of the JTAG interface of the bus node (BSn) of interest. Thus, the bus master (BM) can re-initialize the bus at any time. Preferably, the transfer gate control register (TGCR) of the respective bus node (BSn) is used for this purpose and is addressed with an identical instruction in the instruction register (IRn) of the respective bus node (BSn).

Another example of the method comprises a further step the verification of the correct addressing of at least one respective bus node (BSn) by cyclic writing and reading, in particular a bypass register of the respective bus node (BSn).

Another example of the method comprises as a further step the determination of the number of correctly addressable bus nodes (BS1, BS2, BS3) by the bus master (BM). Thereafter, the number of correctly addressable bus nodes (BS1, BS2, BS3) is compared to a set number and at least one signal or a measure is triggered depending on the detected number by the bus master (BM) or a connected system, e.g. a watch dog counter.

A further example of the method comprises as a first further step the simultaneous transmission of a transmission address to all reachable bus nodes (BS1, BS2, BS3) by writing transmission registers (SR) of all bus nodes (BS1, BS2, BS3) with this transmission address by the bus master (BM), wherein the respective transmission register (SRn) of a respective bus node (BSn) of interest is a data register (DRn) or a part of a data register or a part of the instruction register (IRn) of the JTAG interface of this bus node (BSn) of interest, and wherein the bus node address register (BKADRn) is not a part of the respective register of the bus node (BSn) of interest. The second further step that follows is the comparison of the transmission address in the respective transmission register (SR) to the bus node address in the respective bus node address register (BKADR) by each bus node (BS1, BS2, BS3) using a predetermined comparison algorithm. Preferably, a check for equality is made. However, other algorithms are conceivable. The third further step that follows provides for either the activation of the transmitting capability for the respective bus node at the times provided for that purpose, if the comparison algorithm of the comparison carried out before by this respective bus node yields a sufficient congruence with the combination of the bus node address stored in its bus node address register (BKADR) and the transmission address stored in its transmission register (SR), which combination is expected for the transmission permission, or, as an alternative third further step, the deactivation of the transmitting capability for the respective bus node, if the comparison algorithm of the comparison performed before by said respective bus node does not result in a sufficient congruence with the combination of the bus node address stored in its bus node address register (BKADR) and the transmission address stored in its transmission register (SR), which combination is expected for the transmission permission. Preferably, only one bus node is given permission to transmit.

To ensure that only the bus node receives the data intended for it, it is feasible if not only the transmission by the bus node is controlled, but also the reception by the bus node. For this purpose, specific registers of a bus node are blocked are blocked completely or partly against writing by the bus master (BM), until the transmission address in the transmission register (SR) is congruent with the bus node address register (BKADR). This blocking can relate to the blocking of the shift register part of one or a plurality of data registers (DR) or the data transfer from the shift register part of one or a plurality of data registers (DR) or of the instruction register into the shadow register of the respective bus node (BSn). In this regard, it is possible that only individual or a plurality of bits are affected by a blocking of the data transfer. It is still necessary to always allow the transmission of certain instructions, at least the writing of the transmission register (SR). Therefore, the transmission of an instruction or of data to a previously not addressed bus node is performed as before by simultaneously transmitting a transmission address to all reachable bus nodes by writing the transmission registers (SR) of all bus nodes with this transmission address by the bus master (BM). Here, the respective transmission register (SR) of the respective bus node (BSn) is a data register or a part of a data register or a part of the instruction register (IRn) of the JTAG interface of this respective bus node (BSn). As before, the bus node address register (BKADRn) must not be a part of the respective register, Again, a comparison of the transmission address in the transmission register (SR) to the bus node address in the bus node address register (BKADR) is performed by each bus node using the above-mentioned comparison algorithm. Finally, the receiving capability of the respective bus node (BSn) for the content of predetermined data registers of the respective bus node (BSn) is activated, if the comparison algorithm of the comparison made before by this respective bus node (BSn) yields a sufficient congruence with the combination of the bus node address stored in its bus node address register (BKADR) and the transmission address stored in its transmission register (SR), which combination is expected for the transmission permission. Otherwise, the receiving capability of the respective bus node for the content of predetermined data registers of the respective bus node (BSn) is deactivated, if the comparison algorithm of the comparison made before by this respective bus node (BSn) yields no sufficient congruence with the combination of the bus node address stored in its bus node address register (BKADR) and the transmission address stored in its transmission register (SR), which combination is expected for the transmission permission.

If writing parts of the instruction register (IR) or parts of data registers is intended to be blocked or enabled, the corresponding method starts the simultaneous transmission of a transmission address to all reachable bus nodes (BS1, BS2, BS3) by writing the transmission registers (SR) of all bus nodes (BS1, BS2, BS3) with this transmission address by the bus master (BM), wherein the respective transmission register (SR) of a respective bus node is a data register or a part of the instruction register (IR) of the JTAG interface of this bus node, and wherein the bus node address register (BKADR) is not a part of the respective register. Again, the transmission address in the transmission register (SR) is then compared to the bus node address in the bus node address register (BKADR) by each bus node using the above predetermined comparison algorithm. Depending on the result of the comparison, the receiving capability of the respective bus node for the content of predetermined contents of the instruction register (IR) of the respective bus node is activated thereafter to allow predetermined instructions for an instruction decoder (IRDC) of the JTAG interface of the respective bus nodes, if the comparison algorithm of the comparison made before by this respective bus node yields a sufficient congruence with the combination of the bus node address stored in its bus node address register (BKADR) and the transmission address stored in its transmission register (SR), which combination is expected for the transmission permission. Otherwise, the receiving capability of the respective bus node for the content of predetermined contents of the instruction register (IR) of the respective bus node is deactivated to suppress predetermined instructions for an instruction decoder (IRDC) of the JTAG interface of the respective bus node, if the comparison algorithm of the comparison made before by this respective bus node yields no sufficient congruence with the combination of the bus node address stored in its bus node address register (BKADR) and the transmission address stored in its transmission register (SR), which combination is expected for the transmission permission.

In a further example, the device comprises a data bus system with a two-wire data bus (b1$b$2$b$3) for transmitting data between a bus master (BM) and between at least two bus nodes (BS1, BS2, BS3), in particular bus nodes of light emitting meas. In this example, not only the bus master (BM) itself acts as the bus master, but any of the bus nodes can behave as the bus master towards the succeeding bus nodes. This allows in particular to transmit compressed data to a few, special bus nodes, to decompress them there and to transmit the decompressed data from there to a few succeeding bus nodes. This means a significant reduction of data load. As before, the two-wire data bus (b1$b$2$b$3) is divided into at least two two-wire data bus sections (b1, b2, b3) by the thus upgraded bus nodes (BS1, BS2, BS3) and is terminated by a bus node, i.e. the terminal bus node (BS3). Each of the bus nodes (BS1, BS2, BS3), except for a first bus node (BS1) is connected to a preceding bus nodes (BS2, BS3) of the bus nodes (BS1, BS2, BS3) by a preceding two-wire data bus section (b2, b3) of the two-wire data bus sections (b1, b2, b3), and the one first bus node (BS1) is connected to the bus master (BM) by a by a preceding two-wire data bus section (b1) of the two-wire data bus sections (b1, b2, b3). Each bus node (BS1, BS2, BS3), except for a terminal bus node (BS3) is connected to a succeeding bus node (BS3, BS3) of the bus nodes (BS1, BS2, BS3) by a succeeding two-wire data bus section (b2, b3) of the two-wire data bus sections (b1, b2, b3). In this case, the bus nodes no longer have a transfer gate, but a second JTAG interface which, however, is a bus master interface (OWM1, OWM2, OWM3) (see FIG. 14). As before, the bus master (BM) has a master two-wire data bus interface (OWM) which is provided to bidirectionally transmit data via the two-wire data bus (b1$b$2$b$3) or at least a two-wire data bus section (b1, b2, b3) of the two-wire data bus sections (b1, b2, b3), hereinafter referred to as the two-wire data bus section (b1, b2, b3) of interest, and to receive data from the same, using a data bus protocol with more than two differential physical voltage and/or current levels. As before, the two-wire data bus section (bn) of interest comprises only two signal lines.

As before, a two-wire data bus interface (OWS1, OWS2, OWS3) of a bus node (BS1, BS2, BS3) of the bus nodes (BS1, BS2, BS3), hereinafter referred to as the bus node (BSn) of interest, is electrically connected to the two-wire data bus section (bn) of interest. However, a transfer gate (TGn) of the bus node ($BS_n$) of interest is not provided in this instance. The transfer gate (TGn) of the bus node (BSn) of interest may, however, optionally be included as well. The two-wire data bus interface (OWS1, OWS2, OWS3) of the bus node (BSn) of interest is again provided to receive data from the two-wire data bus section (b1, b2, b3) of interest, using a data bus protocol with more than two differential physical voltage and/or current levels. The two-wire data bus interface (OWS1, OWS2, OWS3) of the bus node (BSn) of interest is provided to transmit data via the two-wire data bus section (b1, b2, b3) of interest, using a data bus protocol with more than two differential physical voltage and/or current levels. In contrast to the above described configurations, however, the bus node (BSn) of interest is now also provided with a master two-wire data bus interface (OWM) of the bus node (BSn) of interest to which the succeeding two-wire data bus section (b(n+1)) is connected. This two-wire data bus interface (OWS1, OWS2, OWS3) of the bus node (BSn) of interest is provided to transmit data and receive data bidirectionally via at least the aforesaid succeeding two-wire data bus section (b(n+1)) of the two-wire data bus sections (b1, b2, b3), hereinafter referred to as the succeeding two-wire data bus section (b(n+1)), using a data bus protocol with more than two differential physical voltage and/or current levels. Thus, the bus node (BSn) of interest can behave as a bus master towards the succeeding bus node (BS(n+1)). The bus node (BSn) of interest can transmit self-generated data to the succeeding bus node (BS(n+1)) and/or directly relay the transmission data stream, which is received e.g. via the own bus master interface (OWMn), to the succeeding bus node (BS(n+1)). In this case, the two-wire data bus interface (OWSn) of the bus node (BSn) of interest and the own master two-wire data bus interface (OWM) of the bus node (BSn) of interest operate like a corresponding transfer gate (TGn) of the bus node (BSn) of interest.

In order to control this bus master interface (OWMn) of the bus node (BSn) of interest, the bus node (BSn) of interest preferably comprises a bus master control register (OWMCRn) and corresponding control lines (ctr1, ctr2, ctr3) (see FIGS. 14 and 15). The bus master control register (OWMCRn) of the bus node (BSn) of interest is configured to control the master two-wire data bus interface (OWM) of the bus node (BSn) of interest, where "control" may include the complete deactivation of the interface. If a bus master interface (OWMn) in a bus node (BSn) of interest is at the same time provided with a transfer gate (TGn), it is ensured by means of a logic that
a) only the first three of the four possible states, namely
1. transfer gate (TGn) open and master bus interface (OWMn) deactivated;
2. transfer gate (TGn) of the bus node (BSn) of interest closed and master bus interface (OWMn) of the bus node (BSn) of interest deactivated;
3. transfer gate (TG1, TG2, TG3) of the bus node (BSn) of interest open and master bus interface (OWMn) of the bus node (BSn) of interest activated;
4. transfer gate (TGn) of the bus node (BSn) of interest closed and master bus interface (OWMn) of the bus node (BSn) of interest activated,
are allowed and thus
b) the state "transfer gate (TGn) of the bus node (BSn) of interest closed and master bus interface (OWMn) of the bus node (BSn) of interest activated" is not possible so as to prevent bus conflicts.

To be able to perform control, the bus master (BM) can, according to the disclosure, write the bus master control register (OWMCRn) of the bus node (BSn) of interest via the master two-wire data bus interface (OWM) of the bus master (BM) and the two-wire data bus (b1b2b3) or the two-wire data bus section (b1, b2, b3) and the two-wire data bus interface (OWSn) of the bus node (BSn) of interest, and thereby control the state of the master two-wire data bus interface (OWMn) of the bus node (BSn) of interest.

Further disclosed is a suitable housing (GH) for a bus node (BSn) of interest as described above. This bus node is provided for use in a data bus system for transmitting illumination data for light emitting components (LM1, LM2, LM3) by means of a differential two-wire data bus (b1b2b3). Here, the two-wire data bus (b1b2b3) serves to transmit data between the bus master (BM) and between at least two bus nodes (BS1, BS2, BS3), in particular bus nodes of light emitting components. The two-wire data bus (b1b2b3) is again divided by the bus nodes (BS1, BS2, BS3) into at least two two-wire data bus sections (b1, b2, b3). The two-wire data bus (b1b2b3) is terminated by a bus node, i.e. the terminal bus node (BS3). Preferably, each of the bus nodes (BS1, BS2, BS3), except for a first bus node (BS1) is connected to a preceding bus node (BS1, BS2) of the bus nodes (BS1, BS2, BS3) by a preceding two-wire data bus section (b2, b3) of the two-wire data bus sections (b1, b2, b3). The first bus node (BS1) is connected to the bus master (BM) via a first two-wire data bus section (b1) of the two-wire data bus sections (b1, b2, b3). Preferably, each bus node (BS1, BS2, BS3), except for a terminal bus node (BS3), is connected to a succeeding bus node (BS2, BS3) of the bus nodes (BS1, BS2, BS3) by a succeeding two-wire data bus section (b2, b3) of the two-wire data bus sections (b1, b2, b3). The housing (GH) of the bus node (BSn) which is provided for use in such a data bus system, preferably comprises at least two rows of connectors, i.e, a first row of connectors (LED1, LED2, GND, b1a, b1b, $V_{bat}$) and a second row of connectors (LED3, LED4, GND, b2a, b2b, $V_{bat}$). These at least two rows of connectors are arranged opposite each other on the housing (GH). Preferably each of the rows of connectors comprises a connector for the negative supply voltage, the second reference potential (GND) and a respective connector for the positive supply potential ($V_{bat}$). The connectors for the negative supply potential and the positive supply potential are arranged such in each row of connectors that they can be connected free of intersection, if the connector (GND) for the negative supply voltage and that for the second reference potential (GND) of the first row of connectors are connected to the connector (GND) for the negative supply voltage or that for the second supply potential (GND), respectively, of the second row of connectors, and if the connector for the positive supply potential ($V_{bat}$) of the first row of connectors is connected to the connector for the positive supply voltage ($V_{bat}$) of the second row of connectors. This has the advantage that, in case of a chain of light emitting components, the housings (GH) can be arranged in succession without requiring through-connections.

The two connectors (b1a, b1b) for a preceding two-wire data bus section (bn) of the bus node (BSn) of interest in the first row of connectors are arranged between the connector (GND) for the negative supply potential and the connector for the second reference potential (GND) of the first row of connectors and the connector for the positive supply voltage ($V_{bat}$) of the first row of connectors. Electromagnetic radiation of the two-wire data bus (b1b2b3) is minimized thereby. The two connectors (b2a, b2b) for a succeeding two-wire data bus section (b2) of the bus node in the second row of connectors are arranged between the connector (GND) for the negative supply potential and the connector for the second reference potential (GND) of the second row of connectors and the connector for the positive supply voltage ($V_{bat}$) of the second row of connectors. Again, electromagnetic radiation of the two-wire data bus (b1b2b3) is minimized thereby.

The connectors for the supply and/or for the control of light emitting components (LED1, LED2, LED3, LED4) in their respective row of connectors are arranged such that, in the respective row of connectors, the connector for the supply voltage via which the electric current is discharged, which flows through the light emitting components (LED1, LED2, LED3, LED4) from these connectors for the supply and/or for the control of light emitting components (LED1, LED2, LED3, LED4), are positioned, in the respective row of connectors, between the two connectors (b1a, b1b and b2a, b2b, respectively) for the associated two-wire data bus section (b1 and b2, respectively) and the connectors or the supply and/or for the control of light emitting components (LED1, LED2, LED3, LED4). This is advantageous in that the light emitting components (here the light emitting diodes LED1, LED2, LED3, LED4) can be connected to the bus node in a manner free of intersections.

In cooperation with the bus system described herein, the housing thus designed is therefore suited to minimize parasitic electromagnetic radiation.

The device suggested also comprises a light module with a housing (GH) for a bus node (BSn). This bus node (BSn) represents one of the above described bus nodes and is preferably configured as an integrated circuit. The light module is provided to be implemented in a data bus system for transmitting illumination data for light emitting components (LED1, LED2, LED3) using a differential two-wire data bus (b1b2b3). Preferably, the data bus is configured to be differential. Here, the two-wire data bus (b1b2b3) serves to transmit data between a bus master (BM) and at least two bus nodes (BS1, BS2, BS3), here bus nodes of light emitting components. The two-wire data bus (b1b2b3) is divided into at least two two-wire data bus sections (b1, b2, b3) by the bus nodes (BS1, BS2, BS3).

This allows an auto-addressing of the light modules. Various auto-addressing methods for participants in serial bus systems are known from prior art. DE-B-10 256 631, DE-A-10 2014 003 066, EP-B-1 364 288 and EP-B-1 490 772 may be cited as examples for auto-addressing methods from prior art.

A star structure is not suitable for auto-addressing. Due to the above described transfer gate in combination with an own bus master interface in the bus nodes, it is possible to change, in operation, between a linear structure for performing the auto-addressing and a star structure. Thereby, it is possible, if needed, to simultaneously address, in operation, a large number of bus nodes by one data instruction without losing the advantage of auto-addressing.

Typically, each of the bus nodes (BS2, BS3), except for a first bus node (BS1), is provided for connection to a preceding bus node (BS1, BS2) of the bus nodes (BS1, BS2, BS3) or the bus master (BM) via a preceding two-wire data bus section (b2, b3) of the two-wire data bus sections (b1, b2, b3).

The housing (GH) of the bus node (BSn) comprises at least two rows of connectors, namely a first row of connectors (GND, b1a, b1b, $V_{bat}$) and a second row of connectors (GND, b2a, b2b, $V_{bat}$).

At least these two rows of connectors are arranged opposite each other on the housing (GH).

Each of the rows of connectors respectively comprises a connector (GND) for the negative supply potential, the second reference potential, and for the positive supply voltage ($V_{bat}$). The connectors for the negative supply voltage and the positive supply voltage are arranged such in each row of connectors that they can be connected without intersection, if the connectors (GND) for the negative supply voltage and that for the second reference potential (GND) of the first row of connectors are connected to the connector (GND) for the negative supply voltage and to that for the second reference potential (GND) of the second row of connectors, respectively, and if the connector for the positive supply voltage ($V_{bat}$) of the first row of connectors is connected to the connector for the positive supply voltage ($V_{bat}$) of the second row of connectors. The two connectors (b1a, b1b) for a preceding two-wire data bus section (b1) of the bus node are arranged in the first row of connectors between the connector (GND) for the negative supply voltage and that for the second reference potential (GND) of the first row of connectors and the connector for the positive supply potential ($V_{bat}$) of the first row of connectors. The two connectors (b2a, b2b) for a succeeding two-wire data bus section (b2) of the bus node are arranged in the second row of connectors between the connector (GND) for the negative supply voltage and that for the second reference potential (GND) of the second row of connectors and the connector for the positive supply potential ($V_{bat}$) of the second row of connectors.

At least one light emitting component (LED1, LED2, LED3) is arranged in a recess (ASP) of the housing. Such a housing has the advantage that large amounts of data can be transmitted to the light emitting component with little parasitic radiation. Therefore, such housings are particularly suitable for use in imaging light module groups. Here, the light modules are arranged in series one after the other.

In a further example of the housing, at least three light emitting components (LED1, LED2, LED3) are arranged in a recess (ASP) of the housing. The at least three light emitting components (LED1, LED2, LED3) preferably have light colors that differ in human perception, so that a color impression can be created by setting different luminosities for the different light emitting components.

The implementation of the above described device and the above described method allows for a light module having a housing (GH) for an integrated circuit as a bus node (BSn). The light module is intended for use in a multi-dimensional data bus system for the transmission of illumination data for light emitting components (LED1, LED2, LED3) by means of a differential two-wire data bus (b1b2b3). The above suggested bus structure allows for auto-addressing also in case of an array arrangement of light emitting components and to send broadcast messages to all light modules after initialization. The two-wire data bus (b1b2b3) is again provided for the transmission of data between a bus master (BM) and between at least two bus nodes (BS1, BS2, BS3), in particular bus nodes of light emitting components. The two-wire data bus (b1b2b3) is divided into at least two two-wire data bus sections (b1, b2, b3) by the bus nodes (BS1, BS2, BS3). However, in the present instance, these do not have to be arranged linearly one after the other, but can be arranged in a checkered manner. An initialization is necessary only at the start. In the present instance, each bus node (BS2, BS3), except for a first bus node (BS1), is provided for connection to a preceding bus node (BS1, BS2) of the bus nodes (BS1, BS2, BS3) or the bus master (BM) via a preceding two-wire data bus section (b2, b3) of the two-wire data bus sections (b1, b2, b3). At least one bus node (BSn) can be connected to at least three two-wire data bus sections (b1, b2, b3). This allows for a branching of the data bus. For this purpose, the respective bus node (BSn) must comprise two separate master two-wire data bus sections (OWMa, OWMb) and/or two transfer gates (TGa, TGb) to be able to control the now two succeeding two-wire data bus sections. Another variant is a configuration having three separate master two-wire data bus sections (OWMa, OWMb, OWMc) and/or three transfer gates (TGa, TGb, TGc) to be able to control three succeeding two-wire data bus sections. However, this is not ultimately necessary. Basically, the configuration having two separate master two-wire data bus sections (OWMa, OWMb, OWMc) and/or two transfer gates (TGa, TGb, TGc) is quite sufficient to be able to fill a two-dimensional surface with light modules. Therefore, the housing (GH) of the bus node (bn) should comprise at least three rows of connectors, namely a first row of connectors ($V_{bat}$, b1a, b1b), a second row of connectors (GND, b2a, b2b), as well as a third row of connectors ($V_{bat}$, b3a, b3b) and, possibly, a fourth row of connectors (GND, b4a, b4b). At least these three or four rows of connectors on the housing (GH) are arranged under an angle of 90° with respect to each other. Here, two rows of connectors are arranged directly opposite each other. Each of the three or four rows of connectors has at least one adjacent row of connectors arranged under an angle of 90° with respect thereto. Each of the rows of connectors comprises exactly one connector for a supply voltage (GND, $V_{bat}$). Each of the rows of connectors that is adjacent to another row of connectors has a connector for anther supply voltage than the supply voltage of the connector in the adjacent row of connectors. In all rows of connectors, this connector for the supply voltage respectively is the first connector in the row of connectors, given the same direction of counting, i.e. clockwise or counter-clockwise. Each row of connectors comprises the two connectors of a two-wire data bus section. These two connectors of this one two-wire data bus section are respectively adjacent to the connector for the supply voltage in the respective row of connectors. At least one light emitting component (LED1, LED2, LED3) is arranged in a recess (ASP) of the housing (GH) or on the housing (GH).

In a particular example of this light module, a first connector for a first supply voltage is in a first row of connectors, whereas a second connector for this first supply voltage is in a second row of connectors. This first row of connectors is arranged opposite the second row of connectors. The first connector is electrically connected to the oppositely arranged second connector by a mounting support (English: lead frame). Thereby, the supply lines can be placed free of intersections.

It is particularly advantageous if the light module is provided to be assembled into a light module system together with a light module with horizontally and vertically mirrored positions of the supply voltage connectors (GND, $V_{bat}$). (see FIG. 18)

DESCRIPTION OF THE FIGURES

The disclosure will be explained in more detail hereunder with reference to various examples and to the drawings.

FIG. 1 has been explained in the introduction.

FIG. 2

FIG. 2 shows the basic signal shapes of the data protocol of the disclosure on the two-wire data bus (b1b2b3) or a connected two-wire data bus section (b1, b2, b3) of the two-wire data bus (b1b2b3). In the upper part of FIG. 2, the signal shapes of the differential levels for a two-wire test bus analogous to the IEEE 1149 standard are schematically shown. The topmost signal (TDA) shows the data signal. The second signal (TCK) shows the associated system clock (TCK). Although they refer to a differential level in this case, both signals are marked as prior art and belong to the 2-wire JTAG standard. Beneath, the digital encoding is noted as an example. It is not yet shown, whether the respective bus node (BSn) or the bus master (BM) transmits. Only the signal shape is outlined.

FIG. 3

FIG. 3 illustrates a suggested signal shape in the form of the differential signal level (TOW) on the two-wire data bus (b1b2b3) or a connected two-wire data bus section (b1, b2, b3) of the two-wire data bus (b1b2b3), which combines the clock and the data.

Figure 1:
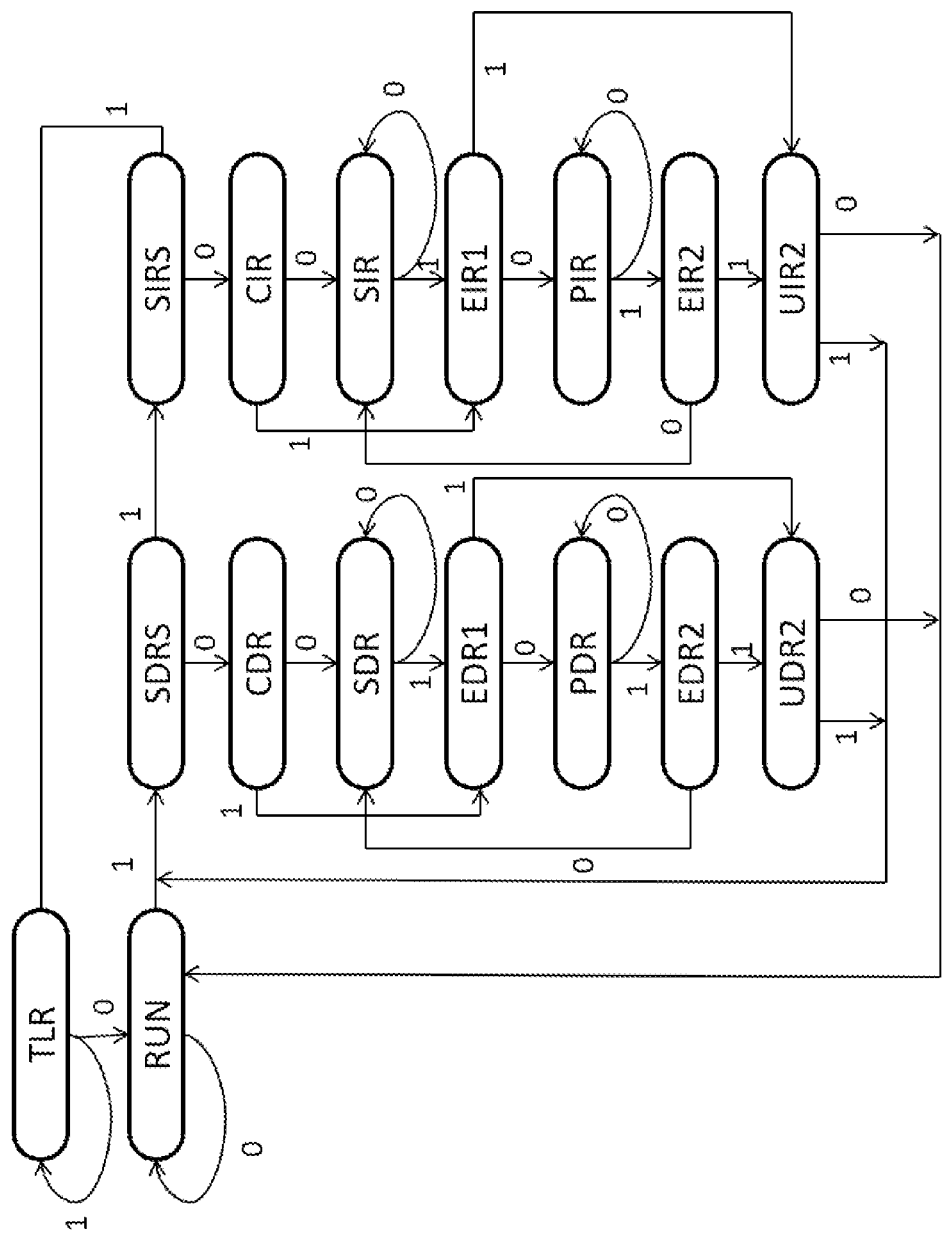
FIG. 1 shows a state diagram of a test controller according to the IRRR 1149 standard.
Figure 2:
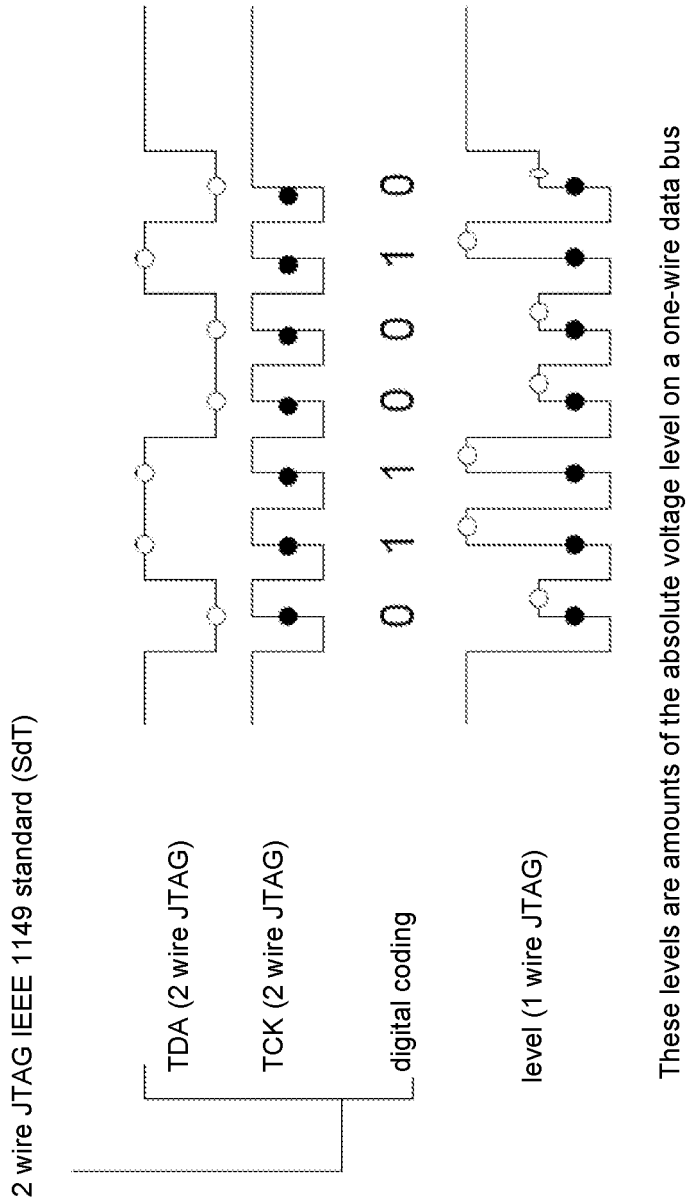
FIG. 2 shows the basic signal shapes of a JTAG data protocol of the prior art.
Figure 3:
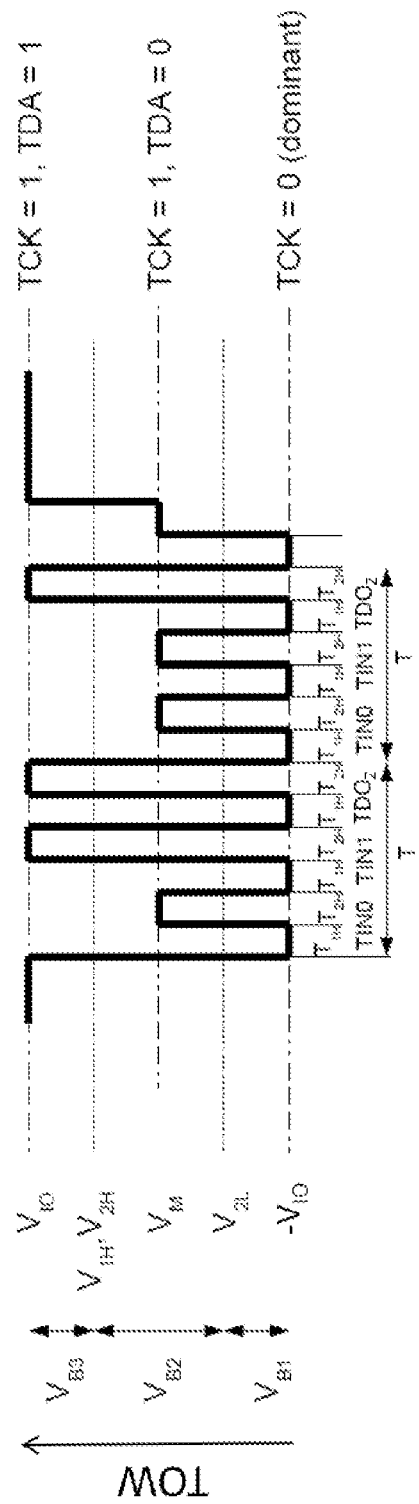
FIG. 3 shows the basic signal shapes of the suggested data protocol on the two-wire data bus (b1b2b3) or a connected two-wire data bus section (b1, b2, b3) of the two-wire data bus (b1b2b3).

Various differential voltage levels are outlined. Upon transmission, the differential signal (TOW) has three differential voltage level amounts:
1. a third differential voltage value level ($V_{IO}$),
2. a medium second differential voltage value level ($V_M$), and
3. a first differential voltage value level ($-V_{IO}$).

For the extraction of the system clock, a second threshold value ($V_{1L}$) is defined in the form of a second threshold voltage value, which is between the first differential voltage value level ($-V_{IO}$) and the medium second differential Voltage value level ($V_M$).

For the extraction of the data, threshold voltage value, the first threshold value ($V_{1H}$), of the bus master (BM) and a third threshold voltage value, the third threshold value ($V_{2H}$), of the bus nodes (BS1, BS2, BS3) are defined, which are between the third differential voltage value level ($V_{IO}$) and the medium second differential voltage value level ($V_M$) and should be about equal.

A first voltage value range ($V_{B1}$) is defined and delimited by the second threshold value ($V_{2L}$) in the form of the second threshold voltage value of the bus nodes (BS1, BS2, BS3) and by the first differential voltage value level ($-V_{IO}$).

A second voltage value range ($V_{B2}$) is defined and delimited by the third threshold voltage value, the third threshold value ($V_{2H}$), of the bus nodes (BS1, BS2, BS3) and the first threshold voltage value of the first threshold value ($V_{1H}$) of the bus master (BM) on the one hand and the second threshold voltage value of the second threshold value ($V_{2L}$) of the bus nodes (BS1, BS2, BS3) on the other hand.

A third voltage value range ($V_{B3}$) is defined and delimited by the third threshold voltage value, the third threshold voltage ($V_{2H}$) of the bus nodes (BS1, BS2, BS3) and the first threshold voltage value of the first threshold value ($V_{1H}$) of the bus master (BM) on the one hand and the third differential voltage value level ($V_{IO}$) on the other hand.

Chronologically, the signal on the two-wire data bus (b1b2b3) or a connected two-wire data bus section (b1, b2, b3) of the two-wire data bus (b1b2b3) is divided into time slot packages with at least three time slots (TIN0, TIN1, TDO$_z$) The time slot packages typically follow each other with a system base clock period (T). The order of the time slots in a time slot package may be optional for a system, but should preferably be the same for all time slot packages. Each system base period (T) is divided into at least three time slots, each with typically two half-clock periods ($T_{1H}$, $T_{2H}$) which are preferably, but not necessarily equal in length.

Preferably, the system clock is respectively transmitted in one half-clock period of the at least wo half-clock periods ($T_{1H}$, $T_{2H}$).

Here, the amount of the differential signal level (TOW) on the two-wire data bus (b1b2b3) or the connected two-wire data bus section (b1, b2, b3) of the two-wire data bus (b1b2b3) is in the first voltage value range ($V_{B1}$) in one half-clock period of the at least two half-clock periods ($T_{1H}$, $T_{2H}$). A first logical value of the system clock is transmitted thereby. In the example, it is sufficient that the amount of the signal level (TOW) on the two-wire data bus (b1b2b3) or the connected two-wire data bus section (b1, b2, b3) of the two-wire data bus (b1b2b3) is below the second voltage threshold value, the second threshold value ($V_{2L}$). In many applications, the first voltage value range ($V_{B1}$) may be also considered as open in the downward direction.

In the other half-clock period of the at least two half-clock periods ($T_{1H}$, $T_{2H}$), the differential signal level (TOW) on the two-wire data bus (b1b2b3) or the connected two-wire data bus section (b1, b2, b3) of the two-wire data bus (b1b2b3) is in the second voltage value range ($V_{B2}$) or the third voltage value range ($V_{B3}$). Thereby, a second logical value of the system clock is transmitted which is different from the first logical value of the system clock. In the example, it is sufficient that the differential signal level (TOW) on the two-wire data bus (b1b2b3) or the connected two-wire data bus section (b1, b2, b3) of the two-wire data bus (b1b2b3) is above the second voltage threshold value, the second threshold value ($V_{2L}$) in the form of the second threshold value ($V_{2L}$). An upward limit by the supply voltage ($V_{bat}$) or another upper limit ($V_{IO}$) is not relevant to the decision, whether the signal level (TOW) on the two-wire data bus (b1b2b3) or the connected two-wire data bus section (b1, b2, b3) of the two-wire data bus (b1b2b3) is in the second voltage value range ($V_{B2}$) or the third voltage value range ($V_{B3}$) and is therefore not used in practice. Thus, in many applications, the third voltage value range ($V_{B3}$) may also be considered as open in the upward direction.

Since it is not relevant to the extraction of the system clock in this other half-clock period of the at least two half-clock periods ($T_{1H}$, $T_{2H}$), whether the signal level (TOW) on the two-wire data bus (b1b2b3) or the connected two-wire data bus section (b1, b2, b3) of the two-wire data bus (b1b2b3) is in the second voltage value range ($V_{B2}$) or the third voltage value range ($V_{B3}$), it is now possible to transmit data by differentiating between the third voltage value range ($V_{B3}$) and the second voltage value range ($V_{B2}$) in this other half-clock period of the at least two half-clock periods ($T_{1H}$, $T_{2H}$).

In this other half-clock period of the at least two half-clock periods ($T_{1H}$, $T_{2H}$), the differential signal level (TOW) on the two-wire data bus (b1b2b3) or the connected two-wire data bus section (b1, b2, b3) of the two-wire data bus (b1b2b3) is in the second voltage value range ($V_{B2}$) if a first logical data value is transmitted, and is in the third voltage value range ($V_{B3}$) if a second logical data value is transmitted.

For the sake of understanding, exemplary logical states for the three differential states are plotted on the right next to the lower signal.

In this example, the upper differential level corresponds to an exemplary logical value of the system clock (TOW) of 1 and an exemplary logical value of the data signal (TDA) of 1.

In this example, the medium differential level corresponds to an exemplary logical value of the system clock (TCK) of 1 and an exemplary logical value of the data signal (TDA) of 0.

In this example, the lower differential level corresponds to an exemplary logical value of the system clock (TCK) of 0.

FIG. 4

Figure 4:
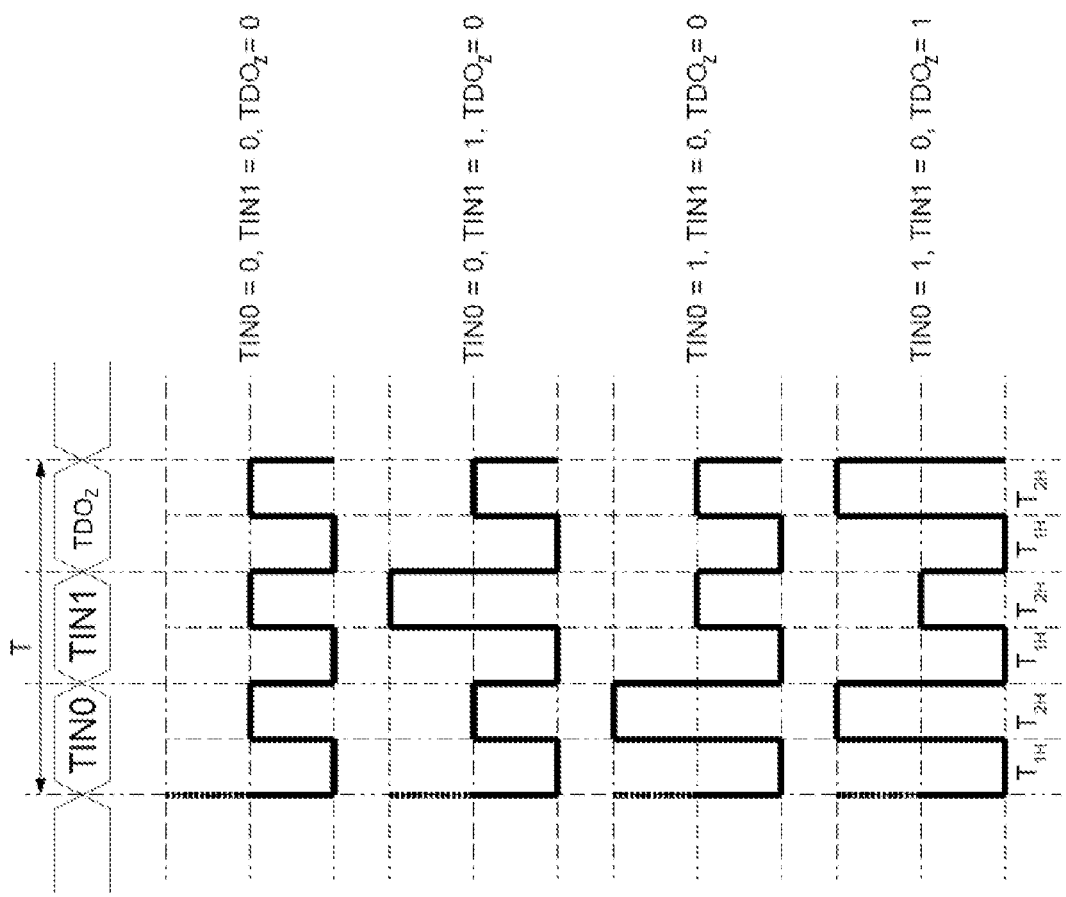
FIG. 4 shows examples of level sequences for a respective time slot package of a duration T with three successive time slots.

FIG. 4 shows an exemplary protocol sequence of three successive time slots (TIN0, TIN1, TDO$_z$). in other implementations of the disclosure, a time slot package may also comprise more than three time slots (TIN0, TIN1, TDO$_z$). In the first time slot (TIN0), typically, control data are transmitted that correspond to the TMS signal of the boundary scan standard (IEEE1149). This signal typically controls the state of the finite automat according to the state diagram in FIG. 1. In the second time slot (TIN1), those data are typically transmitted that correspond to the TDI signal of the boundary scan standard (IEEE1149). In these two time slots, the bus master (BM) transmits data onto the bus node. If the bus node should also transmit in parallel, the bus node overwrites the bus master (BM) if the switchable current source (T1a, T1b) thereof is deactivated. Conversely, the bus master (BM) can overwrite the bus node if the switchable current source (T3a, T3b) of the bus node is deactivated. The bus master (BM) can detect an overwriting of the bus master (BM) by the bus node by examining, using a logic in the bus master (BM), the logical content of the transmitted data (TMS_TDI) for whether these correspond to the received data (TDo) in the respective half-clock in which the system clock (TCK) of the dominant switch (T1a, T1b) does not close. In case of such asynchronicity, the bus master (BM) can, given a suitable configuration of the state machine of the test controllers (TAPC) of the bus nodes, re-synchronize these by permanently maintaining the differential signal level (TOW) on the two-wire data bus (b1b2b3) or the connected first two-wire data bus section (b1) of the two-wire data bus (b1b2b3) in the third voltage value range ($V_{B3}$). For this purpose, the state machine of the test controllers (TAPC) of the bus nodes must be configured such that a permanent maintaining in the third voltage value range ($V_{B3}$) causes a reset in the control field, i.e. e.g. in the first time slot (TINO), in the form of assuming a so-called "idle state" (TLR) as a waiting state of the test controllers (TAPC). This is the case with a state diagram of a JTAG controller according to the IEEE 1149 standard. This permanent maintaining of the differential signal level (TOW) on the two-wire data bus (b1b2b3) or the connected first two-wire data bus section (b) of the two-wire data bus (b1b2b3) in the third voltage value range ($V_{B3}$) can be effected by the switchable current source (T2a, T2b) of the bus master (BM) being switched on permanently for the duration of the reset operation.

FIG. 5

Figure 5:
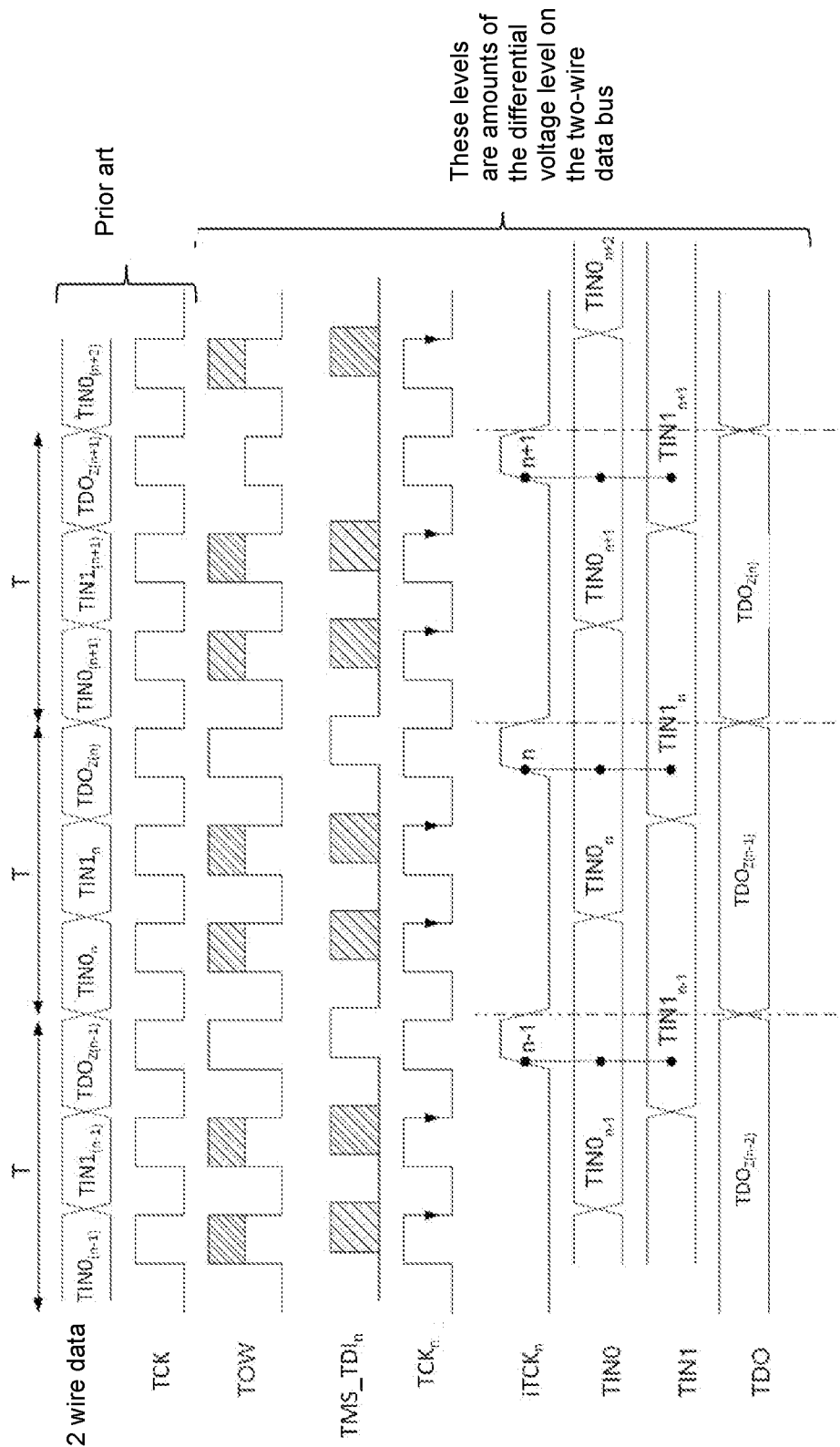
FIG. 5 is an exemplary illustration of the extraction of the data in the respective bus node (BSn) for three successive time slots.

FIG. 5 shows an exemplary sequence of differential signals according to the disclosure. The two-wire based data referenced as "2 wire data", which are not differential, are the input. In the example, three successive time slot packages (n−1, n, n+1) are illustrated, each having e.g. three time slots (TIN0, TIN1, $TDO_z$). Of course, it is conceivable to use more than three time slots per time slot package. The importance of the respective time slots in a time slot package only depends on the chronological position and does not change. When, in this description, reference is made to the first time slot (TIN0), the second time slot (TIN1) and the third time slot ($TDO_z$), this is a mere denomination and does not refer to the position in a time slot package. Preferably, the chronological positioning of the individual at least three time slots (TIN0, TIN1, $TDO_z$) in the time slot packages is always the same or can at least be predicted by means of an algorithm. The Figure further shows the associated system clock (non-differential 2-wire clock). In the time slot package n−1, the respective bus node (BSn) supplies a logical 1 in the time slot $TDO_{Z(n-1)}$ and, in the time slot package n, a logical 1 in the time slot $TDO_{Z(n)}$ and, in the time slot package n+1, a logical 0 in the time slot $TDO_{Z(n+1)}$. The data transmitted by the bus master (BM) in the time slots $TIN0_{n-1}$, $TIN1_{n-1}$, $TIN0_n$, $TIN1_n$, $TIN0_{n+1}$, $TIN1_{n+1}$ are not fixed as examples with respect to their logical content and are therefore shown hatched. The signal referenced as "TOW" is to schematically illustrate the differential potential progression of the differential signal level (TOW) on the two-wire data bus (b1b2b3 ... $b_n$, ... $b_m$) or a connected n-th two-wire data bus section (b1, b2, b3 ... $b_n$, ... $b_m$) of the two-wire data bus. From this potential progression of the potential difference on the respective two-wire data bus section ($b_n$), e.g. the third comparator (cmp3) of the respective bus node (BSn) generates the data ($TMS\_TDI_n$) received by the respective bus node (BSn). From the differential potential progression of the differential signal level (TOW) on the respective two-wire data bus section ($b_n$), e.g. the second comparator (cmp2) of the respective bus node (BSn) generates the clock signal ($TCK_n$) received by the respective bus node (BSn), which clock signal corresponds to the reconstructed system clock (TCK). Given a suitable synchronization of the respective bus node (BSn) and the bus master (BM), the respective bus node (BSn) generates an internal system base clock (ITCK$_n$) which shows a pulse with a duration of a half-clock period only in the second half-clock period ($T_{2H}$) of the third time slot ($TDO_z$) of the system base clock period (T) of the n-th time slot package. With the rising edge of this system base clock signal, the respective bus node (BSn) in this example accepts the logical values of the data ($TMS\_TDI_n$) transmitted by the bus master (BM) which were detected by means of the following falling edge of $TCK_n$. with the falling edge of the clock signal ($TCK_n$) at the beginning of the next time slot package, the value ($TDO_n$) to be transmitted in this example by the respective bus node (BSn) is changed. However, $TDO_n$ will become active only in the third time slot ($TDO_{Z(n+1)}$) of the subsequent n+1-th time slot package, when the respective bus node (BSn) is allowed to transmit. A skilled person is aware that the control is possible not only by means of the control illustrated in FIG. 5, using the falling edge of the system clock ($TCK_n$), but also by using the rising edge.

FIG. 6

Figure 6:
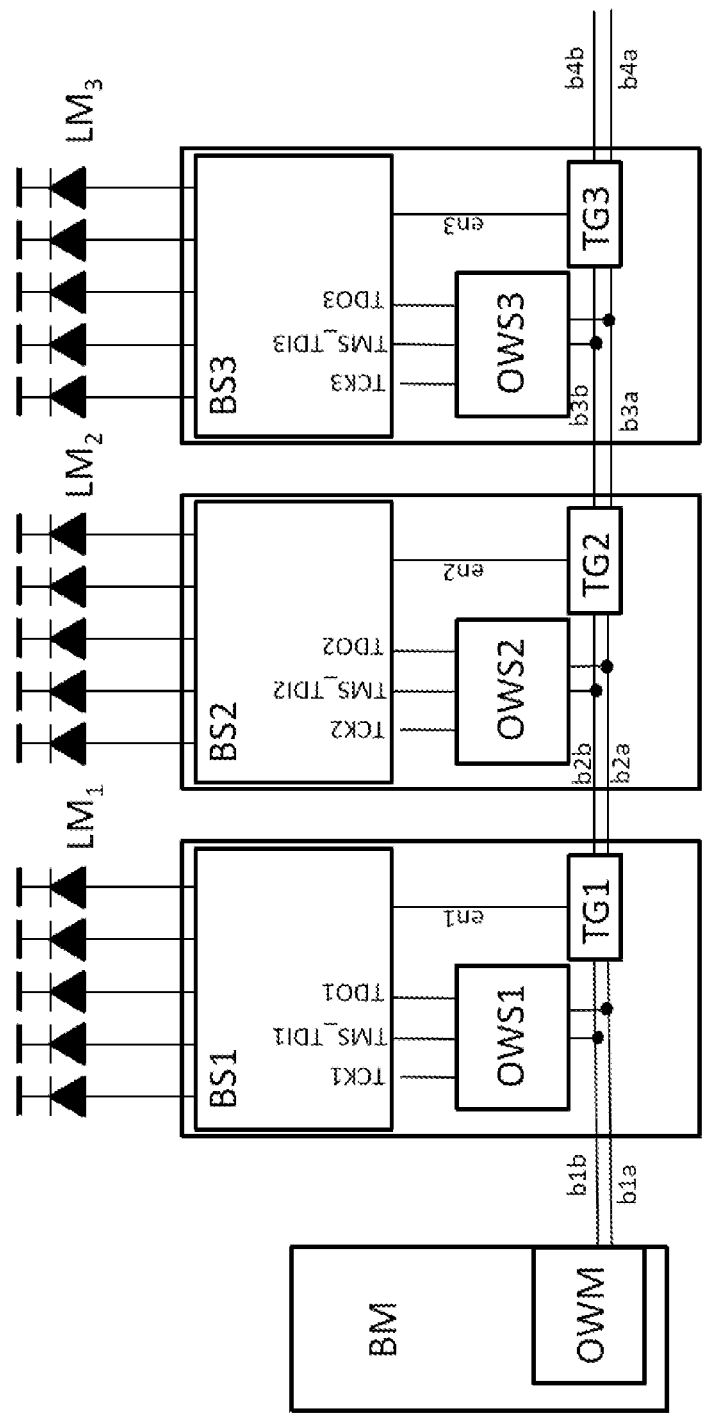
FIG. 6 schematically shows an exemplary two-wire data bus system.

FIG. 6 illustrates an exemplary two-wire data bus (b1b2b3) with three bus nodes (BS1, BS2, BS3), three two-wire data bus sections (b1, b2, b3) and one bus master (BM). The first two-wire data bus section (b1) connects the bus master (BM) to the first bus node (BS1).

The second two-wire data bus section (b2) connects the second bus node (BS2) to the first bus node (BS1). The third two-wire data bus section (b3) connects the third bus node ((BS3) to the second bus node (BS2).

The two-wire data bus is controlled by the bus master (BM) by means of a master two-wire data bus interface (OWM) to which the first two-wire data bus section (b1) is connected.

The first two-wire data bus interface (OWS1) is connected to the first two-wire data bus section (b1). Via this first two-wire data bus section (b1), it receives data from the bus master (BM) and transmits such data to the same. Internally, it provides a first reconstructed system clock (TCK1) with which the internal JTAG interface of the first bus node (BS1) is operated. Further, it provides the first combined TMS-TDI signal (TMS_TDI1) which, in this example, includes the test mode signal (TMS) and the data input signal (TDI) in time-division multiplex. The finite automat (finite state machine) of the test controller (TAPC) of the JTAG interface of the first bus node (BS1) is controlled with the test mode signal (TMS). The data of the TDI signal portion are used to load the shift registers of the JTAG interface of the first bus node (BS1). Conversely, the JTAG interface supplies data back from the registers of the JTAG interface of the first bus node (BS1) with the serial TDo output signal. By a first transfer gate (TG1), the first two-wire data bus section (b1) can be connected to the following second two-wire data bus section (b2). For this purpose, the bus master (BM) writes a transfer gate control register (TGCR) of the first bus node (BS1), not shown, via the first two-wire data bus section (b1) and sets a flag in said transfer gate control register (TGCR) of the first bus node (BS1), which flag sets or cancels the first enable line ($en_1$) in the first bus node (BS1). Depending on this first enable line ($en_1$) of the first bus node (BS1), the first transfer gate (TG1) of the first bus node (BS1) is opened and closed. Thus, the two-wire data bus (b1b2b3) can be prolonged or shortened by means of an instruction from the bus master (BM) to the first bus node (BS1).

The second two-wire data bus interface (OWS2) is connected to the second two-wire data bus section (b2). Via this second two-wire data bus section (b2), it receives data from the bus master (BM), if the first bus node (BS1) has closed its transfer gate (TG1). The second two-wire data bus interface (OWS2) also transmits such data to the bus master (BM). Internally, it provides a second reconstructed system clock (TCK2) with which the internal JTAG interface of the second bus node (BS2) is operated. Further, it provides the second combined TMS-TDI signal (TMS_TDI2) which, in this example, includes the test mode signal (TMS) and the data input signal (TDI) in time-division multiplex. The finite automat (finite state machine) of the test controller (TAPC) of the JTAG interface of the second bus node (BS2) is controlled with the test mode signal (TMS). The data of the TDI signal portion are used to load the shift registers of the JTAG interface of the second bus node (BS2). Conversely, the JTAG interface of the second bus node (BS2) supplies data back from the registers of the JTAG interface of the second bus node (BS2) with the serial TDo output signal. By a second transfer gate (TG2), the second two-wire data bus section (b2) can be connected to the third two-wire data bus section (b3). For this purpose, the bus master (BM) writes a transfer gate control register (TGCR) of the second bus node (BS2), not shown, via the first two-wire data bus section (b1) and the second two-wire data bus section (b2) and sets a flag in said transfer gate control register (TGCR) of the second bus node (BS2), which flag sets or cancels the second enable line (en$_2$) of the second bus node (BS2). Depending on this second enable line (en$_2$) of the second bus node (BS2), the second transfer gate (TG2) of the second bus node (BS2) is opened and closed. Thus, the two-wire data bus (b1b2b3) can be prolonged or shortened even further by means of an instruction from the bus master (BM).

The third two-wire data bus interface (OWS3) is connected to the third two-wire data bus section (b3). Via this third two-wire data bus section (b3), is receives data from the bus master (BM), if the first bus node (BS1) has closed its transfer gate (TG1) and if the second bus node (BS2) has also closed its second transfer gate (TG2). The third two-wire data bus interface (OWS3) also transmits such data to the bus master (BM). Internally, it provides a third reconstructed system clock (TCK3) with which the internal JTAG interface of the third bus node (BS3) is operated. Further, it provides the third combined TMS-TDI signal (TMS_TDI3) which, in this example, includes the test mode signal (TMS) and the data input signal (TDI) for the JTAG interface of the third bus node (BS3) in time-division multiplex. The finite automat (finite state machine) of the test controller (TAPC) of the JTAG interface of the third bus node (BS3) is controlled with the test mode signal (TMS). The data of the TDI signal portion are used to load the shift registers of the JTAG interface of the third node (BS3). Conversely, the JTAG interface of the third bus node (BS3) supplies data back from the registers of the JTAG interface of the third bus node (BS3) with the serial TDo output signal. By a third transfer gate (TG3), of the third bus node (BS3), the third two-wire data bus section (b3) can connect to further two-wire data bus sections (b$_n$). In the present instance, for the sake of example, the third bus node shall terminate the two-wire data bus (b1b2b3).

Each of the bus nodes (BS1, BS2, BS3) is connected to sets of light emitting components (LM1, LM2, LM3) which are controlled by the respective bus node (BS1, BS2, BS3). Of course, other consumers of electric energy are conceivable.

FIG. 7

Figure 7:
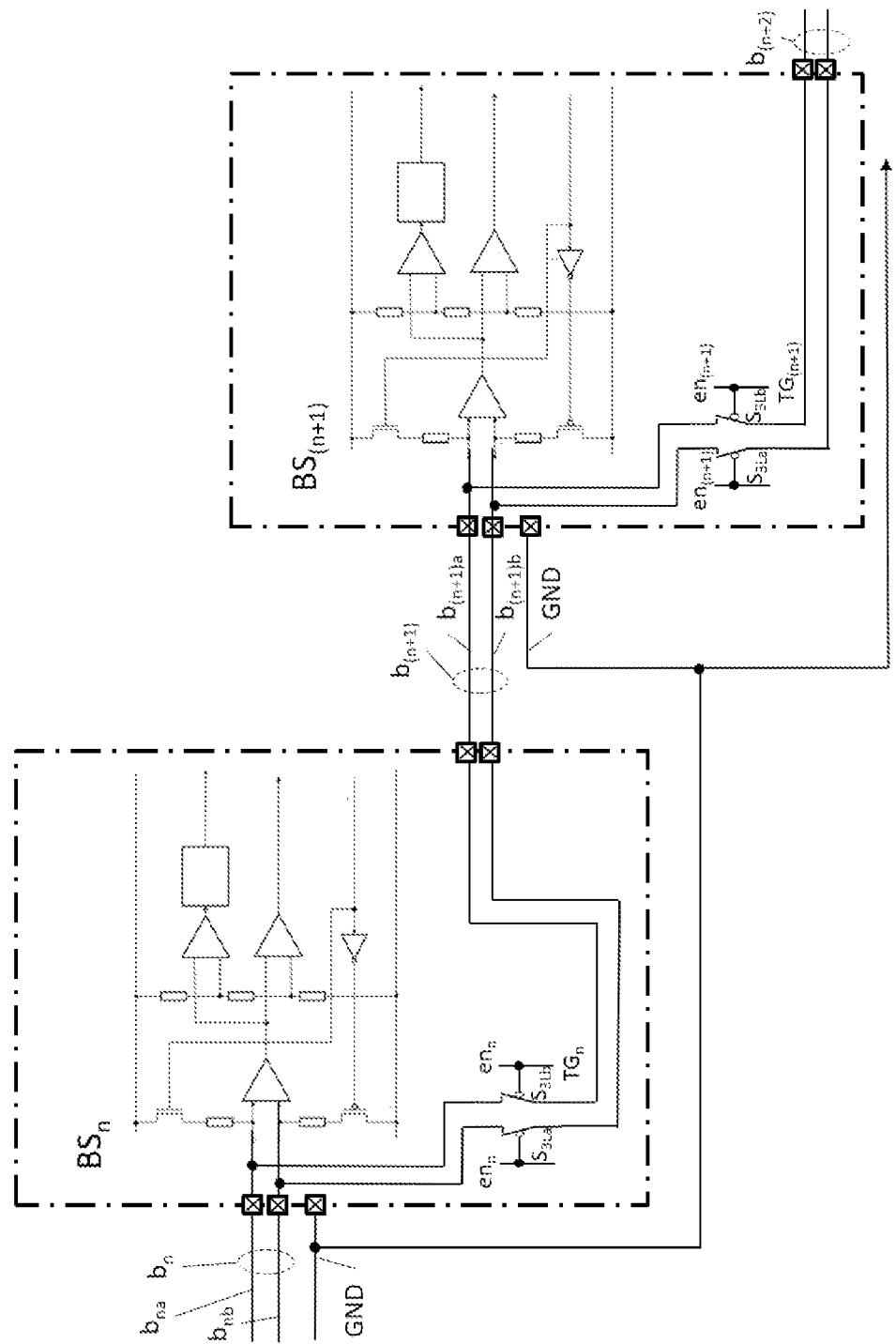
FIG. 7 shows a detail of the exemplary two-wire data bus system: the connection of two successive bus nodes.
Figure 9:
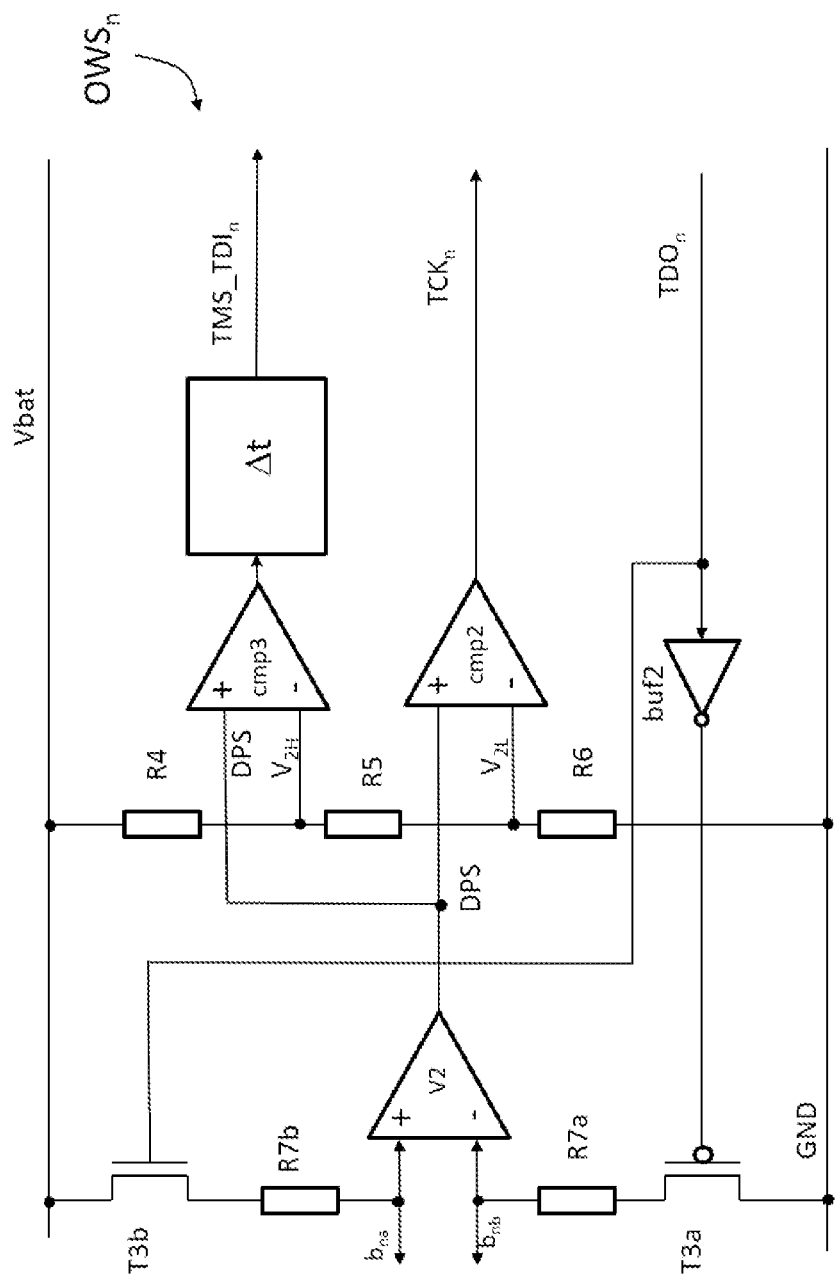
FIG. 9 is a schematic simplified illustration of an exemplary implementation of a bus node/two-wire data bus interface.

FIG. 7 corresponds to the apposition of two bus node data bus interfaces in the form of two right halves of the following FIG. 9. A preceding n-th two-wire data bus section (b$_n$) is connected to a n-th bus node (BS$_n$). This n-th bus node (BS$_n$) can connect this preceding n-th two-wire data bus section (b$_n$) to the succeeding n+1-th two-wire data bus section (b$_{(n+1)}$) via its transfer gate (TGn). If the transfer gate (TG$_n$) of the n-th bus node (BS$_n$) is open, a differential switch, not illustrated, sets the differential level (TOW) on the n+1-th two-wire data bus section (b$_{(n+1)}$), and thus on all succeeding two-wire data bus sections (b$_{(n+1)}$ with i>n+1), if existent or switched on by transfer gates, preferably to a defined differential potential difference and thereby prevents unintentional data transmission.

The n+1-th bus node (BS$_{(n+1)}$) can again connect this preceding n-th two-wire data bus section (b$_n$) to the n+2-th two-wire data bus section (b$_{(n+2)}$) via its transfer gate (TG$_{(n+2)}$). If the transfer gate (TG$_{(n+1)}$) of the n+1-th bus node (BS$_{(n+1)}$) is open, a differential switch, not illustrated, again sets the differential level (TOW) on the n+2-th two-wire data bus section (b$_{(n+2)}$), and thus on all succeeding two-wire data bus sections (b$_{(n+3)}$), if existent or switched on by transfer gates, preferably to a defined differential potential difference and thereby prevents unintentional data transmission.

FIG. 8

Figure 8:
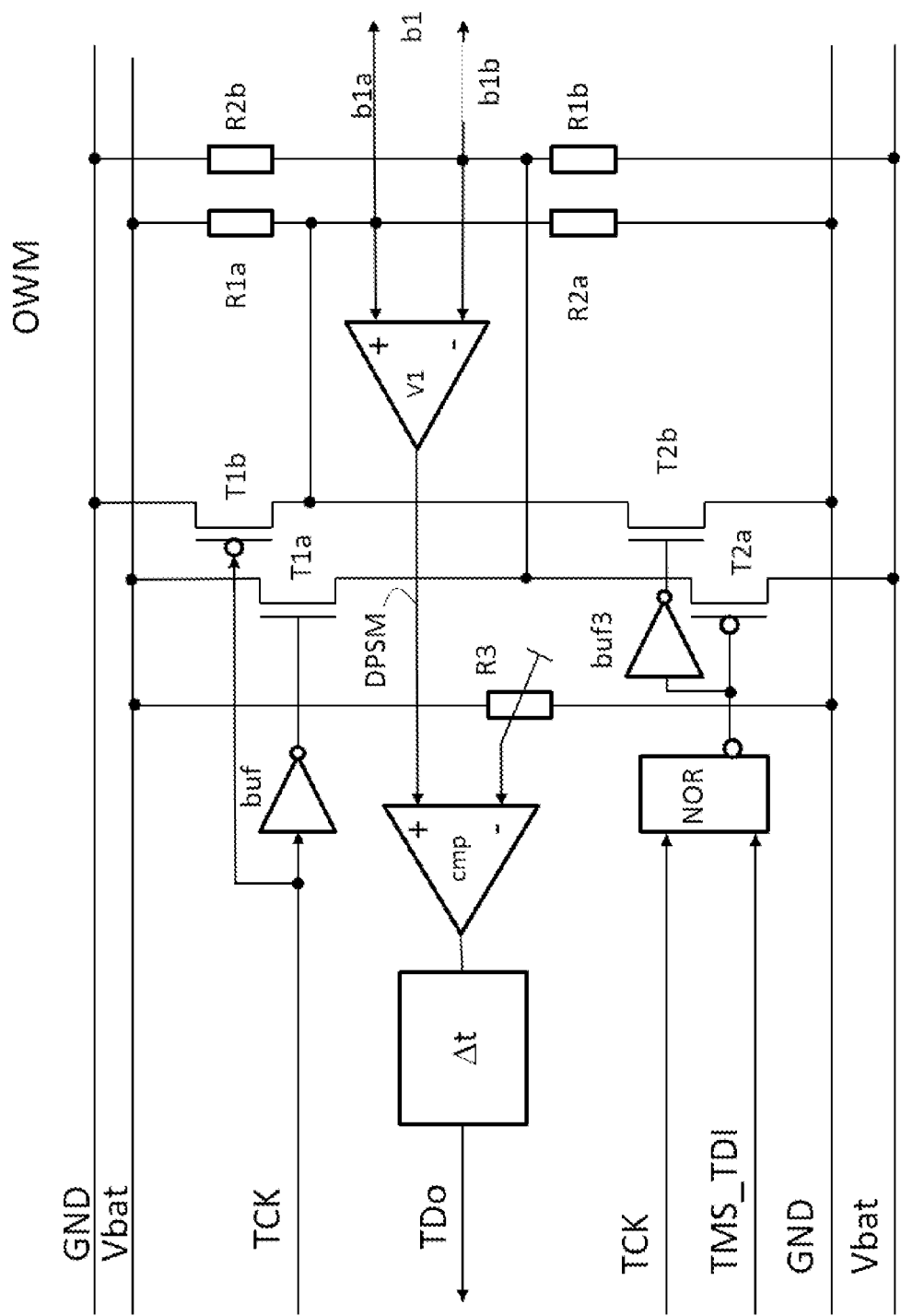
FIG. 8 is a schematic simplified illustration of an exemplary implementation of a bus master/two-wire data bus interface.

FIG. 8 shows the implementation of the disclosure for a master two-wire data bus interface (OWM).

In FIGS. 7 and 8, the essential parts of an interface for the realization of the protocol for a one-wire data bus or the first two-wire data bus section (b1) of the two-wire data bus (b1b2b3), connected as an example in the present instance, between the bus master (BM) and the respective bus node (BSn). Here, the reference potential for the signals on the two-wire data bus (b1b2b3) and the connected first two-wire data bus section (b1) of the two-wire data bus (b1b2b3) is the second reference potential (GND) of the referential potential line (GND) which as an example is connected to ground.

By the differential voltage divider formed by a lower resistor (R2a) between the first one-wire data bus (b1a) and thus the connected first one-wire data bus section (b1a) of the first one-wire data bus (b1a, b2a, b3a) of the two-wire data bus (b1b2b3) and the reference potential line (GND) with the second reference potential (GND) and a further lower resistor (R2b) between the second one-wire data bus (b1b, b2b, b3b) and thus the connected second one-wire data bus section (b1a) of the second one-wire data bus (b1b, b2b, b3b) of the two-wire data bus (b1b2b3) and the reference potential line (GND) with the second reference potential (GND) and an upper resistor (R1a) between the first one-wire data bus (b1a, b2a, b3a) and thus the connected first one-wire data bus section (b1a) of the first one-wire data bus (b1a, b2a, b3a) of the two-wire data bus (b1b2b3) and the supply voltage (V$_{bat}$) with a potential (V$_{IO}$) and a further upper resistor (R1b) between the second one-wire data bus (b1b, b2b, b3b) and thus the connected second one-wire data bus section (b1b) of the second one-wire data bus (b1b, b2b, b3b) of the two-wire data bus (b1b2b3) and the supply voltage (V$_{bat}$) with a potential (V$_{IO}$), the two-wire data bus (b1b2b3) in the form of the connected first two-wire data bus section (b1) is first maintained, with respect to the amount of the differential voltage level (TOW), on a medium second differential voltage value level (V$_M$) between these two potentials (−V$_{IO}$, V$_{IO}$). On the master side, the dominant switches (T1a, T1b) are closed always in one half-clock period of the at least two half-clock periods ($T_{1H}$, $T_{2H}$) of preferably each of the three time slots of a system base clock period (T) of the system base clock. Thereby, a maximum differential signal level (TOW) on the two-wire data bus (b1b2b3) is forced. Since the internal resistance of the dominating switches (T1a, T1b) is preferably smaller than the internal resistance of the differential voltage divider of the two upper resistors (R1a, R1b) and the two lower resistors (R2a, R2b), the differential voltage level, which is the differential signal level (TOW), on the two-wire data bus (b1b2b3) is pulled from said medium second differential voltage value level ($V_M$) in a second voltage value range ($V_{B2}$) to at least the first differential voltage value level ($-V_{IO}$), which is in the first voltage value range ($V_{B1}$), in the respective half-clock period of the at least two half-clock periods ($T_{1H}$, $T_{2H}$) of preferably each of the three time slots of a system base clock period (T) by closing the dominant switches (T1a, T1b). The dominant switches (T1a, T1b) controlled by the system clock on the master side (TCK). If these dominant switches (T1a, T1b) are not closed, data can be transmitted bidirectionally in the other half-clock periods of the at least two half-clock periods ($T_{1H}$, $T_{2H}$) of preferably each time slot of the typically three time slots (TIN0, TIN1, $TDO_z$) of a system base clock period (T). on the bus master side, a switched current source (T2a, T2b) feeds current into the two-wire data bus (b1b2b3), if the transmission line (TMS_TDI) from inside the bus master (BM) is active. For this purpose, the transmission line (TMS_TDI) from inside the bus master (BM) closes the switches (T2a, T2b) of the controllable current source. Preferably, these are transistors (MOS transistors in particular) that are operated as current sources in the activated state. Thus, current mirror circuits are particularly well suited to control them. Thereby, the transistor current sources of the controllable differential current source (T2a, T2b), configured in this manner, supply current into the two-wire data bus (b1b2b3). Preferably, the amount of this current is higher than the amount of the current that the differential pull circuit formed by the upper resistors (R1a, R1b) and the lower resistors (R2a, R2b) can discharge. Thus, in this case, the differential signal level (TOW) in the form of the potential difference on the two-wire data bus (b1b2b3) or at least on the connected first two-wire data bus section (b1) of the two-wire data bus (b1b2b3) moves, with respect to its amount, from the medium second differential voltage value level ($V_M$) in a second voltage value range ($V_{B2}$) to a potential near the supply voltage ($V_{IO}$) for the switchable differential voltage source (T2a, T2b) of the bus master (BM) in the third voltage value range ($V_{B3}$). If, however, the dominant switches (T1a, T1b) are closed, these overwrite the influence of the switchable differential voltage source (T2a, T2b) of the bus master (BM) and of the pull circuit formed by the upper resistors (R1a, R1b) and the lower resistors (R2a, R2b). These are not able, given a suitable configuration of the dominant switches (T1a, T1b), to determine the amount of the signal level (TOW) on the two-wire data bus (b1b2b3) or at least on the first two-wire data bus section (b1) of the two-wire data bus (b1b2b3), connected for the sake of example, against the dominant switches (T1a, T1b).

The second switchable current source on the bus node side operates in the same manner, see FIG. 9. On the bus node side, a switched current source (T3a, T3b) feeds current into the two-wire data bus (b1b2b3) or the connected two-wire data bus section (b1, b2, b3) of the two-wire data bus (b1b2b3), if the transmission line ($TDO_n$) from inside the bus master (BM) is active. For this purpose, the transmission line ($TDO_n$) from inside the bus master (BM) of the bus node (BSn) of interest closes the switches (T3a, T3b) of the controllable current source. Preferably, the third transistor (T3a) shown in FIG. 8 and the further third transistor (T3b) are operated as a switchable current source. Thereby, the current source of the controllable current source (T3a, T3b) supplies current into the two-wire data bus (b1b2b3) or the connected two-wire data bus section (bn) of the one-wire data bus. Again, this current is preferably larger than the current that the pull circuit formed by the upper resistors (R1a, R1b) and the lower resistors (R2a, R2b) can discharge. Thus, the amount of the differential signal level (TOW) of the two-wire data bus (b1b2b3) or the connected two-wire data bus section (bn) in this case moves from the medium second differential voltage value level ($V_M$) in a second voltage value range ($V_{B2}$) to a potential near the supply voltage ($V_{IO}$) for the switchable current source (T3a, T3b) of the bus node (BSn) of interest in the third voltage value range ($V_{B3}$). If, however, the dominant switches (T1a, T1b) in the bus master (BM) are closed, these again overwrite the influence of the switchable current source (T3a, T3b) of the bus node (BSn) of interest and of the differential pull circuit (R1a, R1b, R2a, R2b). Given a suitable configuration of the dominant switch (T1a, T1b), both are unable to determine the differential signal level (TOW) on the two-wire data bus (b1b2b3) or the connected two-wire data bus section (bn) of the two-wire data bus (b1b2b3) against the dominant switches (T1a, T1b). Even if the switchable current sources (T2a, T2b) of the bus master (BM) are switched on in addition, the dominant switches (T1a, T1b) of the bus master (BM) will, given a suitable configuration thereof, still determine the differential signal level (TOW) on the two-wire data bus (b1b2b3) or the connected two-wire data bus section (bn) of the two-wire data bus (b1, b2, b3).

On the bus node side, a third comparator (cmp3) compares the amount of the differential signal level (TOW) on the two-wire data bus (b1b2b3) or the connected two-wire data bus section (bn) of the two-wire data bus (b1, b2, b3). to a third threshold value ($V_{2H}$). At the same time, a second comparator (cmp2) compares the amount of the differential signal level (TOW) on the two-wire data bus (b1b2b3) or the connected two-wire data bus section (bn) of the two-wire data bus (b1, b2, b3) to a second threshold value ($V_{2L}$). The second threshold value ($V_{2L}$) differs from the third threshold value ($V_{2H}$) and determines the border between the first voltage value range ($V_{B1}$) and the second voltage value range ($V_{B2}$). The third threshold value ($V_{2H}$) determines the boundary between the second voltage value range ($V_{B2}$) and the third voltage value range ($V_{B3}$). The second comparator (cmp2) recovers the system clock from the differential signal level (TOW) on the two-wire data bus (b1b2b3) or the connected two-wire data bus section (bn) of the two-wire data bus (b1, b2, b3). This signal is relayed to the inside of the bus node (BSn) of interest as a clock signal ($TCK_n$) received by the bus node (BSn) of interest. The third comparator (cmp3) recovers the data information from the differential signal level (TOW) on the two-wire data bus (b1b2b3) or the connected two-wire data bus section (bn) of the two-wire data bus (b1, b2, b3) as data ($TMS\_TDI_n$) received by the bus node (BSn) of interest. Here, the data received by the bus node (BSn) of interest still include parts of the system clock. This can easily be remedied by simple sampling, e.g. in a flipflop, with the edge of a slightly delayed reconstructed system clock ($TCK_n$) or, alternatively, by delaying the received data and sampling with a non-delayed reconstructed system clock ($TCK_n$). If needed, the signals have to be processed before use.

In one example, the data output signal (TMI_TDI$_n$) could be switched to 1 by the third comparator (cmp3), if the differential signal level (TOW) on the two-wire data bus (b1b2b3) or the connected two-wire data bus section (bn) of the two-wire data bus (b1, b2, b3) is higher than the third threshold value (V$_{2H}$), and can conversely be switched to 0, if the amount of the differential signal level (TOW) is lower than this third threshold value (V$_{2H}$). In one example, the reconstructed system clock (TCK$_n$) could be switched to 1 by the second comparator (cmp2), if the differential signal level (TOW) on the two-wire data bus (b1b2b3) or the connected two-wire data bus section (bn) of the two-wire data bus (b1, b2, b3) is higher than the second threshold value (V$_{2L}$), and can conversely be switched to 0, if the amount of the differential signal level (TOW) is lower than this second threshold value (V$_{2L}$).

Similarly, the bus master (BM) samples the differential signal level (TOW) on the two-wire data bus (b1b2b3) or the connected two-wire data bus section (bn) of the two-wire data bus (b1, b2, b3) using a first comparator (cmp). For this purpose, the first comparator (cmp) compares the differential signal level (TOW) on the two-wire data bus (b1b2b3) or the connected two-wire data bus section (bn) of the two-wire data bus (b1, b2, b3) to a first threshold value (V$_{2H}$) and thereby recovers the data on the data line, which also in this case still include parts of the system clock. Again, a suitable sampling is useful. In this manner, the data (TDo) received by the bus master (BM) are obtained. In one example, the data output signal (TDo) could be switched to 1 by the first comparator (cmp), if the amount of the differential signal level (TOW) on the two-wire data bus (b1b2b3) or the connected two-wire data bus section (bn) of the two-wire data bus (b1, b2, b3) is higher than the first threshold value (V$_{1L}$), and can conversely be switched to 0, if the potential is lower than this second threshold value (V$_{1H}$). Except for a small tolerance range of preferably significantly less than 25% of this value, the first threshold value (V$_{1H}$) is equal to the third threshold value (V$_{2H}$).

In the further processing, prior art circuits for a data bus with separate data line and system clock line can be used, so that a description thereof can be omitted here. As an example, reference is made to WO 2006/102284 A2.

The following table of the amounts of the signal levels (TOW) and the logical values is obtained as a possible implementation. Other signal levels (TOW) and corresponding logical values are possible, of course, as will be known to a skilled person. It should be noted that in this example TCK=0 closes the dominant switches (T1a, T1b). Of course, this can also be implemented inversely.

Using a correspondingly controlled chronological sampling, these data can then be suitably allocated to the time slots (TIN0, TIN1, TDO$_2$).

In contrast to German Patents DE-B-10 2015 004 433, DE-B-10 2015 004 434, DE-B-10 2015 004 435 and DE-B-10 2015 004 436, the bus node of the present disclosure typically has a differential transfer gate (TG) that has the function of two switches. The first switch can connect a preceding first one-wire data bus section (bna) of the preceding two-wire data bus section (bn) to a succeeding first one-wire data bus section (b(n+1)a) of the succeeding two-wire data bus section (b(n+1)). The second switch can connect a preceding second one-wire data bus section (bnb) of the preceding two-wire data bus section (b$_n$) to a succeeding one-wire data bus section (b(n+1)b) of the succeeding two-wire data bus section (b(n+1)). If the transfer gate (TG$_n$) of the respective bus node (BS$_n$) is open, two further switches, not shown, preferably connect the succeeding two-wire data bus section (b(n+1)) to a holding potential or another suitable potential. Thereby, the differential signal level of the succeeding two-wire data bus (b(n+1)) is given a predefined signal level amount without a system clock, and thus data, being transmitted.

Referring back to FIG. 8: the two voltage divider pairs which, for the sake of example, form the differential pull circuit, are formed by the first resistors (R1a, R1b) and the second resistors (R2a, R2b), respectively. The differential pull circuit is formed by a first voltage divider pair with a first resistor (R1a) and a second resistor (R2a). The differential pull circuit further comprises a second voltage divider pair with another first resistor (R2a) and another second resistor (R2b). The differential pull circuit maintains the amount of the differential voltage level (TW) on the two-wire data bus (b1b2b3) in the second voltage value range (V$_{B2}$) on a medium second differential voltage value level (V$_M$), if none of the other transmitters (T1a, T1b, T2a, T2b, T3a, T3b) is active. Here, as an example, the first two-wire data bus section (b1) is connected to the output of the master two-wire data bus interface (OWM). The data transmitter of the bus master is formed by the second transistors (T2a, T2b). The one second transistor (T2a) is a p-channel transistor in the present example. The other second transistor (T2b) is an n-channel transistor in the present example. The one first transistor (T1a) is an n-channel transistor in the present example. The other first transistor (T1b) is a p-channel transistor in the present example. The first transistor (T1a) is controlled with the system clock (TCK) via an exemplary inverting buffer circuit (buf). The other first transistor (T1b) is controlled directly in this example. The

| Transmit | | | Two-wire data line/line section of | Receive | | |
|---|---|---|---|---|---|---|
| TCK | TMS_TDI | TDO$_n$ | interest | TCK$_n$ | TMS_TDI$_n$ | TDo |
| BM | BM | BSn | b1, b2, b3, b$_n$ | BSn | BSn | BM |
| 0 | 0 | 0 | $-V_{IO1}$ | 0 | 0 | 0 |
| 0 | 0 | 1 | $-V_{IO1}$ | 0 | 0 | 0 |
| 0 | 1 | 0 | $-V_{IO1}$ | 0 | 0 | 0 |
| 0 | 1 | 1 | $-V_{IO1}$ | 0 | 0 | 0 |
| 1 | 0 | 0 | $V_M$ | 1 | 0 | 0 |
| 1 | 0 | 1 | $V_{IO2}$ | 1 | 1 | 1 |
| 1 | 1 | 0 | $V_{IO1}$ | 1 | 1 | 1 |
| 1 | 1 | 1 | $V_{IO1/2}$ | 1 | 1 | 1 |

Preferably, the third threshold value (V$_{2H}$) and the first threshold value (V$_{1H}$) coincide, whereby the bus master (BM) and the bus nodes detect the same data sequence.

second transistor (T2a) is controlled with the combined signal TMS-TDI (TMS_TDI) via a NOR gate, if the system clock (TCK) is active. The other second transistor (T2b) is controlled via an exemplary inverting third buffer circuit (buf3), if the system clock (TCK) is inactive. The first amplifier (V1) generates the differential level signal (DPSM) in the bus master interface (OWM) on the basis of the differential voltage difference on the connected first two-wire data bus section (b1). A reference voltage ($V_{1H}$), i.e. the first threshold value ($V_{1H}$), by the voltage divider (R3), to which the first comparator (cmp) compares the differential signal level (TOW) in the form of the value of the differential level signal (DPSM)Δ in the bus master interface (OWM) and generates the data signal (TDo) for further processing in the bus master (BM). If necessary, the comparison result is delayed by a delay device (Δt).

FIG. 9

FIG. 9 shows an exemplary implementation of the n-th one-wire data bus interface ($OWS_n$) of an n-th bus node ($BS_n$) of the bus nodes (BS1, BS2, BS3) corresponding to the master two-wire data bus interface (OWM) of FIG. 8. The two-wire data bus interface ($OWS_n$) of the n-th bus node ($BS_n$) is connected, for the sake of example, to the n-th two-wire data bus section ($b_n$). The data transmitter of the n-th bus node (BSn) is formed by the third transistors (T3a, T3b). Their internal resistance (resistance in the switched-on state) is determined by a respective seventh resistor (R7a, R7b) connected in series to the respective third transistors (T3a, T3b). The second amplifier (V2) forms the differential level signal (DPS) in the bus node interface (OWSn) based on the differential voltage difference on the preceding connected n-th two-wire data bus section (bn). Two reference voltages, a third threshold value ($V_{2H}$) and a third threshold value ($V_{2L}$) are generated from the supply voltage ($V_{bat}$) of the n-th bus node (bn) by the voltage divider formed by the fourth resistor (R4), the fifth resistor (R5) and the sixth resistor (R6). A second comparator (cmp2) and a third comparator (cmp3) compare the differential signal level (TWO) on the exemplary connected preceding n-th two-wire data bus section ($b_n$) in the form of the value of the differential level signal (DPS) to the two reference voltages, the third threshold value ($V_{2H}$) and the third threshold value ($V_{2L}$). From this, they generate the reconstructed system clock ($TCK_n$) of the n-th bus node ($BS_n$) and the n-th combined TMS-TDI signal ($TMS\_TDI_n$) in the n-th ($BS_n$) for controlling the test controller (TAPC) of the JTAG interface in the n-th bus node ($BS_n$). Here, the clock and the data are again synchronized by a delay unit (Δt) for the combined TMS-TDI signal ($TMS\_TDI_n$). In this example, the output signal of the JTAG interface of the n-th bus node ($BS_n$) is used to control the third transistor (T3a), and to directly control the further third transistor (T3b), via an inverting second buffer circuit (buf2). A person skilled in the art will have no difficulty to ensure the chronological structure of the signals by means of a suitable logic.

FIG. 10

Figure 10:
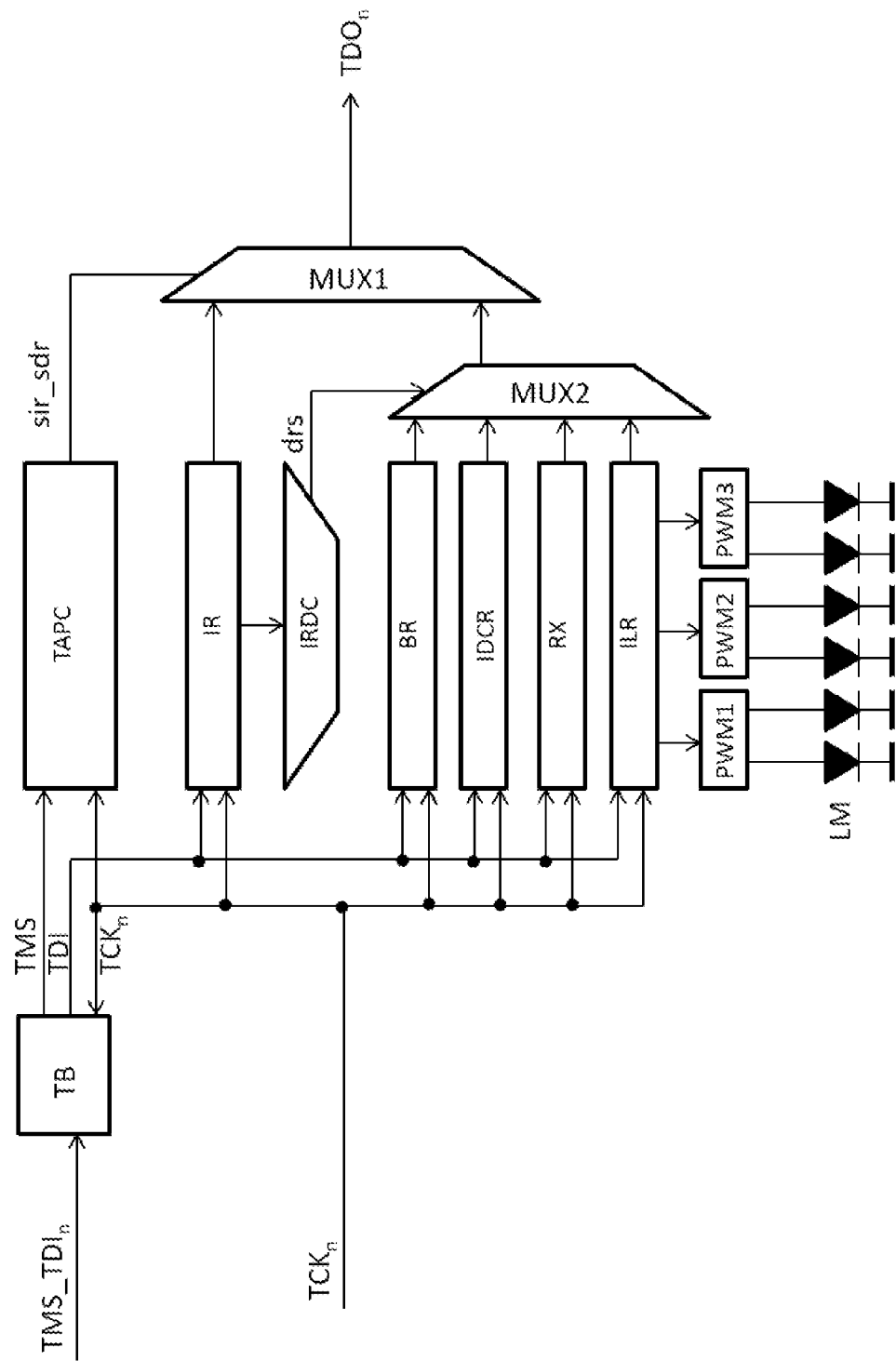
FIG. 10 is a simplified illustration of a JTAG interface of the present disclosure with illumination register (ILR).

FIG. 10 shows the internal structure of a JTAG interface of the present disclosure. The same is compatible with the architecture provided in the IEEE 1149 standard, so that software available on the market can be used, which is a significant advantage.

In this example, in a test data processing (TB), the combined TMS-TDI signal ($TMS\_TDI_n$) is decomposed synchronous to the reconstructed system clock ($TCK_n$) into the test mode signal (TMS) and the serial input data (TDI). Using the test mode signal (TMS), the test controller (TAPC) is again controlled synchronous to the clock corresponding to the state diagram already known from prior art and discussed with reference to the description of FIG. 1. In the sense of this disclosure, this state diagram of a test controller (TAPC) characterizes a JTAG interface, since software compatibility is only achieved by observing this state diagram. Due to the control signal (sir_sdr) for the first multiplexer (MUX1), the test controller switches between the instruction register (IR) and the data registers (BR, IDCR, RX, ILR) by means of the first multiplexer (MUX1). The serial data input (TDI) is routed to all data registers (BR, IDCR, RX, ILR), the instruction register (IR) and possibly further data registers. All these registers are typically of a two-stage design. This means that they have a shift register of a bit length m and, in parallel, a shadow register of the same length m. The shift register serves the transport of data, whereas the shadow register contains the valid data. As described before, the data are loaded from the shift register into the shadow register or are loaded or shifted from the shadow register into the shift register, or the data rest, depending on the state of the test controller (TAPC). In the example in FIG. 10, an instruction decoder (IRDC) controls the JTAG interface depending on the content of the instruction register (IR). For example, it is conceivable that the respective bus node may only transmit, if the shadow register of the instruction register (IR) contains certain values at certain bit positions, i.e. a certain transmission address. However, such an addressing may also be made in a separate transmission register (SR) (see FIG. 21).

Figure 21:
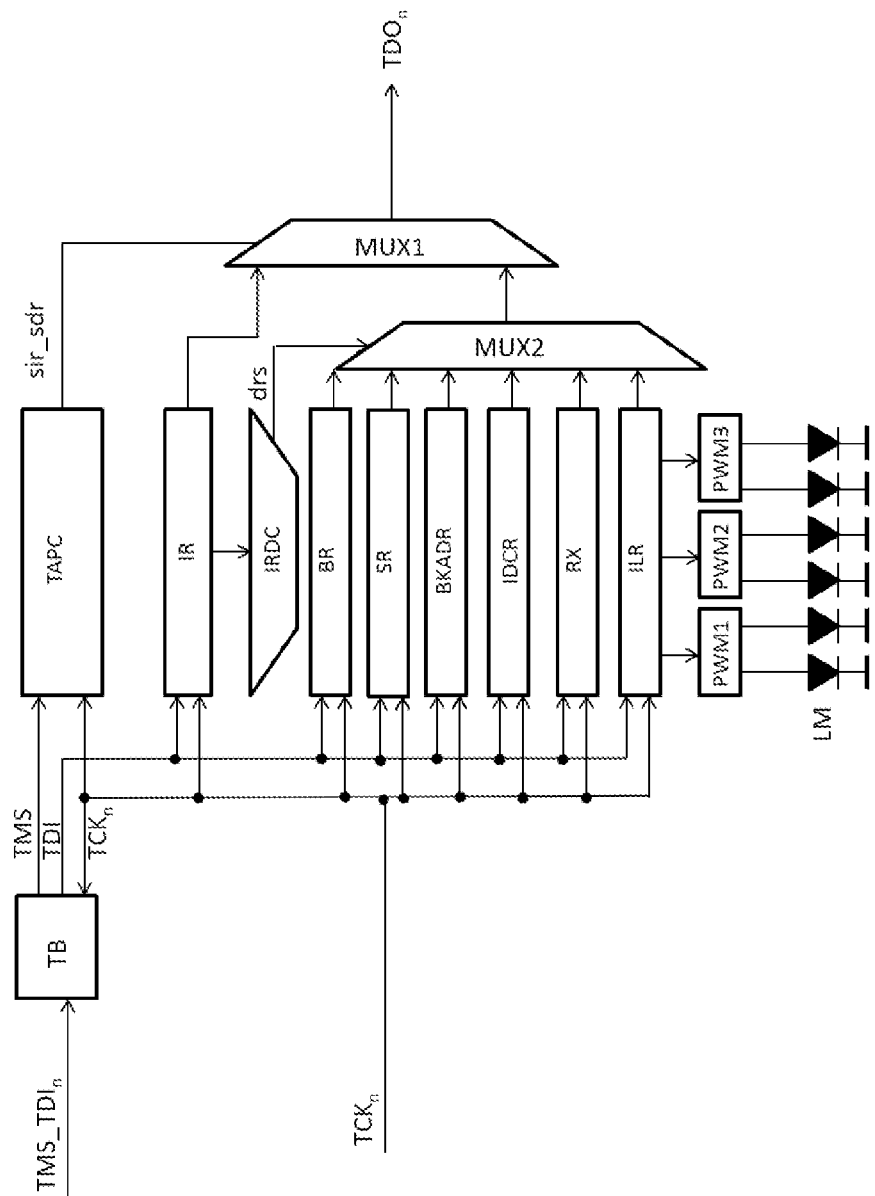
FIG. 21 is a simplified illustration of a JTAG interface of the present disclosure with illumination register (ILR), bus node address register (BKADR) and transmission register (SR).

It is particularly preferred that the JTAG interface comprises a bus node address register (BKADR) (see FIG. 21). The same indicates the identification number of the bus node. Further, the JTAG interface preferably has a transmission register (SR). This transmission register (SR) is set by the bus master (BM) and indicates the number of the bus node which is to/may send. Only, if both addresses, i.e. the address in the bus node address register (BKADR) and the address in the transmission register (SR) coincide, may the respective bus node ($BS_n$) transmit at the predetermined time. In order to set the bus node addresses in the bus node address registers (BKADR) of the bus nodes upon the initialization of the two-wire data bus system, all transfer gates (TG) of all bus nodes (BS1, BS2, BS3) or initially open. This may preferably be effected by a special instruction to all reachable instruction registers (IR) of all JTAG interfaces of the disclosure connected to the two-wire data bus (b1b2b3) and all reachable bus nodes. For this purpose, the instruction registers (IR) of these JTAG interfaces have to match in the bits with the lowest value, which are the shift register bits that are written first. Following a fixed algorithm, the bus master (BM) then allocates the first bus address to the first and only bus node (BS1) that is directly connected thereto, by writing the first bus node address register (BKADR) of the first bus node (BS1). Thereafter, the bus master (BM) typically, but not necessarily, tests the connection. Preferably, the bus node address register (BKADR) of the respective bus node (BSn) can only be written if the transfer gate (TGn) of the respective bus node (BSn) is not closed. Thereby, it is ensured that only the last bus node, seen from the bus master (BM), i.e. the first bus node in the series of bus node, whose transfer gate (TG) is not closed, accepts a bus node address into its bus node address register (BKADR). After such acceptance, the transfer gate (TG) is typically closed automatically or via software instruction from the bus master (BM). The bus node address stored in the bus address register is thereby frozen. At the same time, the addressing of the succeeding bus node can be performed. To allow an orderly reset of the bus system, e.g. an instruction that is the same for all bus nodes is provided in the instruction register (IR), which instruction opens all transfer gates of all bus nodes, so that a new allocation of addresses can be made. If, after an allocation of an address, the bus node with this bus node address does not answer, the bus node is either defective or it does not exist. In the latter case, the bus master knows the position of all bus nodes and their number.

The exemplary JTAG interface of FIG. 10 comprises a bypass register (BR) compliant with the standard, which serves to bypass data through the JTAG interface. Further, in this example, it comprises an identification register (IDCR) for reading out a series number of the circuit and further data registers (RX) corresponding to the JTAG standard. These may be test registers and other registers, for example.

According to the disclosure, an illumination register (ILR) is provided. In this illumination register (ILR), the bus master (BM) stores data for adjusting the energy supplies to the light emitting component (LM). Typically, the energy supplies are one or a plurality (three in the present instance) pulse width modulation (PWM) drivers (PWM1, PWM2, PWM3) generating a pulse width modulated (PWM) output voltage or a correspondingly modulated current.

FIG. 11

Figure 11:
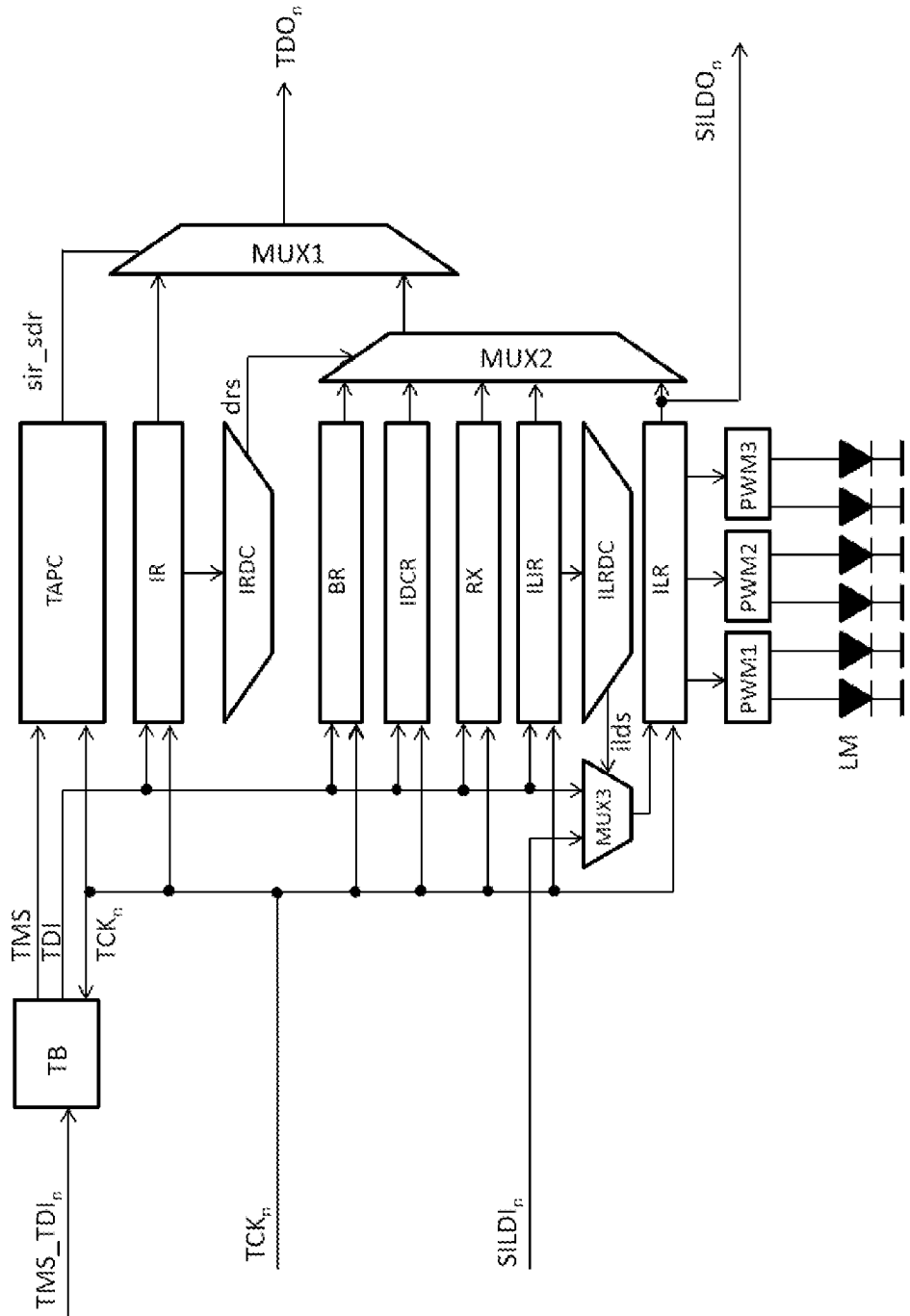
FIG. 11 is a simplified illustration of a JTAG interface of the present disclosure with illumination register (ILR) and separate switchable serial data input for the illumination register.

FIG. 11 shows FIG. 10, with the difference that the JTAG interface additionally has an illumination instruction register (ILIR). The same controls a third multiplexer (MUX3). The latter can switch the serial input data for the illumination register (ILR) between a serial input for illumination data (SILDI$_n$) and the serial data input (TDI) by means of an illumination data selection signal (ilds). At the same time, the output of the illumination register (ILR) is copied to the serial output for illumination data (SILDO$_n$).

FIG. 12

Figure 12:
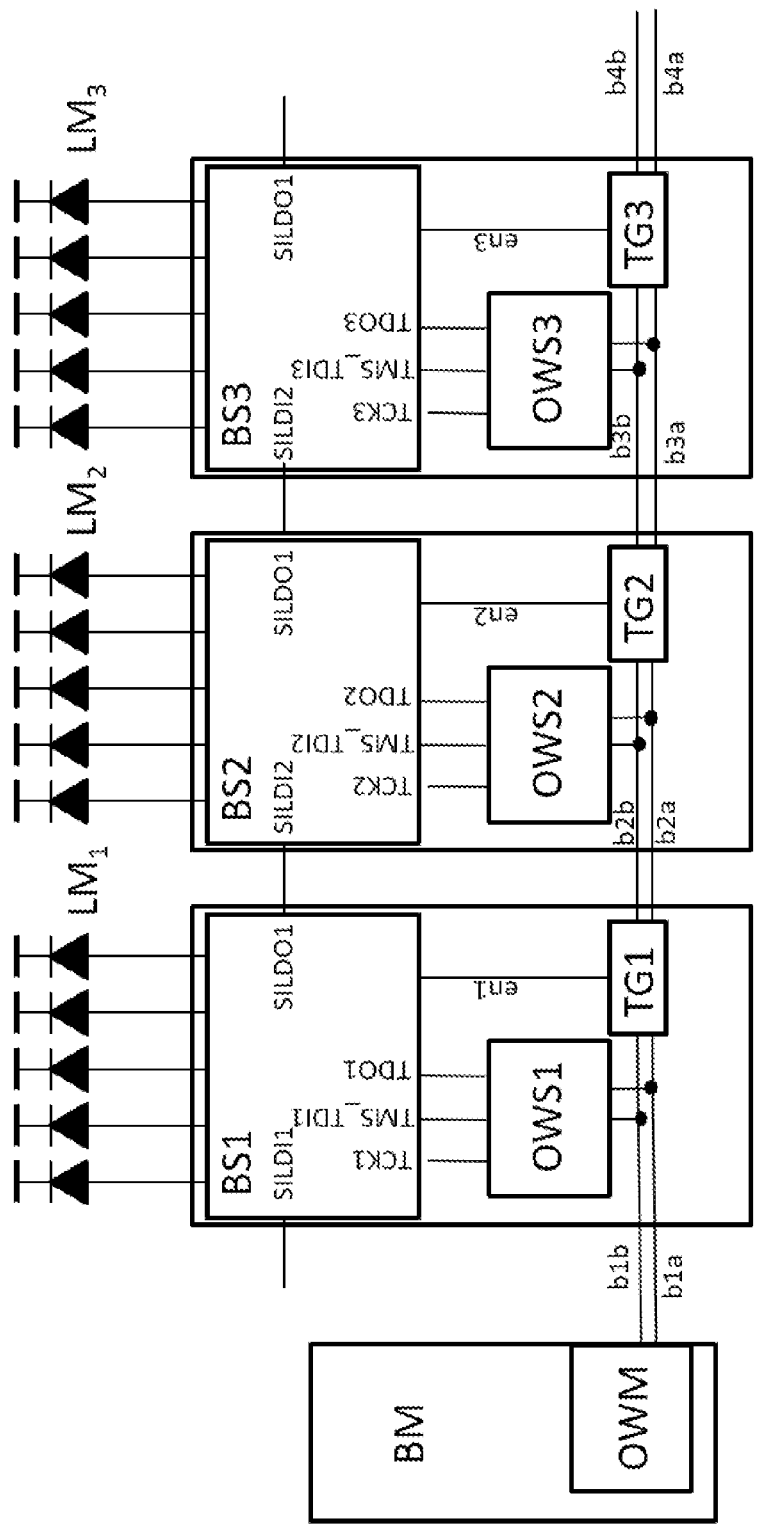
FIG. 12 is a schematic illustration of an exemplary two-wire data bus system with separate serial data bus for illumination data.

FIG. 12 shows a possible direct connection of a plurality of circuits with JTAG controllers according to FIG. 11 by a concatenation via the inputs for illumination data (SILDI1, SILDI2, SILDI3) and corresponding outputs for Illumination data (SILDO1, SILDO2, SILDO3).

Thereby, it is possible to quickly transmit data for whole groups of light emitting components without complicated addressing, since only one component has to be addressed.

FIG. 13

Figure 13:
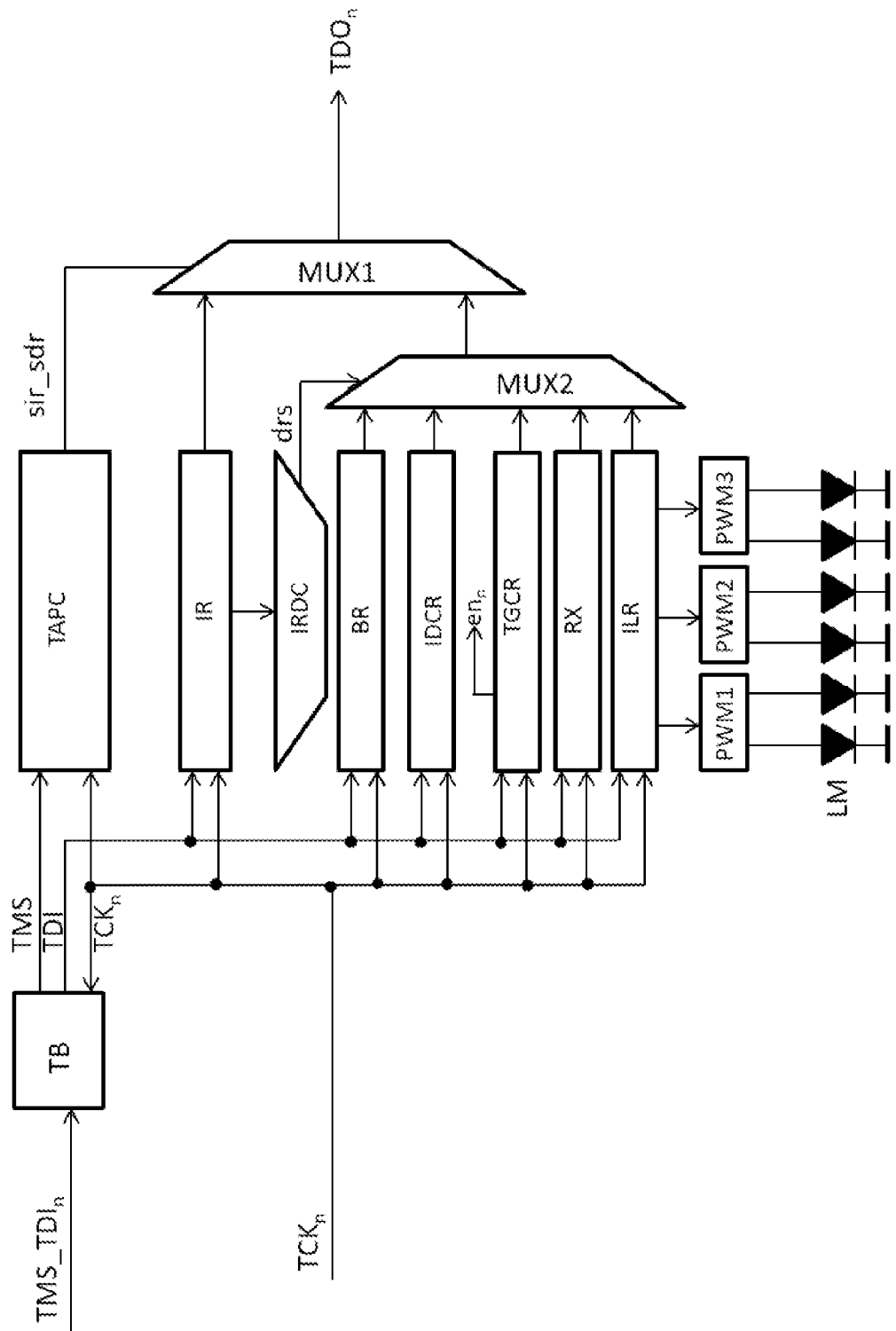
FIG. 13 is a simplified illustration of a JTAG interface of the present disclosure with illumination register (ILR) and transfer gate control register (TGCR).

FIG. 13 shows a JTAG interface as in FIG. 10, with the difference that it comprises a separate transfer gate control register (TGCR). Instead of placing the flag for opening and closing the transfer gate (TG) in the instruction register (IR), a separate transfer gate control register (TGCR) may be provided which generates the corresponding enable line (en$_n$) of the corresponding bus node (BS$_n$).

FIG. 14

Figure 14:
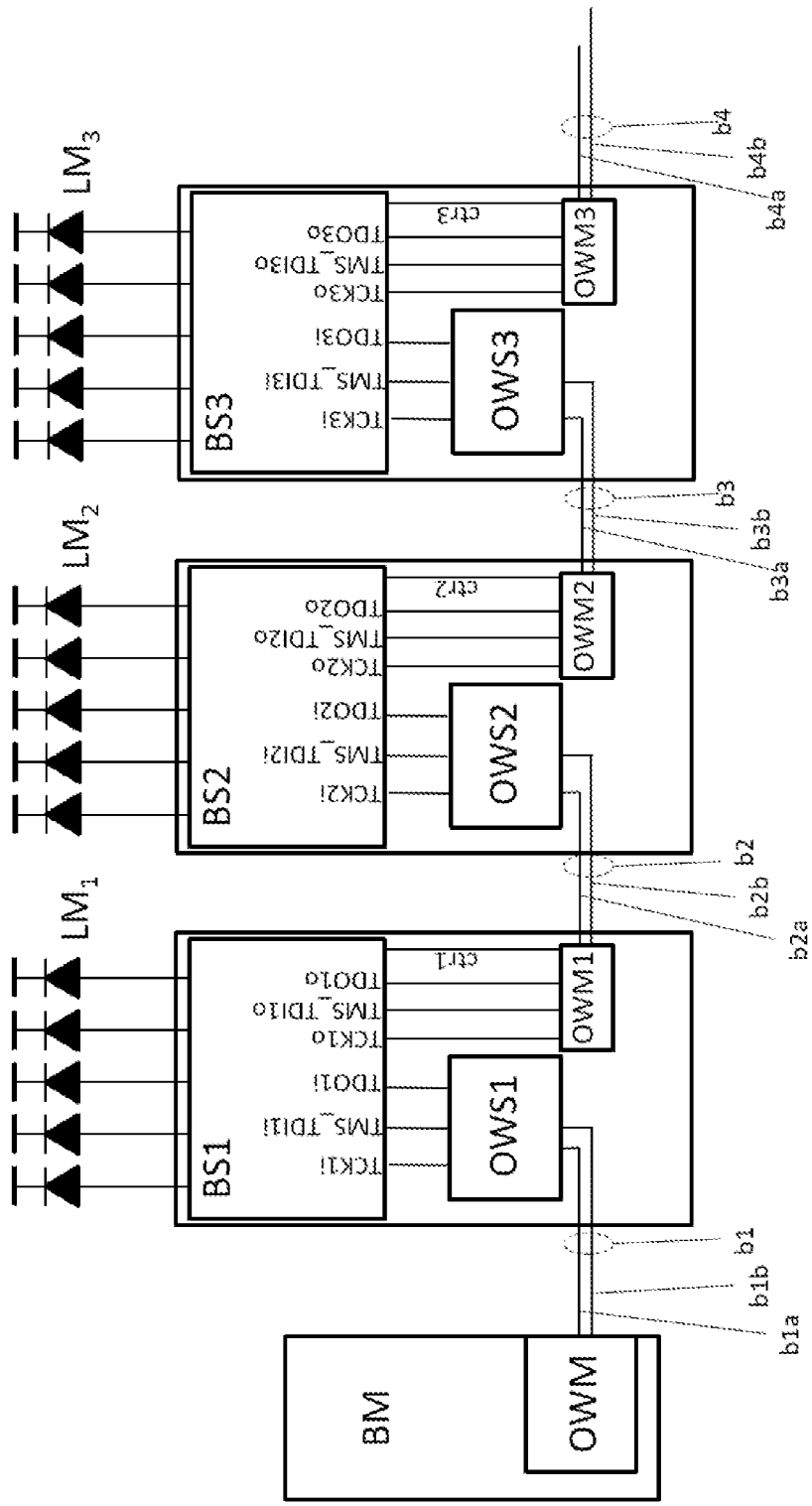
FIG. 14 is a schematic illustration of an exemplary two-wire data bus system, wherein each bus node has a bus master interface for controlling a succeeding bus node.
Figure 15:
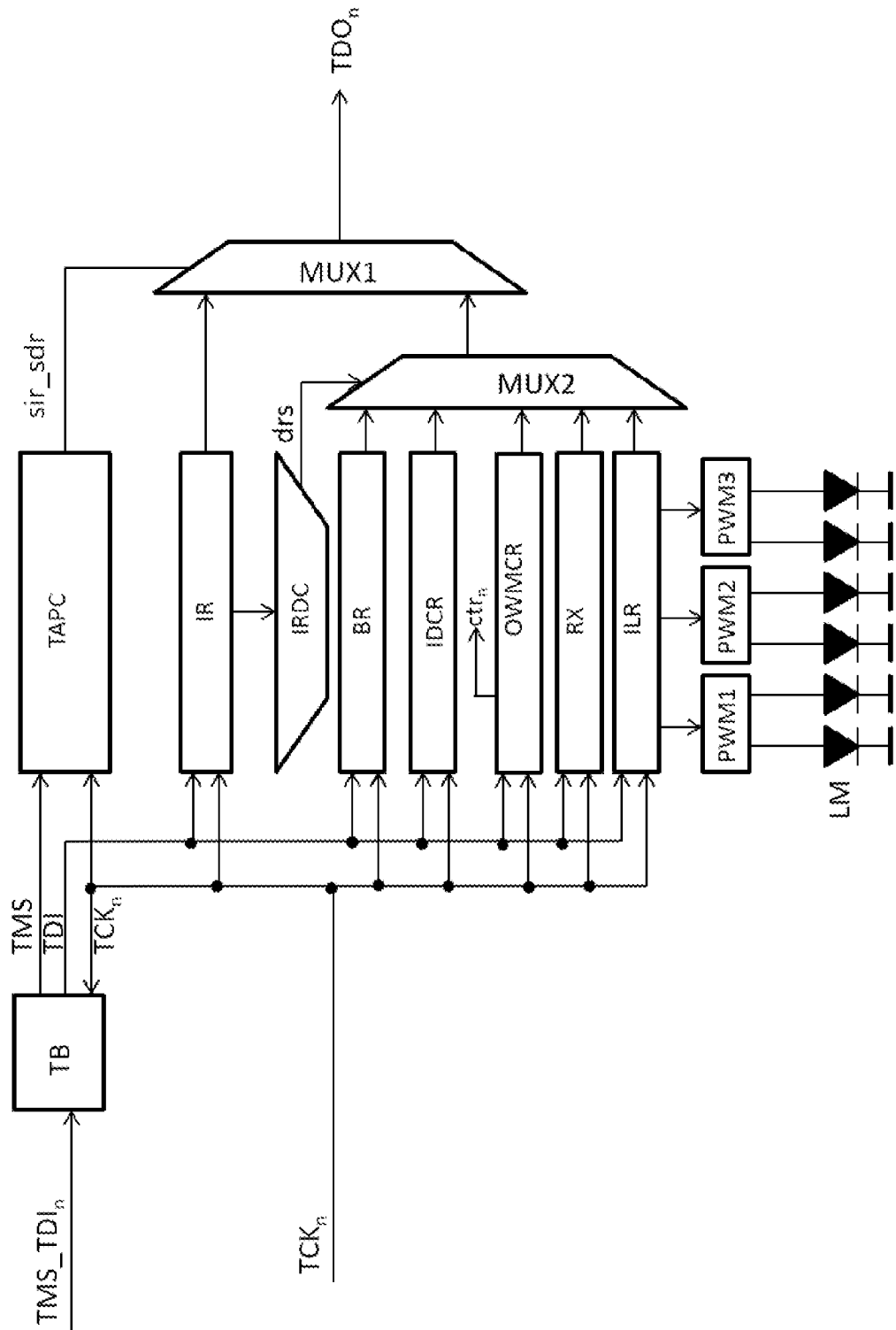
FIG. 15 is a simplified illustration of a JTAG interface of the present disclosure with illumination register (ILR) and bus master control register (OWMCR).

FIG. 14 shows the possible direct connection of a plurality of circuits with JTAG controllers according to FIG. 15 through a concatenation by means of point-to-point connections in which data are transmitted bidirectionally and a clock is transmitted unidirectionally via the one-wire data bus sections (b1, b2, b3). Each bus node has a two-wire data bus interface (OWS1, OWS2, OES3) and a master two-wire data bus interface (OWM1, OWM2, OWM3). Thereby, a concatenation equivalent to the other Figures is obtained.

FIG. 15

FIG. 15 shows a JTAG interface corresponding to FIG. 10, with the difference that it has a separate bus master control register (OWMCR). Instead of placing the control bits for controlling the bus master interface (OWM1, OWM2, OWM3) of the respective bus node (BS1, BS2, BS3) in the instruction register (IR), it is also possible to provide a separate bus master control register (OWMCR) that generates the corresponding control lines (ctr$_n$) in the corresponding bus node (BS$_n$).

FIG. 16

Figure 16:
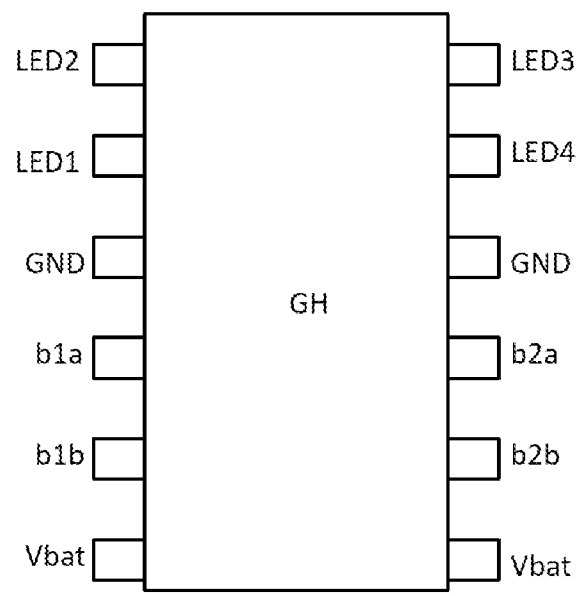
FIG. 16 shows a particularly advantageous arrangement of the connectors for a device of the present disclosure.

FIG. 16 illustrates an exemplary housing for a bus node (BSn) in top plan view. The supply voltage lines (V$_{bat}$, GND) may be connected free of intersections. The LEDs can be connected to the corresponding connectors (LED1, LED2, LED3, LED4) and to the negative supply voltage, i.e. the second reference potential (GND) of the reference potential line (GND) in a manner free of intersections. Between the bus nodes, the two-wire data bus (b1, b2) can be routed between the two supply voltage lines in a manner free of intersections, which shields the bus even better and allows for the use of microstrip lines with a defined wave impedance. This, in turn, makes the defined termination of the data bus seem possible. It is thus particularly feasible, if the wave impedance of the two-wire data bus (b1$b$2$b$3) matches the resistance of the differential pull circuit (R1$a$, R1$b$, R2$a$, R2$b$).

FIG. 17

Figure 17:
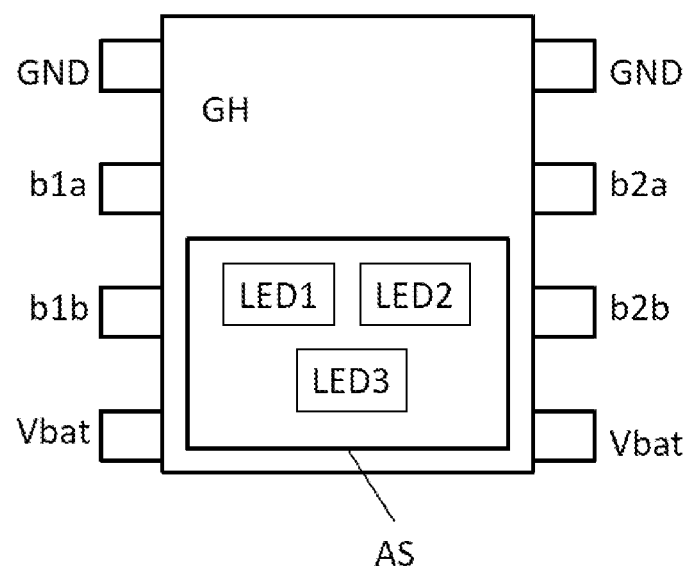
FIG. 17 shows a particularly well-suited housing (GH) for use with the data bus system described herein.

FIG. 17 is a top plan view on a light module for serial assembly. In this instance, the two-wire data bus can preferably be connected from the left-hand side. The succeeding two-wire data bus section (b2$a$, b2$b$) is preferably connected on the right-hand side. The supply voltage lines may be routed from the left-hand side to the right-hand side. The light emitting components (LED1, LED2, LED3) can be mounted in a recess (AS) of the housing (GH). An assembly on the housing (GH) is possible as well. The use of optical elements, such as lenses and mirrors, is useful for light beam modification.

FIG. 18

Figure 18:
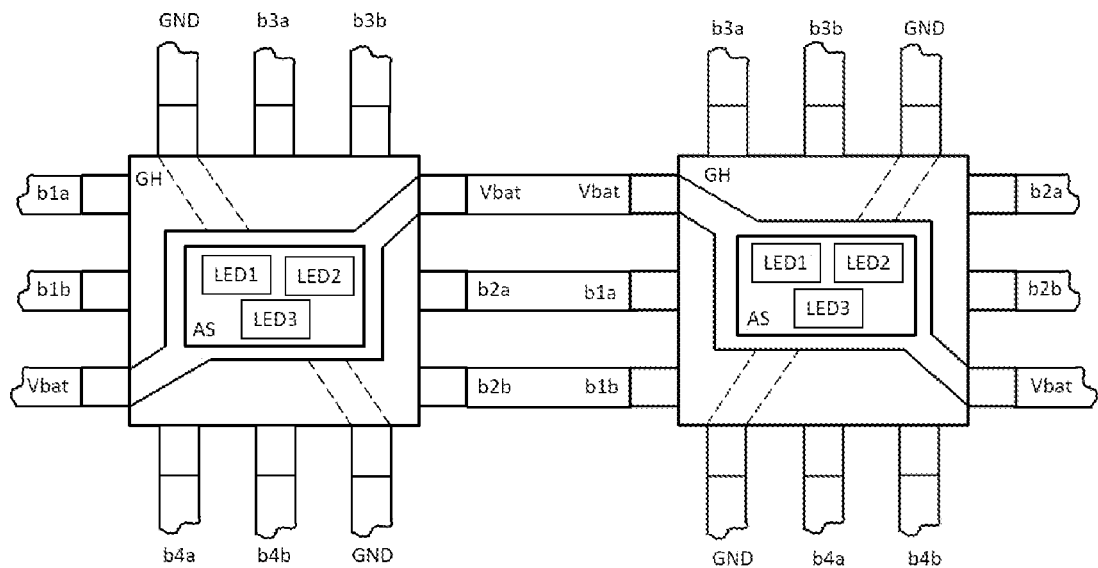
FIG. 18 shows two light modules for assembly across a surface as an area light.

FIG. 18 shows a still further simplified version of FIG. 17. The left-hand housing of FIG. 18 is a variant of the right-hand version, only mirrored vertically and horizontally with respect to the connectors for the supply voltage of the bus node (V$_{bat}$) and the connector for the supply voltage (GND). Thus, the housings can be assembled across a surface and do not require 16, but only twelve connectors. However, it is a drawback that, on the one hand, an intersection becomes necessary which may e.g. be realized via the die pad of the integrated circuit that forms the bus node. For example, it is feasible, if the integrated circuit of the bus node is mounted on a die pad that is connected to the negative supply potential, i.e. the second reference potential (GND) of the reference potential line (GND). This die pad may serve as a bridge between the opposite supply voltage connectors for the negative supply voltage. If this die pad is electrically insulated towards the printed circuit, the positive supply voltage can be routed on the printed circuit beneath the light module. To enable an intersection-free assembly of the two-wire data busses, the checkerboard-like assembly of the non-mirrored and the mirrored variants on a printed circuit is necessary for forming a light module array.

FIG. 18 also illustrates, how the connectors ($V_{bat}$) are electrically connected to each other per housing (GH), while the reference potential connectors (GND) of each housing (GH) are electrically connected to each other in the same manner. Either the two connectors for the supply potential ($V_{bat}$) or the two second supply potential connectors are electrically connected to each other via the so-called die paddle of a lead frame. The remaining supply potential connectors that are not electrically connected to each other via the lead frame, may e.g. be connected to each other via lines integrated in the die or via conductor paths on a printed circuit board (PCB).

FIG. 19

Figure 19:
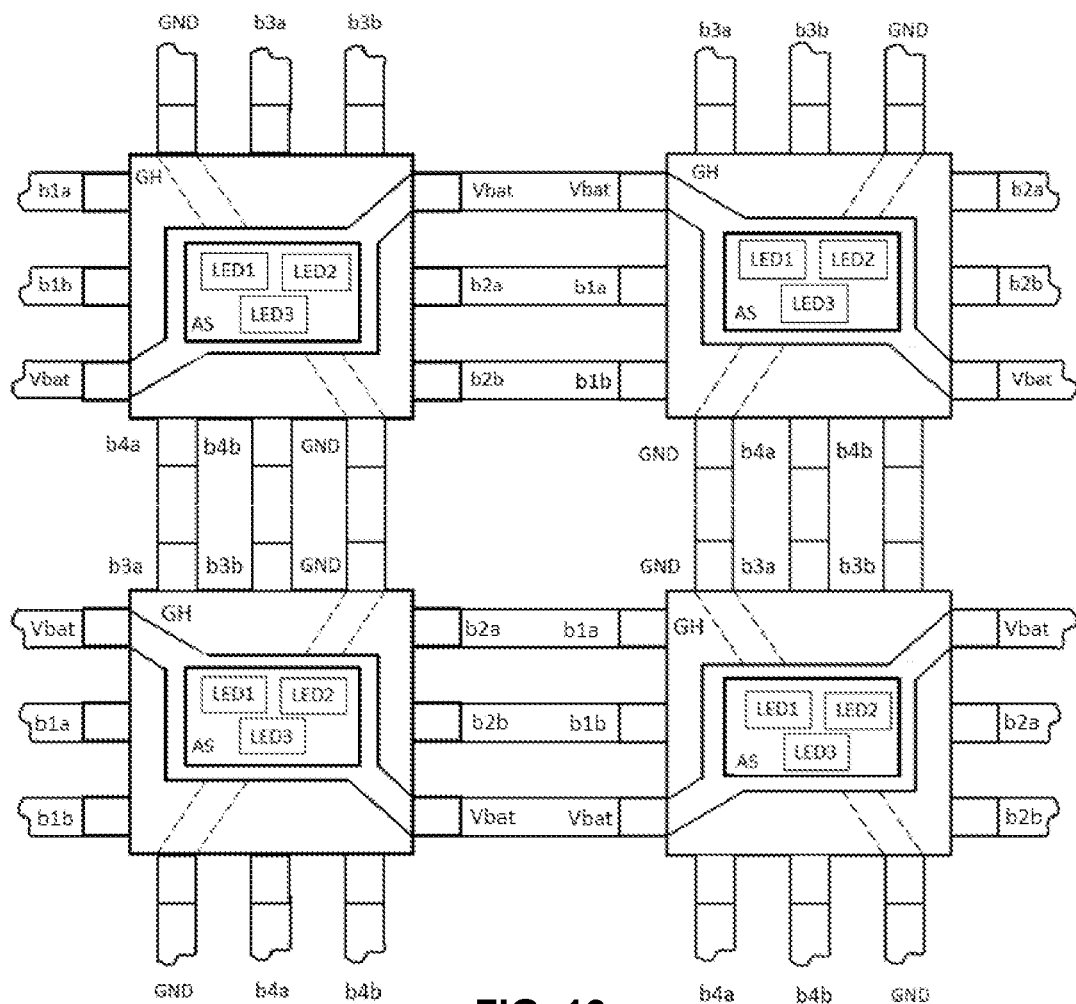
FIG. 19 shows a plurality of light modules of FIG. 18, assembled for an area light.

FIG. 19 shows how the two light modules in FIG. 18 are arranged in an array form. It can be seen that in the arrangement in FIG. 19, a light module of the type of the right-hand side light module of FIG. 18 is situated below and above the left-hand side light module of FIG. 18. Correspondingly, in the array arrangement in FIG. 19, a light module of the type of the left-hand side light module of FIG. 18 is located above and below the right-hand side light module of FIG. 18.

FIG. 20

Figure 20:
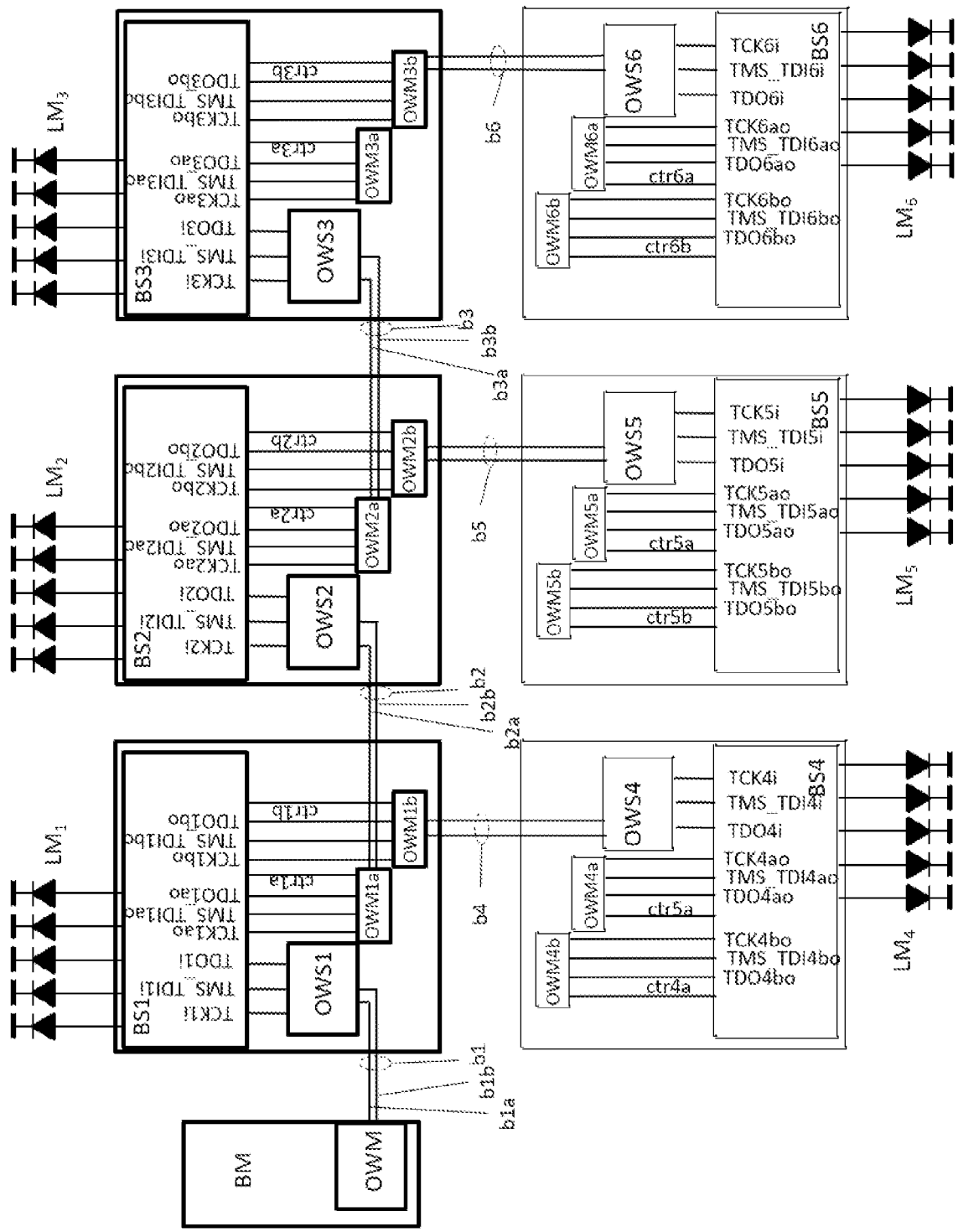
FIG. 20 illustrates a two-dimensional concatenation of six light modules of FIG. 17, each with two two-wire bus master interfaces (OWM1a to OWM6a and OWM1b to OWM6b) and a two-wire data bus interface (OWS1 to OWS6).

FIG. 20 illustrates a two-dimensional concatenation of six light modules of FIG. 18, each with two master two-wire bus interfaces (OWM1*a* to OWM6*a* and OWM1*b* to OWM6*b*) and a two-wire data bus interface (OWS1 to OWS6). FIG. 20 illustrates the possible direct connection of a plurality of circuits with JTAG controllers as of FIG. 14 by a concatenation using point-to-point connections in which data are transmitted bidirectionally and a clock is transmitted unidirectionally via the one-wire data bus sections. Each bus node (BS1, BS2, BS3, BS4, BS5, BS6) has a two-wire data bus interface (OWS1, OWS2, OWS3, OWS4, OWS5, OWS6) and a first master two-wire bus interface (OWM1*a*, OWM2*a*, OWM3*a*, OWM4*a*, OWM5*a*, OWM6*a*), as well as a second master two-wire bus interface (OWM1*b*, OWM2*b*, OWM3*b*, OWM4*b*, OWM5*b*, OWM6*b*). (Further two-wire data bus interfaces are conceivable, but are not illustrated for the sake of simplification). Thus, as in the other Figures, an equivalent two-dimensional concatenation is obtained.

FIG. 21

FIG. 21 is a simplified illustration of a JTAG interface according to the disclosure with an illumination register (ILR), a bus node address register (BKADR) and a transmission register (SR).

As an alternative, the disclosure can further be described by one of the following groups of features, wherein the groups of features can be combined randomly and individual features of a group of features can be combined with one or a plurality of features of one or a plurality of other groups of features and/or one or a plurality of the above described examples.

1. Data bus system with a differential two-wire data bus (b1*b*2*b*3) for the transmission of data between a bus master (BM) and between at least two bus nodes (BS1, BS2, BS3),
   a) wherein the two-wire data bus (b1*b*2*b*3) is divided into at least two two-wire data bus sections (b1, b2, b3) by the bus nodes (BS1, BS2, BS3), and
   b) wherein the two-wire data bus (b1*b*2*b*3) is terminated by one of the bus nodes (BS1, BS2, BS3), i.e. the terminal bus node (BS3), and
   c) wherein each of the bus nodes (BS1, BS2, BS3), except for a first bus node (BS1), is connected to a preceding bus node (BS1, BS2) of the bus nodes (BS1, BS2, BS3) via a preceding two-wire data bus section (b2, b3) of the two-wire data bus sections (b1, b2, b3), and
   d) wherein said one first bus node (BS1) is connected to the bus master (BM) via a preceding two-wire data bus section (b1) of the two-wire data bus sections (b1, b2, b3), and
   e) wherein each bus node (BS1, BS2, BS3), except for a terminal bus node (BS3), is connected to a subsequent bus node (BS3, BS4) of the bus nodes (BS1, BS2, BS3) via a subsequent two-wire data bus section (b2, b3) of the two-wire data bus sections (b1, b2, b3), and
   f) wherein the two-wire data bus system (b1, b2, b3) has a bus master (BM) with a master two-wire data bus interface (OWM), and
   g) wherein the master two-wire data bus interface (OWM) of the bus master (BM) is provided to bidirectionally transmit data via the two-wire data bus (b1*b*2*b*3) or at least a two-wire data bus section (b1, b2, b3) of the two-wire data bus sections (b1, b2, b3), hereinafter referred to as the two-wire data bus section (bn) of interest, and to receive data from the same, using a data bus protocol with more than two differential physical signal levels (TOW), and
   h) wherein the two-wire data bus section (bn) of interest comprises two signal lines (bna, bnb), and
   i) wherein a two-wire data bus interface (OWSn) of a bus node of interest of the bus nodes (BS1, BS2, BS3), hereinafter referred to as the bus node (BSn) of interest, is electrically connected to the two-wire data bus section (bn) of interest, and
   j) wherein the two-wire data bus interface (OWSn) of the bus node (BSn) of interest is provided to receive data via the two-wire data bus section (bn) of interest, using a data bus protocol with more than two differential physical levels (TOW), and
   k) wherein the two-wire data bus interface (OWSn) of the bus node (BSn) of interest is provided to transmit data via the two-wire data bus section (bn) of interest, using a data bus protocol with more than two differential physical signal levels (TOW), and
   l) wherein the bus node (BSn) of interest is in turn provided with a master two-wire data bus interface (OWMn), and
   m) wherein the master two-wire data bus interface (OWMn) of the bus node (BSn) of interest is provided to bidirectionally transmit data via at least one subsequent two-wire data bus section (b(n+1)) of the two-wire data bus sections (b1, b2, b3), hereinafter referred to as the subsequent two-wire data bus section (b(n+1)), to a subsequent bus node (BS(n+1)) and receive data from the same, using a data bus protocol with more than two differential physical signal levels (TOW), and
   n) wherein the bus node (BSn) of interest comprises a first bus master control register (OWMCRn) configured to control the master two-wire data bus interface (OWMn) of the bus node (BSn) of interest, and o) wherein the bus master (BM) is adapted to write the bus master control register (OWMCRn) of the bus node (BSn) of interest via the master two-wire data bus interface (OWM) of the bus master (BM) and the two-wire data bus (b1b2b3) or the two-wire data bus section (bn) of interest and the two-wire data bus interface (OWSn) of the bus node (BSn) of interest, and to thereby control the state of the master two-wire data bus interface (OWMn) of the bus node (BSn) of interest.

2. Method for operating a data bus between a first sub-device, i.e. the bus master (BM), and at least two further sub-devices, i.e. the bus nodes (BS1, BS2, BS3), a) wherein the data bus comprises a two-wire data bus (b1b2b3) divided into at least two two-wire data bus sections (b1, b2, b3) by the at least two bus nodes (BS1, BS2, BS3), and b) wherein the data bus is terminated by at least one of the bus nodes (BS1, BS2, BS3), i.e. the terminal bus nodes (BS3), the method comprising the following steps:

c) bidirectional transmission of data, using a data protocol with more than two physical differential signal levels (TOW), via the two-wire data bus (b1b2b3) or at least one two-wire data bus section (b1, b2, b3) of the two-wire data bus sections (b1, b2, b3), hereinafter referred to as the two-wire data bus section of interest, between the bus master (BM) and at least one bus node (BS1, BS2, BS3), hereinafter referred to as the bus node (BSn) of interest, d) simultaneous transmission of a clock signal (TCK) via the two-wire data bus (b1b2b3) or the two-wire data bus section (bn) of interest from the bus master (BM) to at least the bus node (BSn) of interest with a system clock period (T) which is divided into at least three successive time slots (TIN0, TIN1, TDO$_z$), each divided into at least a first half-clock period (T$_{1H}$) and a second half-clock period (T$_{2H}$), e) comparison of the differential signal level (TOW) on the two-wire data bus (b1b2b3) or at least on the two-wire data bus section (bn) of interest to a third threshold value (V$_{2H}$) by a first means of the bus node (BSn) of interest, f) comparison of the differential signal level (TOW) on the two-wire data bus (b1b2b3) or at least on the two-wire data bus section (b1, b2, b3) of interest to a second threshold value (V$_{2L}$), which second threshold value is different from the third threshold value (V$_{2H}$), by a second means of the bus node (BSn) of interest, wherein the third and the second threshold value (V$_{2L}$, V$_{2H}$) define three signal voltage value ranges (V$_{B1}$, V$_{B2}$, V$_{B3}$) between an operating voltage (V$_{IO}$, V$_{IO1}$, V$_{IO2}$) and a reference potential (−V$_{IO}$), and g) wherein a medium voltage value range as the second voltage value range (V$_{B2}$) is delimited in the upward or the downward direction by a first voltage value range (V$_{B1}$) of the three signal voltage value ranges (V$_{B1}$, V$_{B2}$, V$_{B3}$), and wherein the second voltage value range (V$_{B2}$) is delimited in the downward or the upward direction, i.e. opposite to the first voltage value range (V$_{B1}$), by a third voltage value range (V$_{B3}$) of the three signal voltage value ranges (V$_{B1}$, V$_{B2}$, V$_{B3}$), h) transmission of the data on the two-wire data bus (b1b2b3) or at least on the two-wire data bus section (bn) of interest in a time slot package with a duration of a system clock period (T) with at least three successive time slots (TIN0, TIN1, TDO$_z$), wherein the order of the time slots (TIN0, TIN1, TDO$_z$) within the succession of these at least three time slots (TIN0, TIN1, TDO$_z$) in one time slot package can be selected system-specifically, i. comprising the transmission of at least a check datum and/or a first datum in a first time slot (TIN0) and in a second time slot (TIN1) from the bus master (BM) to the bus node (BS1, BS2, BS3) of interest, wherein the bus node (BSn) of interest receives the check datum and the first datum, and ii. comprising the transmission of a second datum in the second voltage value range (V$_{B2}$) and the third voltage value range (V$_{B3}$) on the two-wire data bus (b1b2b3) or at least the two-wire data bus section (b1, b2, b3) of interest from the bus node (BS1, BS2, BS3) of interest to the bus master (BM) in the third time slot (TDO$_z$) of the at least three successive time slots (TIN0, TIN1, TDO$_z$), wherein the bus master (BM) receives the second datum, iii. wherein the transmission of the first datum and/or the second datum is performed in one half-clock period of the at least two half-clock periods (T$_{1H}$, T$_{2H}$) of the respective time slot by changing the differential signal level (TOW) on the two-wire data bus (b1b2b3) or at least the two-wire data bus section (bn) of interest between the second voltage value range (V$_{B2}$) on the one hand and the third voltage value range (V$_{B3}$) on the other hand via the first voltage value range (V$_{B1}$) and by changing the differential signal level (TOW) in the opposite direction via the first voltage value range (V$_{B1}$), iv. wherein the transmission of a system clock is performed in the respective other half-clock period of the at least two half-clock periods (T$_{1H}$, T$_{2H}$) of the respective time slot, wherein no data are transmitted in this half-clock period, and wherein the transmission of the system clock in the respective time slot is effected by changing the differential signal level (TOW) on the two-wire data bus (b1b2b3) or at least the two-wire data bus section (b$_n$) of interest between the first voltage value range (V$_{B1}$) on the one hand and the second voltage value range (V$_{B2}$) and/or the third voltage value range (V$_{B3}$) on the other hand and by changing in the opposite direction.

3. Housing (GH) for a bus node (BSn) in a data bus system according to one of the above numbers, for transmitting illumination data for light emitting components (LM1, LM2, LM3) by means of a differential two-wire data bus (b1b2b3), a) wherein the two-wire data bus (b1b2b3) serves to transmit data between the bus master (BM) and one of the bus nodes (BS1, BS2, BS3) on the one hand and between at least two bus nodes (BS1, BS2, BS3), and b) wherein the two-wire data bus (b1b2b3) is again divided by the bus nodes (BS1, BS2, BS3) into at least two two-wire data bus sections (b1, b2, b3), and c) wherein the housing (GH) of the bus node (BSn) comprises at least two rows of connectors, i.e, a first row of connectors (GND, b1a, b1b, V$_{bat}$) and a second row of connectors (GND, b2a, b2b, V$_{bat}$), and d) wherein at least these at least two rows of connectors are arranged opposite each other on the housing (GH), and e) wherein each of the rows of connectors comprises a connector for a first, in particular negative supply potential (GND), and a connector for a second, in particular positive supply potential ($V_{bat}$), f) wherein the connector for the first supply potential (GND) of the first row of connectors (GND, b1a, b1b, $V_{bat}$) is connected to the connector for the first supply potential (GND) of the second row of connectors (GND, b2a, b2b, $V_{bat}$), and the connector for the second supply potential ($V_{bat}$) of the first row of connectors (GND, b1a, b1b, $V_{bat}$) is connected to the connector for the second supply potential ($V_{bat}$) of the second row of connectors (GND, b2a, b2b, $V_{bat}$), each being connected in a manner free of intersections, and g) wherein the two connectors (b1a, b1b) for a two-wire data bus section (b1) preceding the bus node are arranged in the first row of connectors (GND, b1a, b1b, $V_{bat}$) between the connector for the first supply potential (GND) and the connector for the second supply potential ($V_{bat}$), and h) wherein the two connectors (b2a, b2b) for a two-wire data bus section (b2) succeeding the bus node in the second row of connectors (GND, b2a, b2b, $V_{bat}$) are arranged between the connector for the negative supply potential (GND) and the connector for the second reference potential ($V_{bat}$), and i) wherein the connectors for connecting or controlling of light emitting components (LED1, LED2, LED3, LED4) in their respective row of connectors are arranged such that, in the respective row of connectors, the connector for the supply voltage via which the electric current is to be discharged again, which current flows through the light emitting components (LED1, LED2, LED3, LED4) from these connectors for the operation and/or for the control of light emitting components (LED1, LED2, LED3, LED4), are positioned, in the respective row of connectors, between the two connectors (b1a, b1b and b2a, b2b, respectively) for the associated two-wire data bus section (b1 and b2, respectively) and the connectors for connecting and/or controlling of light emitting components (LED1, LED2, LED3, LED4).

4. Light module having a housing (GH) for a bus node (BSn) in a data bus system as defined in numeral 1, for the transmission of illumination data for light emitting components (LED1, LED2, LED3) by means of a differential two-wire data bus (b1b2b3), a) wherein the two-wire data bus (b1b2b3) is provided for the transmission of data between a bus master (BM) and between at least two bus nodes (BS1, BS2, BS3) of light emitting components, and b) wherein the two-wire data bus (b1b2b3) is divided into at least two two-wire data bus sections (b1, b2, b3) by the bus nodes (BS1, BS2, BS3), and c) wherein each bus node (BS2, BS3), except for a first bus node (BS1), is provided for connection to a preceding bus node (BS1, BS2) of the bus nodes (BS1, BS2, BS3) via a preceding two-wire data bus section (b2, b3) of the two-wire data bus sections (b1, b2, b3) and the first bus node (BS1) is provided for connection to the bus master (BM) via a preceding two-wire data bus section (b1) of the two-wire data bus sections (b1, b2, b3), and d) wherein the housing (GH) of the bus node (BSn) comprises at least two rows of connectors, i.e. a first row of connectors (GND, b1a, b1b, $V_{bat}$) and a second row of connectors (GND, b2a, b2b, $V_{bat}$), and e) wherein at least these two rows of connectors are arranged opposite each other on the housing (GH), and f) wherein each of the rows of connectors has a connector for the supply potential (GND), and g) wherein each of the rows of connectors has a connector for the second supply potential ($V_{bat}$), and h) wherein the connectors for the first supply potential and for the second supply potential are arranged such in each row of connectors that they can be connected in a manner free of intersections, if the connector for the first supply potential (GND) of the first row of connectors (GND, b1a, b1b, $V_{bat}$) is connected to the connector for the first supply potential (GND) of the second row of connectors (GND, b2a, b2b, $V_{bat}$) and if the connector for the second supply potential ($V_{bat}$) of the first row of connectors (GND, b1a, b1b, $V_{bat}$) is connected to the connector for the second supply potential ($V_{bat}$) of the second row of connectors (GND, b2a, b2b, $V_{bat}$), and i) wherein the two connectors (b1a, b1b) for a preceding two-wire data bus section (b1) of the bus node in the first row of connectors (GND, b1a, b1b, $V_{bat}$) are arranged between the connector for the first supply potential (GND) of the first row of connectors (GND, b1a, b1b, $V_{bat}$) and the connector for the second supply potential ($V_{bat}$) of the first row of connectors (GND, b1a, b1b, $V_{bat}$), and j) wherein the two connectors (b2a, b2b) for a succeeding two-wire data bus section (b2) of the bus node in the second row of connectors (GND, b2a, b2b, $V_{bat}$) are arranged between the connector for the second supply potential ($V_{bat}$) of the first row of connectors (GND, b1a, b1b, $V_{bat}$) and the connector for the second supply potential ($V_{bat}$) of the second row of connectors (GND, b2a, b2b, $V_{bat}$), and k) wherein at least one light emitting component (LED1, LED2, LED3) is arranged in a recess (ASP) of the housing (GH) or on the housing (GH).

5. Light module of one of the preceding numerals, wherein at least three light emitting components (LED1, LED2, LED3) are arranged in a recess (ASP) of the housing and each of these at least three light emitting components (LED1, LED2, LED3) has a light color that, in human perception, differs from the others.

6. Light module having a housing (GH) for a bus node (BSn) in a data bus system as defined in one of the preceding numerals, for the transmission of illumination data for light emitting components (LED1, LED2, LED3) by means of a differential two-wire data bus (b1b2b3), a) wherein the two-wire data bus (b1b2b3) is provided for the transmission of data between a bus master (BM) and between at least two bus nodes (BS1, BS2, BS3) of light emitting components, and b) wherein the two-wire data bus (b1b2b3) is divided into at least two two-wire data bus sections (b1, b2, b3) by the bus nodes (BS1, BS2, BS3), and c) wherein each bus node (BS2, BS3), except for a first bus node (BS1), is provided for connection to a preceding bus node (BS1, BS2) of the bus nodes (BS1, BS2, BS3) via a preceding two-wire data bus section (b2, b3) of the two-wire data bus sections (b1, b2, b3) and the first bus node (BS1) is provided for connection to the bus master (BM) via a preceding two-wire data bus section (b1) of the two-wire data bus sections (b1, b2, b3), and d) wherein at least one bus node (BS$_n$) is connectible to at least three two-wire data bus sections (b1, b2, b3), and
e) wherein the housing (GH) of the bus node (BS$_n$) comprises at least three rows of connectors, i.e. a first row of connectors (V$_{bat}$, b1a, b1b), a second row of connectors (GND, b2a, b2b) and a third row of connectors (V$_{bat}$, b3a, b3b) and possibly a fourth row of connectors (GND, b4a, b4b), and
f) wherein each of the three or four rows of connectors has at least one adjacent row of connectors on the housing (GH), which is arranged at an angle of 90° with respect to said row of connectors, and
g) wherein each row of connectors has exactly one connector for a supply potential (GND, V$_{bat}$), and
h) wherein each row of connectors that is adjacent to another row of connectors, has a connector for another supply potential than the supply potential whose connector is included in the other row of connectors, and
i) wherein—with respect to a clockwise or counter-clockwise counting direction—this supply potential connector is the first connector of the row of connectors in all rows of connectors, respectively, and
j) wherein each row of connectors comprises the two connectors of a two-wire data bus section, and
k) wherein these two bus connectors of said one two-wire data bus section are situated adjacent to the supply potential connector of the row of connectors, and
l) wherein at least one light emitting component (LED1, LED2, LED3) is arranged in a recess (ASP) of a housing (GH) or on the housing (GH).

7. Light module of one of the preceding numerals,
a) comprising a mounting support (lead frame),
b) wherein a first connector for a first supply potential (either GND or V$_{bat}$) is situated in a first row of connectors, and
c) wherein a second connector of this first supply potential (either GND or V$_{bat}$) is situated in a second row of connectors, and
d) wherein the first row of connectors is arranged opposite the second row of connectors, and
e) wherein the first connector is electrically connected to the oppositely arranged second connector by the mounting support (lead frame).

8. Light module having a housing (GH) for a bus node (BS$_n$) in a data bus system as defined in one of the preceding numerals,
a) comprising connectors (b1a, b1b, b2a, b2b) for receiving illumination data via the differential two-wire data bus (b1b2b3),
b) wherein the connectors (b1a, b1b, b2a, b2b) of the two-wire data bus (b1b2b3) are arranged between a supply potential connector (V$_{bat}$) for the second supply potential and a supply potential connector (GND) for the first supply potential, and
c) comprising at least one light emitting component (LED1, LED2, LED3), and
d) comprising an illumination register (ILR) configured to be written via the two-wire data bus (b1b2b3), and
e) comprising means for operating the light emitting components (LED1, LED2, LED3), wherein the brightness of the light emitting components depends on the data content of the illumination register (ILR).

9. Light module as defined in one of the preceding numerals, wherein the light module comprises at least two light emitting components (LED1, LED2, LED3), whose brightness can be adjusted differently depending on the data content of an illumination register (ILR) by adjusting different luminosities for the light emitting components (LED1, LED2, LED3).

LIST OF REFERENCE NUMERALS

AS recess of the housing
b1b2b3 two-wire data bus
b1b2b3b4 two-wire data bus
b1 first two-wire data bus section
b1a first one-wire data bus section of the first two-wire data bus section (b1)
b2 second two-wire data bus section
b2a first one-wire data bus section of the second two-wire data bus section (b2)
b2b second one-wire data bus section of the second two-wire data bus section (b2)
b3 third two-wire data bus section
b3a first one-wire data bus section of the third two-wire data bus section (b3)
b3b second one-wire data bus section of the third two-wire data bus section (b3)
b4 fourth two-wire data bus section
b4a first one-wire data bus section of the fourth two-wire data bus section (b4)
b4b second one-wire data bus section of the fourth two-wire data bus section (b4)
b5 fifth two-wire data bus section
b6 sixth two-wire data bus section
bn n-th two-wire data bus section
bna first one-wire data bus section of the n-th two-wire data bus section (bn)
bnb second one-wire data bus section of the n-th two-wire data bus section (bn)
b(n+1) (n+1)-th two-wire data bus section
b(n+1)a first one-wire data bus section of the (n+1)-th two-wire data bus section (b(n+1))
b(n+1)b second one-wire data bus section of the (n+1)-th two-wire data bus section (b(n+1))
BKADR bus node address register
BKADRn bus node address register of the bus node (BSn) of interest
BM bus master
BR bypass register
BRn bypass register of the bus node (BSn) of interest
BS1 exemplary first bus node
BS2 exemplary second bus node
BS3 exemplary third bus node
BS4 exemplary fourth bus node
BS5 exemplary fifth bus node
BS6 exemplary sixth bus node
BSn exemplary n-th bus node (the relevant bus node or bus node of interest is referred to at different locations in this disclosure as BS$_n$). Thus, it is a random bus node (BS1, BS2, BS3). The number of the bus nodes can differ from 3.
BS(n+1) exemplary (n+1)-th bus node
buf buffer circuit
buf2 second buffer circuit
buf3 third buffer circuit
bus node bus node circuit the bus node typically is the integrated circuit or another electric system controlled by the host processor, i.e. the bus master, via the two-wire data bus (b1b2b3) or at least a connected two-wire data bus section (b1, b2, b3).

bus master master circuit the bus master (BM) typically is the host processor via which the integrated circuit, i.e. the respective bn (BSn) is controlled.

cmp first comparator on the master side. The first comparator compares the amount of the differential signal level (TOW) on the two-wire data bus (b1b2b3) or on the connected two-wire data bus section (b1, b2, b3) in the form of the value of the differential level signal (DPSM) in the bus master interface (OWM) to a first threshold value ($V_{1H}$) and relays the data signal (TDo) received by the bus master (BM) to the inside of the circuit of the bus master (BM), typically the host processor. The first comparator detects the change of the amount of the signal level (TOW) on the two-wire data bus (b1b2b3) or the connected two-wire data bus section (b1, b2, b3) from the third voltage value range ($V_{B3}$) on the one hand into the first voltage value range ($V_{B1}$) or the second voltage value range ($V_{B2}$) on the other hand, and vice versa.

cmp2 second comparator on the bus node side. The second comparator compares the amount of the differential signal level (TOW) on the two-wire data bus (b1b2b3) or on the connected two-wire data bus section (b1, b2, b3) in the form of the value of the differential level signal (DPS) to a second threshold value ($V_{2L}$) and relays the reconstructed system clock ($TCK_n$) received by the respective bus node (BSn) to the inside of the circuit of the respective bus node (BSn), typically the integrated circuit or the system to be controlled. The second comparator detects the change of the amount of the signal level (TOW) on the two-wire data bus (b1b2b3) or the connected two-wire data bus section (b1, b2, b3) from the first voltage value range ($V_{B1}$), on the one hand, into the second voltage value range ($V_{B2}$) or the third voltage value range ($V_{B3}$), on the other hand, and vice versa.

cmp3 third comparator on the bus node side. The third comparator compares the amount of the differential signal level (TOW) on the two-wire data bus (b1b2b3) or on the connected two-wire data bus section (b1, b2, b3) in the form of the value of the differential level signal (DPSn) to a third threshold value ($V_{2H}$) and relays the data signal ($TMS\_TDI_n$) received by the respective bus node ($BS_n$) to the inside of the circuit of the respective bus node ($BS_n$), typically the integrated circuit or the system to be tested or controlled. The third comparator detects the change of the amount of the signal level (TOW) on the two-wire data bus (b1b2b3) or the connected two-wire data bus section (b1, b2, b3) from the third voltage value range ($V_{B3}$), on the one hand, into the first voltage value range ($V_{B1}$) or the second voltage value range ($V_{B2}$), on the other hand, and vice versa.

CIR state "load instruction register data" of the test controller (TAPC)

CDR state "load data register data" of the test controller (TAPC)

ctr1 control lines for controlling the bus master interface (OWM1) of the first bus node (BS1)

ctr1a control lines for controlling the first bus master interface (OWM1a) of the first bus node (BS1)

ctr1b control lines for controlling the second bus master interface (OWM1b) of the first bus node (BS1)

ctr2 control lines for controlling the bus master interface (OWM2) of the second bus node (BS2)

ctr2a control lines for controlling the first bus master interface (OWM2a) of the second bus node (BS2)

ctr2b control lines for controlling the second bus master interface (OWM2b) of the second bus node (BS2)

ctr3 control lines for controlling the bus master interface (OWM3) of the third bus node (BS3)

ctr3a control lines for controlling the first bus master interface (OWM3a) of the third bus node (BS3)

ctr3b control lines for controlling the second bus master interface (OWM3b) of the third bus node (BS3)

ctr4 control lines for controlling the bus master interface (OWM4) of the fourth bus node (BS4)

ctr4a control lines for controlling the first bus master interface (OWM4a) of the fourth bus node (BS4)

ctr4b control lines for controlling the second bus master interface (OWM4b) of the fourth bus node (BS4)

ctr5 control lines for controlling the bus master interface (OWM5) of the fifth bus node (BS5)

ctr5a control lines for controlling the first bus master interface (OWM5a) of the fifth bus node (BS5)

ctr5b control lines for controlling the second bus master interface (OWM5b) of the fifth bus node (BS5)

ctr6 control lines for controlling the bus master interface (OWM6) of the sixth bus node (BS6)

ctr6a control lines for controlling the first bus master interface (OWM5a) of the sixth bus node (BS5)

ctr6b control lines for controlling the second bus master interface (OWM6b) of the sixth bus node (BS2)

$ctr_n$ control lines for controlling the bus master interface ($OWM_n$) of the n-th bus node ($BS_n$)

DPS Level signal of the bus node. The level signal is formed by the output of the second differential input amplifier (V2) of the respective two-wire data bus interface ($OWS_n$) of a bus node.

DPSn Level signal of the respective bus node (BSn). The level signal is formed by the output of the second differential input amplifier (V2n) of the respective two-wire data bus interface ($OWS_n$) of a respective bus node (BSn).

DPSM Level signal of the respective bus master (BM). The level signal is formed by the output of the first differential input amplifier (V1) of the bus master (BM) of the respective two-wire data bus interface (OWM) of the bus master (BM).

DR Data register of the JTAG interface. (typically, a plurality of interfaces is connected in parallel and is selected via the second multiplexer (MUX2), while the data registers (DR) are read.)

DRn Data register of the JTAG interface of the respective bus node (BSn). (typically, a plurality of interfaces is connected in parallel and is selected via the second multiplexer (MUX2n) of the respective bus node ($BS_n$), while the data registers (DR) are read.)

drs Selection signal for the data register to be read

Δt Delay unit for the combined TMS-TDI signal in the bus node ($TMS\_TDI_n$) or the TDo signal in the bus master.

EDR1 State "data register exit 1" of the test controller (TAPC)

EDR2 State "data register exit 2" of the test controller (TAPC)

EIR1 State "instruction register exit 1" of the test controller (TAPC)

EIR2 State "instruction register exit 2" of the test controller (TAPC)

en1 First enable line for opening and closing the first transfer gates (TG1) of the first bus node (BS1)

en2 second enable line for opening and closing the second transfer gates (TG2) of the second bus node (BS2)

en3 third enable line for opening and closing the third transfer gates (TG3) of the third bus node (BS3)

$en_n$ n-th enable line for opening and closing the n-th transfer gates (TGn) of the n-th, respective bus node (BSn)

GH Housing
GND Reference potential line. The same is typically, but not necessarily, connected to ground. It has the second reference potential (GND).
$iTCK_n$ Internal system base clock of the respective bus node (BSn)
IDCR Identification register
IDCRn Identification register of the bus node (BSn) of interest
Ilds Illumination data selection signal
Ildsn Illumination data selection signal of the bus node (BSn) of interest
ILR Illumination register
ILRn Illumination register of the bus node (BSn) of interest
ILIR Illumination instruction register
ILIRn Illumination instruction register of the bus node (BSn) of interest
IR Instruction register of the JTAG interface
IRn Instruction register of the JTAG interface of the bus node (BSn) of interest
IRDC Instruction decoder
IRDCn Instruction decoder of the bus node (BSn) of interest
LED Light emitting diode. In the sense of this disclosure, this may also be the parallel and/or series connection of a plurality of LEDs.
LED1 Connector for the first LED set (one LED or a plurality of LEDs connected in series and/or in series)
LED2 Connector for the second LED set (one LED or a plurality of LEDs connected in series and/or in series)
LED3 Connector for the third LED set (one LED or a plurality of LEDs connected in series and/or in series)
LED4 Connector for the fourth LED set (one LED or a plurality of LEDs connected in series and/or in series)
LM1 Set of light emitting components 1, controlled by the first bus node (BS1)
LM2 Set of light emitting components 2, controlled by the second bus node (BS2)
LM3 Set of light emitting components 3, controlled by the third bus node (BS3)
LM4 Set of light emitting components 4, controlled by the fourth bus node (BS4)
LM5 Set of light emitting components 5, controlled by the fifth bus node (BS5)
LM6 Set of light emitting components 6, controlled by the sixth bus node (BS6)
LMn Set of light emitting components, controlled by the bus node (BSn) of interest
MUX1 First multiplexer in the JTAG interface for switching between the data registers (DR) and the instruction register (IR)
MUX12 second multiplexer in the JTAG interface for selecting the active data register (DR)
MUX3 third multiplexer for switching between a serial input for Illumination data (SILDI) and the serial input data (TDI)
MUXn multiplexer for switching between a serial input for illumination data ($SILDI_n$) and the serial input data ($TDIn$) of the bus node of interest
NOR Inverting OR circuit
OWM Master two-wire data bus interface
OWM1 Master two-wire data bus interface of the first bus node (BS1)
OWM1a First master two-wire data bus interface of the first bus node (BS1)
OWM1b Second master two-wire data bus interface of the first bus node (BS1)
OWM2 Master two-wire data bus interface of the second bus node (BS2)
OWM2a First master two-wire data bus interface of the second bus node (BS2)
OWM2b Second master two-wire data bus interface of the second bus node (BS2)
OWM3 Master two-wire data bus interface of the third bus node (BS3)
OWM3a First master two-wire data bus interface of the third bus node (BS3)
OWM3b Second master two-wire data bus interface of the third bus node (BS3)
OWM4 Master two-wire data bus interface of the fourth bus node (BS4)
OWM4a First master two-wire data bus interface of the fourth bus node (BS4)
OWM4b Second master two-wire data bus interface of the fourth bus node (BS4)
OWM5 Master two-wire data bus interface of the fifth bus node (BS5)
OWM5a First master two-wire data bus interface of the fifth bus node (BS5)
OWM5b Second master two-wire data bus interface of the fifth bus node (BS5)
OWM6 Master two-wire data bus interface of the sixth bus node (BS6)
OWM6a First master two-wire data bus interface of the sixth bus node (BS6)
OWM6b Second master two-wire data bus interface of the sixth bus node (BS6)
OWMn Master two-wire data bus interface of the bus node (BSn) of interest
OWMCR Bus master control register
OWMCRn Bus master control register of the bus node (BSn) of interest
OWS1 Two-wire data bus interface of the first bus node (BS1)
OWS2 Two-wire data bus interface of the second bus node (BS2)
OWS3 Two-wire data bus interface of the third bus node (BS3)
OWS4 Two-wire data bus interface of the fourth bus node (BS4)
OWS5 Two-wire data bus interface of the fifth bus node (BS5)
OWS6 Two-wire data bus interface of the sixth bus node (BS6)
$OWS_n$ Two-wire data bus interface of the bus node (BSn) of interest
PCM Pulse code modulation
PDM Pulse density modulation
PDR State "pause data register" of the test controller (TAPC)
PFM Pulse frequency modulation
PIR State "pause instruction register" of the test controller (TAPC)
POM Pulse-on-time modulation and/or pulse-off-time modulation
PWM Pulse width modulation. (In the sense of the present disclosure, this term comprises all known types of pulse modulation, such as e.g. PFM, PCM, PDM, POM etc.)
PWM1 First PWM unit
PWM2 Second PWM unit
PWM3 Third PWM unit
PWMn PWM unit of the bus node (BSn) of interest
$R_0$ Internal resistance of the pull circuit ($R_{1a}$, $R_{1b}$, $R_{2a}$, $R_{2b}$) which, as a fourth real voltage source, maintains the two-wire data bus (b1b2b3) or the connected two-wire data bus section (b1, b2, b3) on a medium second differential voltage value level ($V_M$), if the other transmitters (T1a, T1b, T2a, T2b, T3a, T3b) are not active. (Not illustrated in the Figures)

R1a Upper resistor of the first voltage divider, which, for the sake of example, forms the differential pull circuit together with the second voltage divider. The differential pull circuit maintains the amount of the differential signal level (TOW) on the two-wire data bus (b1b2b3b4) in the second voltage value range ($V_{B2}$) on a medium second differential voltage value level ($V_M$), if none of the other transmitters (T1a, T1b, T2a, T2b, T3a, T3b) is active.

R1b Upper resistor of the second voltage divider, which, for the sake of example, forms the differential pull circuit together with the first voltage divider. The differential pull circuit maintains the amount of the differential signal level (TOW) on the two-wire data bus (b1b2b3b4) in the second voltage value range ($V_{B2}$) on a medium second differential voltage value level ($V_M$), if none of the other transmitters (T1a, T1b, T2a, T2b, T3a, T3b) is active.

R2a lower resistor of the first voltage divider, which, for the sake of example, forms the differential pull circuit together with the second voltage divider. The differential pull circuit maintains the amount of the differential signal level (TOW) on the two-wire data bus (b1b2b3b4) in the second voltage value range ($V_{B2}$) on a medium second differential voltage value level ($V_M$), if none of the other transmitters (T1a, T1b, T2a, T2b, T3a, T3b) is active.

R2b lower resistor of the second voltage divider, which, for the sake of example, forms the differential pull circuit together with the first voltage divider. The differential pull circuit maintains the amount of the differential signal level (TOW) on the two-wire data bus (b1b2b3b4) in the second voltage value range ($V_{B2}$) on a medium second differential voltage value level ($V_M$), if none of the other transmitters (T1a, T1b, T2a, T2b, T3a, T3b) is active.

R1 First resistor $R_{1H}$ Internal resistance of the second switchable real voltage source in the switched-on state, which is formed by the switchable current source, i.e. the transistors (T1a, T1b), of the bus master (BM). (Not illustrated in the Figures).

R2 second resistor $R_{2H}$ Internal resistance of the third switchable real voltage source in the switched-on state, which is formed by the switchable current source, i.e. the transistors (T3a, T3b), of the respective bus node (BSn). (Not illustrated in the Figures).

R3 Third resistor

R4 Fourth resistor

R5 Fifth resistor

R6 Sixth resistor

R7a Seventh resistor for adjusting the internal resistance of the switch of the controllable current source (T3a) for the transmitter of the respective bus node (BSn)

R7b Seventh resistor for adjusting the internal resistance of the switch of the controllable current source (T3b) for the transmitter of the respective bus node (BSn)

RUN State "wait" of the test controller (TAPC)

RX Further data registers (DR) which correspond to the JTAG standard

RXn Further data registers (DRn) of the respective bus node (BSn) which correspond to the JTAG standard SDRS State "start of data register shifting" in the test controller (TAPC)

SILDIn Serial input for illumination data of the respective bus node (BSn)

SILD11 Serial input for illumination data of the first bus node (BS1)

SILD12 Serial input for illumination data of the second bus node (BS2)

SILD13 Serial input for illumination data of the third bus node (BS3)

SILDOn Serial output for illumination data of the respective bus node (BSn)

SILDO1 Serial output for illumination data of the first bus node (BS1)

SILDO2 Serial output for illumination data of the second bus node (BS2)

SILDO3 Serial output for illumination data of the third bus node (BS3)

SIRS State "start of instruction register shifting" in the test controller (TAPC)

SIR State "shift instruction register" of the test controller (TAPC)

sir_sdr Control signal for the first multiplexer (MUX1) between the instruction register (IR) and the data registers (DR)

SDR State "shift data register" of the test controller (TAPC)

SR Transmission register

SRn Transmission register of the respective bus node (BSn)

T System base clock period

T1a First transistor for controlling the first one-wire data bus (b1a, b2a, b3a, b4a) of the two-wire data bus (b1b2b3b4) for transmitting the system clock from the bus master (BM) to bus nodes. The first transistor forms a dominant switch with respect to other transmitters (T2a, T3a, R1a, R2a) on the first one-wire data bus (b1a, b2a, b3a, b4a) of the two-wire data bus (b1b2b3b4).

T1b Further first transistor for controlling the second one-wire data bus (b1b, b2b, b3b, b4b) of the two-wire data bus (b1b2b3b4) for transmitting the system clock from the bus master (BM) to bus nodes. The further first transistor forms a dominant switch with respect to other transmitters (T2b, T3b, R1b, R2b) on the second one-wire data bus (b1b, b2b, b3b, b4b) of the two-wire data bus (b1b2b3b4).

$T_{1H}$ First half-clock period of at least two half-clock periods ($T_{1H}$, $T_{2H}$) of the system clock period T2a Second transistor for controlling the first one-wire data bus (b1a, b2a, b3a, b4a) of the two-wire data bus (b1b2b3b4) for transmitting data from the bus master (BM) to bus nodes. The second transistor forms a dominant switch with respect to the voltage divider of the differential pull circuit (R1a, R2a) on the first one-wire data bus (b1a, b2a, b3a, b4a) of the two-wire data bus (b1b2b3b4). The internal resistance of the second transistor in the switched-on state is set such that the first transistor (T1a) can overwrite one or a plurality of second and third transistors transmitting on the first one-wire data bus (b1a, b2a, b3a, b4a) of the two-wire data bus (b1b2b3b4). The second transistor preferably is on par with a third transistor (T3a).

T2b Further second transistor for controlling the second one-wire data bus (b1b, b2b, b3b, b4b) of the two-wire data bus (b1b2b3b4) for transmitting data from the bus master (BM) to bus nodes. The further second transistor forms a dominant switch with respect to the voltage divider of the differential pull circuit (R1b, R2b) on the second one-wire data bus (b1b, b2b, b3b, b4b) of the two-wire data bus (b1b2b3b4). The internal resistance of the further second transistor in the switched-on state is set such that the further first transistor (T1b) can overwrite one or a plurality of further second and third transistors transmitting on the second one-wire data bus (b1a, b2a, b3a, b4a) of the two-wire data bus (b1b2b3b4). The further second transistor preferably is on par with a further third transistor (T3b).

$T_{2H}$ Second half-clock period of at least two half-clock periods ($T_{1H}$, $T_{2H}$) of the system clock period T3a Third transistor for controlling the first one-wire data bus (b1a, b2a, b3a, b4a) of the two-wire data bus (b1b2b3b4) for transmitting data from the bus node (BSn) of interest to the bus master (BM). The third transistor forms a dominant switch with respect to the voltage divider of the differential pull circuit (R1a, R2a) on the first one-wire data bus of the two-wire data bus (b1b2b3b4). The internal resistance of the third transistor in the switched-on state is set such that the first transistor (T1a) can overwrite one or a plurality of second and third transistors transmitting on the first one-wire data bus (b1a, b2a, b3a, b4a) of the two-wire data bus (b1b2b3b4). The third transistor preferably is on par with a second transistor (T2a).

T3b Further third transistor for controlling the second one-wire data bus (b1b, b2b, b3b, b4b) of the two-wire data bus (b1b2b3b4) for transmitting data from the bus node ($BS_n$) of interest to the bus master (BM). The further third transistor forms a dominant switch with respect to the further voltage divider of the differential pull circuit (R1b, R2b) on the second one-wire data bus (b1b, b2b, b3b, b4b) of the two-wire data bus (b1b2b3b4). The internal resistance of the further third transistor in the switched-on state is set such that the further first transistor (T1b) can overwrite one or a plurality of further second and third transistors transmitting on the second one-wire data bus (b1a, b2a, b3a, b4a) of the two-wire data bus (b1b2b3b4). The further third transistor preferably is on par with a further second transistor (T2b).

TAPC Test controller

TAPCn Test controller of the respective bus node ($BS_n$)

TB Data processing

TCK Clock input (test clock input) and system clock and clock signal (system clock) to be transmitted by the bus master (BM)

TCK1 Reconstructed system clock in the first bus node (BS1)

TCK1i Reconstructed system clock in the first bus node (BS1), coming from the first two-wire data bus interface (OWS1) of the first bus node (BS1)

TCK1o Reconstructed system clock in the first bus node (BS1) for the master two-wire data bus interface (OWM1) of the first bus node (BS1)

TCK1ao Reconstructed system clock in the first bus node (BS1) for the first master two-wire data bus interface (OWM1a) of the first bus node (BS1)

TCK1bo Reconstructed system clock in the first bus node (BS1) for the second master two-wire data bus interface (OWM1b) of the first bus node (BS1)

TCK2 Reconstructed system clock in the second bus node (BS2)

TCK2i Reconstructed system clock in the second bus node (BS2), coming from the second two-wire data bus interface (OWS2) of the second bus node (BS2)

TCK2o Reconstructed system clock in the second bus node (BS2) for the master two-wire data bus interface (OWM2) of the second bus node (BS2)

TCK2ao Reconstructed system clock in the second bus node (BS2) for the second master two-wire data bus interface (OWM2a) of the second bus node (BS2)

TCK2bo Reconstructed system clock in the second bus node (BS2) for the second master two-wire data bus interface (OWM2b) of the second bus node (BS2)

TCK3 Reconstructed system clock in the third bus node (BS3)

TCK3i Reconstructed system clock in the third bus node (BS3), coming from the third two-wire data bus interface (OWS3) of the third bus node (BS3)

TCK3o Reconstructed system clock in the third bus node (BS3) for the master two-wire data bus interface (OWM3) of the third bus node (BS3)

TCK3ao Reconstructed system clock in the third bus node (BS3) for the third master two-wire data bus interface (OWM3a) of the third bus node (BS3)

TCK3bo Reconstructed system clock in the third bus node (BS3) for the third master two-wire data bus interface (OWM3b) of the third bus node (BS3)

TCK4 Reconstructed system clock in the fourth bus node (BS4)

TCK4i Reconstructed system clock in the fourth bus node (BS4), coming from the fourth two-wire data bus interface (OWS4) of the fourth bus node (BS4)

TCK4o Reconstructed system clock in the fourth bus node (BS4) for the master two-wire data bus interface (OWM4) of the fourth bus node (BS4)

TCK4ao Reconstructed system clock in the fourth bus node (BS4) for the fourth master two-wire data bus interface (OWM4a) of the fourth bus node (BS4)

TCK4bo Reconstructed system clock in the fourth bus node (BS4) for the fourth master two-wire data bus interface (OWM4b) of the fourth bus node (BS4)

TCK5 Reconstructed system clock in the fifth bus node (BS5)

TCK5i Reconstructed system clock in the fifth bus node (BS5), coming from the fifth two-wire data bus interface (OWS5) of the fifth bus node (BS5)

TCK5o Reconstructed system clock in the fifth bus node (BS5) for the master two-wire data bus interface (OWM5) of the fifth bus node (BS5)

TCK5ao Reconstructed system clock in the fifth bus node (BS5) for the fifth master two-wire data bus interface (OWM5a) of the fifth bus node (BS5)

TCK5bo Reconstructed system clock in the fifth bus node (BS5) for the fifth master two-wire data bus interface (OWM5b) of the fifth bus node (BS5)

TCK6 Reconstructed system clock in the sixth bus node (BS6)

TCK6i Reconstructed system clock in the sixth bus node (BS6), coming from the sixth two-wire data bus interface (OWS6) of the sixth bus node (BS6)

TCK6o Reconstructed system clock in the sixth bus node (BS6) for the master two-wire data bus interface (OWM6) of the sixth bus node (BS6)

TCK6ao Reconstructed system clock in the sixth bus node (BS6) for the sixth master two-wire data bus interface (OWM6a) of the sixth bus node (BS6)

TCK6bo Reconstructed system clock in the sixth bus node (BS6) for the sixth master two-wire data bus interface (OWM6b) of the sixth bus node (BS6)

$TCK_n$ Reconstructed system clock in the respective bus node (BSn)

TDI Third time slot or bus node transmission time slot. The third time slot is typically used for transmission of the TDO signal of the JTAG test port according to the IEEE standard 1149 from the addressed bus node with permission to transmit to the bus master (BM). However, it is not ultimately necessary that this time slot is placed at the third chronological position. Other chronological orders are possible.

TDo Serial data output (test data output) and data signal received by the bus master (BM)

TDO1*i* Reconstructed data signal in the first bus node (BS1), coming from the first two-wire data bus interface (OWS1) of the first bus node (BS1)

TDO1*o* Reconstructed data signal in the first bus node (BS1) for the master two-wire data bus interface (OWM1) of the first bus node (BS1)

TDO1*ao* Reconstructed data signal in the first bus node (BS1) for the first master two-wire data bus interface (OWM1*a*) of the first bus node (BS1)

TDO1*bo* Reconstructed data signal in the first bus node (BS1) for the second master two-wire data bus interface (OWM1*b*) of the first bus node (BS1)

TDO2*i* Reconstructed data signal in the second bus node (BS2), coming from the second two-wire data bus interface (OWS2) of the second bus node (BS2)

TDO2*o* Reconstructed data signal in the second bus node (BS2) for the master two-wire data bus interface (OWM2) of the second bus node (BS2)

TDO2*ao* Reconstructed data signal in the second bus node (BS2) for the first master two-wire data bus interface (OWM2*a*) of the second bus node (BS2)

TDO2*bo* Reconstructed data signal in the second bus node (BS2) for the second master two-wire data bus interface (OWM2*b*) of the second bus node (BS2)

TDO3*i* Reconstructed data signal in the third bus node (BS3), coming from the third two-wire data bus interface (OWS3) of the third bus node (BS3)

TDO3*o* Reconstructed data signal in the third bus node (BS3) for the master two-wire data bus interface (OWM3) of the third bus node (BS3)

TDO3*ao* Reconstructed data signal in the third bus node (BS3) for the first master two-wire data bus interface (OWM3*a*) of the third bus node (BS3)

TDO3*bo* Reconstructed data signal in the third bus node (BS3) for the second master two-wire data bus interface (OWM3*b*) of the third bus node (BS3)

TDO4*i* Reconstructed data signal in the fourth bus node (BS4), coming from the fourth two-wire data bus interface (OWS4) of the fourth bus node (BS4)

TDO4*o* Reconstructed data signal in the fourth bus node (BS4) for the master two-wire data bus interface (OWM4) of the fourth bus node (BS4)

TDO4*ao* Reconstructed data signal in the fourth bus node (BS4) for the first master two-wire data bus interface (OWM4*a*) of the fourth bus node (BS4)

TDO4*bo* Reconstructed data signal in the fourth bus node (BS4) for the second master two-wire data bus interface (OWM4*b*) of the fourth bus node (BS4)

TDO5*i* Reconstructed data signal in the fifth bus node (BS5), coming from the fifth two-wire data bus interface (OWS5) of the fifth bus node (BS5)

TDO5*o* Reconstructed data signal in the fifth bus node (BS5) for the master two-wire data bus interface (OWM5) of the fifth bus node (BS5)

TDO5*ao* Reconstructed data signal in the fifth bus node (BS5) for the first master two-wire data bus interface (OWM5*a*) of the fifth bus node (BS5)

TDO5*bo* Reconstructed data signal in the fifth bus node (BS5) for the second master two-wire data bus interface (OWM5*b*) of the fifth bus node (BS5)

TDO6*i* Reconstructed data signal in the sixth bus node (BS6), coming from the sixth two-wire data bus interface (OWS6) of the sixth bus node (BS6)

TDO6*o* Reconstructed data signal in the sixth bus node (BS6) for the master two-wire data bus interface (OWM6) of the sixth bus node (BS6)

TDO6*ao* Reconstructed data signal in the sixth bus node (BS6) for the first master two-wire data bus interface (OWM6*a*) of the sixth bus node (BS6)

TDO6*bo* Reconstructed data signal in the sixth bus node (BS6) for the second master two-wire data bus interface (OWM6*b*) of the sixth bus node (BS6)

TDO$_n$ Serial data to be transmitted from within the bus node (BSn) of interest TINI0 first time slot. The first time slot is typically used for transmission of the TMS signal of the JTAG test port according to the IEEE standard 1149 from the bus master (BM) to the respective bus node (BS1, BS2, BS3). However, it is not ultimately necessary that this time slot is placed at the first chronological position. Other chronological orders are possible.

TINI1 second time slot. The second time slot is typically used for transmission of the TDI signal of the JTAG test port according to the IEEE standard 1149 from the bus master (BM) to the bus node (BS1, BS2, BS3). However, it is not ultimately necessary that this time slot is placed at the second chronological position. Other chronological orders are possible.

TLR State "reset test logic"

TMS Mode input (test mode input) or test mode signal

TMS_TDI1 Combined TMS_TDI signal in the first bus node (BS1)

TMS_TDI1*i* Combined TMS_TDI signal in the first bus node (BS1), coming from the first two-wire data bus interface (OWS1) of the first bus node (BS1)

TMS_TDI1*o* Combined TMS_TDI signal in the first bus node (BS1) for the master two-wire data bus interface (OWM) of the first bus node (BS1)

TMS_TDI1*ao* Combined TMS_TDI signal in the first bus node (BS1) for the first master two-wire data bus interface (OWM1*a*) of the first bus node (BS1)

TMS_TDI1*bo* Combined TMS_TDI signal in the first bus node (BS1) for the second master two-wire data bus interface (OWM1*b*) of the first bus node (BS1)

TMS_TDI2 Combined TMS_TDI signal in the second bus node (BS2)

TMS_TDI2*i* Combined TMS_TDI signal in the second bus node (BS2), coming from the second two-wire data bus interface (OWS2) of the second bus node (BS2)

TMS_TDI2*o* Combined TMS_TDI signal in the second bus node (BS2) for the master two-wire data bus interface (OWM) of the second bus node (BS2)

TMS_TDI2*ao* Combined TMS_TDI signal in the second bus node (BS2) for the first master two-wire data bus interface (OWM2*a*) of the second bus node (BS2)

TMS_TDI2*bo* Combined TMS_TDI signal in the second bus node (BS2) for the second master two-wire data bus interface (OWM2*b*) of the second bus node (BS2)

TMS_TDI3 Combined TMS_TDI signal in the third bus node (BS3)

TMS_TDI3*i* Combined TMS_TDI signal in the third bus node (BS3), coming from the third two-wire data bus interface (OWS3) of the third bus node (BS3)

TMS_TDI3*o* Combined TMS_TDI signal in the third bus node (BS3) for the master two-wire data bus interface (OWM) of the third bus node (BS3)

TMS_TDI3ao Combined TMS_TDI signal in the third bus node (BS3) for the first master two-wire data bus interface (OWM3a) of the third bus node (BS3)

TMS_TDI3bo Combined TMS_TDI signal in the third bus node (BS3) for the second master two-wire data bus interface (OWM3b) of the third bus node (BS3)

TMS_TDI4 Combined TMS_TDI signal in the fourth bus node (BS4)

TMS_TDI4i Combined TMS_TDI signal in the fourth bus node (BS4), coming from the fourth two-wire data bus interface (OWS4) of the fourth bus node (BS4)

TMS_TDI4o Combined TMS_TDI signal in the fourth bus node (BS4) for the master two-wire data bus interface (OWM) of the fourth bus node (BS4)

TMS_TDI4ao Combined TMS_TDI signal in the fourth bus node (BS4) for the first master two-wire data bus interface (OWM4a) of the fourth bus node (BS4)

TMS_TDI4bo Combined TMS_TDI signal in the fourth bus node (BS4) for the second master two-wire data bus interface (OWM4b) of the fourth bus node (BS4)

TMS_TDI5 Combined TMS_TDI signal in the fifth bus node (BS5)

TMS_TDI5i Combined TMS_TDI signal in the fifth bus node (BS5), coming from the fifth two-wire data bus interface (OWS5) of the fifth bus node (BS5)

TMS_TDI5o Combined TMS_TDI signal in the fifth bus node (BS5) for the master two-wire data bus interface (OWM) of the fifth bus node (BS5)

TMS_TDI5ao Combined TMS_TDI signal in the fifth bus node (BS5) for the first master two-wire data bus interface (OWM5a) of the fifth bus node (BS5)

TMS_TDI5bo Combined TMS_TDI signal in the fifth bus node (BS5) for the second master two-wire data bus interface (OWM5b) of the fifth bus node (BS5)

TMS_TDI6 Combined TMS_TDI signal in the sixth bus node (BS6)

TMS_TDI6i Combined TMS_TDI signal in the sixth bus node (BS6), coming from the sixth two-wire data bus interface (OWS6) of the sixth bus node (BS6)

TMS_TDI6o Combined TMS_TDI signal in the sixth bus node (BS6) for the master two-wire data bus interface (OWM) of the sixth bus node (BS6)

TMS_TDI6ao Combined TMS_TDI signal in the sixth bus node (BS6) for the first master two-wire data bus interface (OWM6a) of the sixth bus node (BS6)

TMS_TDI6bo Combined TMS_TDI signal in the sixth bus node (BS6) for the second master two-wire data bus interface (OWM6b) of the sixth bus node (BS6)

TMS_TDI$_n$ Combined TMS_TDI signal in the bus node (BS$_n$) of interest

TRST Optional reset input (test reset input)

TG1 Transfer gate of the exemplary first bus node (BS1)

TG2 Transfer gate of the exemplary second bus node (BS2)

TG3 Transfer gate of the exemplary third bus node (BS3)

TGn Transfer date of the exemplary bus node (BSn) of interest

TGCR Transfer gate control register

TGCRn Transfer gate control register of the bus node (BSn) of interest

TOW Differential signal level. The differential signal level on the two-wire data bus (b1b2b3b4) is the potential difference between the first one-wire data bus and the second one-wire data bus of the two-wire data bus (b1b2b3b4).

UDR2 State "write data register" of the test mode controller

UIR2 State "write instruction register" of the test mode controller $V_{bat}$ Supply voltage of the bus node $V_M$ Medium second differential voltage value level in the second voltage value range ($V_{B2}$) that occurs, when no other transmitter (T1a, T1b, T2a, T2b, T3a, T3b) is active and thus the pull circuit (R1a, R1b, R$_{2a}$, R2b) prevails.

$V_{1H}$ First threshold value. The first threshold value separates the third voltage value range ($V_{B3}$), on the one hand, from the first voltage value range ($V_{B1}$) and the second voltage value range ($V_{B2}$), on the other hand, on the bus master side. The first threshold value is preferably equal or similar to the third threshold value ($V_{2H}$). It is used for the transmission of data.

$V_{2L}$ second threshold value. The second threshold value separates the first voltage value range ($V_{B1}$), on the one hand, from the third voltage value range ($V_{B3}$) and the second voltage value range ($V_{B2}$), on the other hand, on the bus node side. It is used for the transmission of the clock.

$V_{2H}$ third threshold value. The third threshold value separates the third voltage value range ($V_{B3}$), on the one hand, from the first voltage value range ($V_{B1}$) and the second voltage value range ($V_{B2}$), on the other hand, on the bus node side. The third threshold value is preferably equal or similar to the first threshold value ($V_{1H}$). It is used for the transmission of data.

$V_{B1}$ First voltage value range delimited towards the second voltage value range ($V_{B2}$) by the second threshold value ($V_{2L}$). it is used for the transmission of the clock.

$V_{B2}$ Second voltage value range between the first voltage value range ($V_{B1}$) and the third voltage value range ($V_{B3}$), which is delimited towards the first voltage value range ($V_{B1}$) by the second threshold value ($V_{2L}$) and which is delimited towards the third voltage value range ($V_{B3}$) by the third threshold value ($V_{2H}$) of the bus node and/or by the first threshold value ($V_{1H}$) of the bus master (BM). It is used for the transmission of data.

$V_{B3}$ Third voltage value range which is delimited towards the second voltage value range ($V_{B2}$) by the third threshold value ($V_{2H}$) of the bus node and/or by the first threshold value ($V_{1H}$) of the bus master (BM). It is used for the transmission of data.

$V_{ext1}$ External supply voltage $-V_{IO}$ First differential voltage value level $V_{IO}$ Third differential voltage value level and supply voltage for the pull circuit, in this instance for the voltage divider (R1a, R2a; R1b, R2b).

$V_{IO1}$ Supply voltage of the switchable current source (T2a, T2b) of the bus master, i.e. the host processor. The voltage level is in the third voltage value range ($V_{B3}$).

$V_{IO2}$ Supply voltage of the switchable current source (T3a, T3b) of the bus node, i.e. the integrated circuit or the system to be tested or controlled. The voltage level is in the third voltage value range ($V_{B3}$).

VREF Reference voltage

The invention claims is:

1. A method for initializing a differential two-wire data bus between a bus master, and at least two bus nodes, the at least two bus nodes including one or more terminal bus nodes, wherein the two-wire data bus:
   comprises a first one-wire data bus and a second one-wire data bus; and
   is divided by the at least two bus nodes into at least two two-wire data bus sections, each of the at least two two-wire bus sections including a respective first one-wire data bus section and a respective second one-wire data bus section; and wherein each of the two-wire data bus sections is terminated by a respective terminal bus node;

the method comprising:
 determining a new bus node address by the bus master;
 storing the bus node address in a bus node address register of a bus node of interest, the bus node of interest being one of the at least two bus nodes, by the bus master, wherein the bus master and the bus node of interest are connected by one or more of the at least two two-wire data bus sections, and the bus node address register is one of:
  a data register of a modified JTAG interface of the bus node of interest, or
  a part of the data register of the modified JTAG interface of the bus node of interest, or
  a part of an instruction register of the modified JTAG interface of the bus node of interest,
   wherein the modified JTAG interface comprises a JTAG test controller comprising a state diagram corresponding to IEEE 1149 standard or a substandard of the IEEE 1149 standard; and
 connecting one or more of the at least two two-wire data bus sections with one or more other of the at least two two-wire data bus sections by closing a transfer gate of the bus node of interest, whereby a further storage of a further bus node address in the bus node address register of the bus node of interest is prevented by the bus node of interest for as long as the transfer gate is closed.

2. The method according to claim 1, further comprising:
 storing an instruction to open the transfer gate in the instruction register or a transfer gate control register of the modified JTAG interface of the bus node of interest.

3. The method according to claim 1, further comprising:
 verifying a correct addressing of at least one of the at least two bus nodes by cyclic writing and reading a bypass register.

4. The method according to claim 3, comprising:
 determining a number of correctly addressable bus modes by the bus master;
 comparing the number of correctly addressable bus nodes to a set number; and
 triggering, by the bus master or a connected system, at least one signal or one measure as a function of the number of correctly addressable bus nodes.

5. A method for transmitting data after the initialization of the differential two-wire data bus according to claim 1, comprising:
 simultaneously transmitting a transmission address to all accessible bus nodes by writing transmission registers of each of the respective accessible bus nodes by the bus master having the transmission address, wherein the transmission register of each of the respective accessible bus nodes is the data register or a second part of the data register or a second part of the instruction register of the modified JTAG interface of the respective accessible bus node, and wherein the bus node address register is not respectively the second part of the data register or the second part of the instruction register of the respective accessible bus node;
 comparing the transmission address in the transmission register in each of the respective accessible bus nodes to the bus node address in the bus node address register in the respective accessible bus node using a predetermined comparison algorithm;
 activating a transmitting capability for the respective accessible bus node at times provided for that purpose, if the predetermined comparison algorithm of the comparison performed by the respective accessible bus node results in a level of congruence of the bus node address stored in the bus node address register of the respective accessible bus node and the transmission address stored in the transmission register of the respective accessible bus node expected for a transmission permission; and
 deactivating the transmitting capability for the respective accessible bus node, if the comparison algorithm of the comparison performed before by the respective bus node does not result in the level of congruence of the bus node address stored in the bus node address register of the respective accessible bus node and the transmission address stored in the transmission register of the respective accessible bus node expected for the transmission permission.

6. A method for transmitting data after the initialization of the differential two-wire data bus according to claim 1, comprising:
 simultaneously transmitting a transmission address to all accessible bus nodes by writing transmission registers of each of the respective accessible bus nodes by the bus master having the transmission address, wherein the transmission register of each of the respective accessible bus nodes is the data register or a second part of the data register or a second part of the instruction register of the modified JTAG interface of the respective accessible bus node, and wherein the bus node address register is not respectively the second part of the data register or the second part of the instruction register of the respective accessible bus node;
 comparing the transmission address in the transmission register in each of the respective accessible bus nodes to the bus node address in the bus node address register in the respective accessible bus node using a predetermined comparison algorithm;
 activating a receiving capability of the respective accessible bus node for a content of predetermined data registers of the respective accessible bus node, if the predetermined comparison algorithm of the comparison performed before by the respective accessible bus node results in a level of congruence of the bus node address stored in the bus node address register of the respective accessible bus node and the transmission address stored in the transmission register of the respective accessible bus node, expected for a transmission permission; and
 deactivating the receiving capability of the respective accessible bus node for the content of predetermined data registers of the respective bus node, if the comparison algorithm of the comparison performed before by the respective bus node does not result in the level of congruence of the bus node address stored in the bus node address register of the respective accessible bus node and the transmission address stored in the transmission register of the respective accessible bus node, expected for the transmission permission.

7. A method for transmitting data after the initialization of the differential two-wire data bus according to claim 1, comprising:
 simultaneously transmitting a transmission address to all accessible bus nodes by writing transmission registers of each of the respective accessible bus nodes by the bus master having the transmission address, wherein the transmission register of each of the respective accessible bus nodes is a data register or a second part of the data register or a second part of the instruction register of the modified JTAG interface of the respective accessible bus node, and wherein the bus node address register is not respectively the second part of the data register or the second part of the instruction register of the respective accessible bus node;

comparing the transmission address in the transmission register in each of the respective accessible bus nodes to the bus node address in the bus node address register in the respective accessible bus node using a predetermined comparison algorithm;

activating a receiving capability of the respective accessible bus node for a content of predetermined contents of the instruction register of the respective accessible bus node to allow predetermined instructions for an instruction decoder of the modified JTAG interface of the respective accessible bus node, if the predetermined comparison algorithm of the comparison performed before by the respective accessible bus node results in a level of congruence of the bus node address stored in the bus node address register of the respective accessible bus node and the transmission address stored in the transmission register of the respective accessible bus node, expected for a transmission permission; and deactivating the receiving capability of the respective accessible bus node for the content of the predetermined contents of the instruction register of the respective accessible bus node for suppressing the predetermined instructions for the instruction decoder of the modified JTAG interface of the respective accessible bus node, if the predetermined comparison algorithm of the comparison performed before by the respective accessible bus node does not result in the level of congruence of the bus node address stored in the bus node address register of the respective accessible bus node and the transmission address stored in the transmission register of the respective accessible bus node expected for the transmission permission.

* * * * *